(12) United States Patent
Liang

(10) Patent No.: US 12,299,259 B2
(45) Date of Patent: May 13, 2025

(54) CONFIGURING A LOAD CONTROL SYSTEM

(71) Applicant: Lutron Technology Company LLC, Coopersburg, PA (US)

(72) Inventor: Duheng Liang, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 205 days.

(21) Appl. No.: 18/159,115

(22) Filed: Jan. 25, 2023

(65) Prior Publication Data

US 2023/0161465 A1 May 25, 2023

Related U.S. Application Data

(63) Continuation of application No. 16/295,791, filed on Mar. 7, 2019, now Pat. No. 11,567,636.

(60) Provisional application No. 62/639,633, filed on Mar. 7, 2018.

(51) Int. Cl.
*G06F 3/048* (2013.01)
*G05B 19/042* (2006.01)
*G06F 3/0484* (2022.01)
*G08B 21/18* (2006.01)

(52) U.S. Cl.
CPC ......... *G06F 3/0484* (2013.01); *G05B 19/042* (2013.01); *G08B 21/18* (2013.01); *G05B 2219/2614* (2013.01)

(58) Field of Classification Search
CPC ................ G06F 3/0484; G05B 19/042; G05B 2219/2614; G05B 2219/2642; G05B 19/0426; G05B 15/02; G08B 21/18
See application file for complete search history.

(56) References Cited

U.S. PATENT DOCUMENTS

| | | |
|---|---|---|
| 8,762,877 B2 | 6/2014 | Loberg et al. |
| 9,019,266 B2 | 4/2015 | Hoguet |
| 9,811,612 B2 | 11/2017 | Buzz |
| 10,311,614 B2 | 6/2019 | Mowatt |
| 10,346,892 B1 | 7/2019 | Bagchi |
| 10,423,133 B2 | 9/2019 | Baluja et al. |
| 10,503,350 B2 | 12/2019 | Kim et al. |

(Continued)

FOREIGN PATENT DOCUMENTS

CA 2761513 A1 * 11/2010 ......... H05B 37/0245

*Primary Examiner* — Rashawn N Tillery
(74) *Attorney, Agent, or Firm* — Michael S. Czarnecki; Glen R. Farbanish; Philip N. Smith

(57) ABSTRACT

A load control system may be configured using a design (e.g., graphical user interface) software. The design software may display icons representing fixtures (e.g., lighting fixtures) and devices (e.g., load control devices, controls, sensors, etc.) on a canvas. The design software may define relationships between the fixtures and/or devices. The design software may provide load control templates defining collections of devices, for example, for particular rooms in a building. The templates may be quickly placed on the canvas to define a particular area. Fixtures may be added to a template on the canvas and the design software may automatically create relationships between the fixtures and the devices (e.g., load control devices) of the template. In addition, the design software may automatically create relationships between the devices of the template (e.g., between controls and load control devices).

18 Claims, 63 Drawing Sheets

(56) References Cited

U.S. PATENT DOCUMENTS

| | | | |
|---|---|---|---|
| 10,677,484 | B2 | 6/2020 | Ribbich et al. |
| 10,856,394 | B2 | 12/2020 | Arora et al. |
| 2002/0032546 | A1 | 3/2002 | Imamura et al. |
| 2007/0055976 | A1 | 3/2007 | Ward et al. |
| 2011/0285204 | A1* | 11/2011 | Weidman .......... H02J 13/00016 307/40 |
| 2013/0226546 | A1 | 8/2013 | Suyeyasu et al. |
| 2014/0095122 | A1 | 4/2014 | Appleman et al. |
| 2016/0173293 | A1 | 6/2016 | Kennedy |
| 2016/0321921 | A1 | 11/2016 | Stafford et al. |
| 2017/0032554 | A1* | 2/2017 | O'Donovan ............ G06V 40/16 |
| 2017/0055112 | A1 | 2/2017 | Westphal et al. |
| 2018/0203591 | A1 | 7/2018 | Callen et al. |
| 2018/0279451 | A1* | 9/2018 | Baus .................... H05B 47/115 |
| 2019/0278442 | A1* | 9/2019 | Liang .................... G08B 21/18 |
| 2024/0403365 | A1* | 12/2024 | Abraham .............. G06F 16/901 |

\* cited by examiner

CONFIGURING A LOAD CONTROL SYSTEM

CROSS-REFERENCE TO RELATED APPLICATIONS

This application is a continuation of U.S. application Ser. No. 16/295,791, filed Mar. 7, 2019; which claims the benefit of U.S. Provisional Patent Application No. 62/639,633, filed Mar. 7, 2018, the entire disclosure of which is hereby incorporated by reference.

BACKGROUND

A load control environment, such as a residence or an office building, for example, may be configured with various types of load control systems. The load control environment may include load control devices that are associated with input devices for communicating load control instructions for controlling an electrical load. The load control environment may include one or more rooms. Each of the rooms includes load control devices that are capable of directly controlling an electrical load. For example, each of the rooms may include lighting control devices (e.g., ballasts, LED drivers, or dimmer switches) capable of directly controlling an amount of power provided to lighting loads. A room may include additional load control devices, such as motorized window treatments and/or an HVAC system. Each load control system may include various input devices and load control devices. The input devices may be capable of controlling the electrical load via the load control device by sending digital messages to the load control device that include control instructions for controlling the electrical load controlled by the load control device.

Large load control systems are often designed using design software running on a computing device, such as a computer or laptop. The design software may be configured to establish relationships between the control devices (e.g., load control devices, input devices, etc.) of a load control system. Since such load control system typically include a very large number of control devices, the design procedure using the design software may be lengthy and tedious.

SUMMARY

A load control system may include control devices for controlling an amount of power provided to an electrical load. The load control system may include one or more system controllers. The control devices may include control-source devices and/or control-target devices. The control-target devices may be load control devices capable of controlling the amount of power provided to a respective electrical load based on digital messages received from the control-source devices. The digital messages may include load control instructions or another indication that causes the control-target device to determine load control instructions for controlling an electrical load.

One or more system controllers may communicate with control devices. For example, system controllers may communicate with control devices for configuring control devices, associating control devices, providing scenes (e.g., presets) via one or more control devices, etc. System controllers may communicate with control devices for operating control devices. For example, system controllers may communicate with control devices by generating instructions for control devices, sending instructions to control devices, and/or receiving instructions from control devices. System controllers may communicate with control devices by sending digital messages to the control devices wirelessly (e.g., via a proprietary communication channel, such as CLEAR CONNECT™, etc.).

As described herein, control-target devices and control-source devices may be associated with each to allow for communication between the devices. A system controller may be used to perform the associations between the control-target devices and the control-source devices. For example, a system controller may be used to send digital messages to control-source devices for associating with control-target devices with the control-source source devices, and/or a system controller may be used to send digital messages to control-target devices for associating with control-source devices with the control-target devices. The digital messages may include an identification of the control-source devices and/or an identification of the control-target devices with which the system controllers may communicate. A control-source device may send digital messages to a control-source device for associating the control-target device with the control-source device, and the system controller may receive the digital message and store information regarding the association between the control-target device with the control-source device.

The load control system may be configured using a design software, such as a graphical user interface (GUI) software. The design software may run on a network device, such as a personal computer (PC), a laptop, a tablet, a smart phone, or equivalent device having a visual display. Using the design software, a user may select the electrical devices (e.g., the electrical loads and/or the control devices of the load control system, such as control-source devices and/or control target devices).

The design software may display to a user on a display terminal a design window that includes a canvas and a palette, wherein the palette may include a template pane and a fixture pane and the canvas may display a floorplan. The design software may display in the template pane a load control template, where the load control template comprises a first graphical representation of a first load control device and a graphical representation of a remote control device. The design software may display in the fixture pane a first graphical representation of a first fixture, where the first fixture is configured to be controlled by the first load control device. The design software may define a load control area on the floorplan displayed on the canvas based on the user selecting the load control template from the template pane. The design software may create a relationship between the first fixture and the first load control device in the load control area on the floorplan based on the user selecting the first fixture from the fixture pane and defining the load control area on the floorplan. Subsequent to the creation of the relationship between the first fixture and the first load control device, the design software may automatically creating a relationship between the first load control device and the remote control device of the load control template in the load control area on the floorplan.

The design software may automatically block the user from selecting in the template pane an indication of a fixture type that is not compatible with the load control device of the template. The design software may automatically determine if the area includes device icons of required device types, and display a warning if the area does not include device icons of a required device type.

DETAILED DESCRIPTION

Figure 1:
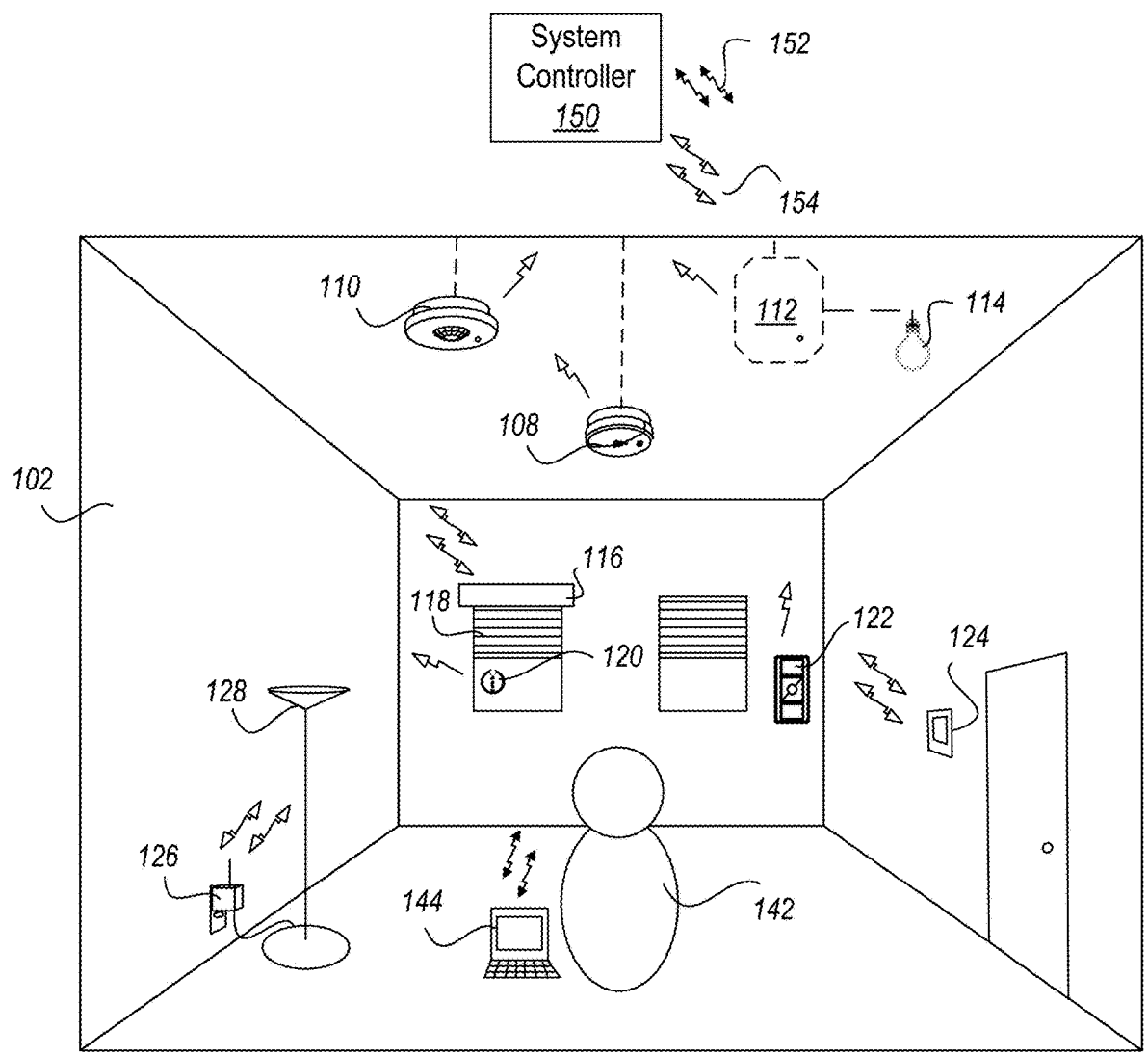
FIG. 1 is a system diagram that illustrates an example load control environment for associating control devices and controlling electrical loads.

FIG. 1 depicts a load control system 100 that includes control-source devices and control-target devices. As shown in FIG. 1, the load control system 100 may be installed in a load control environment 102, which may be a room in a building. The load control system 100 may include control-target devices that may be capable of controlling (e.g., directly controlling) an electrical load. For example, load control system 100 may include a lighting control device 112. The lighting control device 112 may be a ballast, a light emitting diode (LED) driver, a dimmer switch, and/or the like. The lighting control device 112 may be capable of directly controlling an amount of power provided to lighting load 114. The load control system 100 may include one or more control-target devices, such as a motorized window treatment 116 for directly controlling the covering material 118 (e.g., via an electrical motor), a plug-in load control device 126 for directly controlling a floor lamp 128, a desk lamp, and/or other electrical loads that may be plugged into the plug-in load control device 126, and/or a temperature control device 124 (e.g., thermostat), for directly controlling an HVAC system.

The control-source devices in load control system 100 may include a remote control device 122, an occupancy sensor 110, a daylight sensor 108, and/or a window sensor 120. The control-source devices may send digital messages to associated control-target devices for indirectly controlling an electrical load by transmitting digital messages, such as load control messages, to the control-target devices. The remote control device 122 may send digital messages for controlling a control-target device after actuation of one or more buttons. The occupancy sensor 110 may send digital messages to a control-target device based on an occupancy or vacancy condition (e.g., movement or lack of movement) that is sensed within its observable area. The daylight sensor 108 may send digital messages to a control-target device based on the detection of an amount of light within its observable area. The window sensor 120 may send digital messages to a control-target device based on a measured level of light received from outside of the load control environment 102. For example, the window sensor 120 may detect when sunlight is directly shining into the window sensor 120, is reflected onto the window sensor 120, and/or is blocked by external means, such as clouds or a building. The window sensor 120 may send a digital message indicating the measured light level.

The control-source devices and/or the control-target devices may be in communication with a system controller 150. The system controller 150 may be capable of transmitting digital messages to, and/or receiving digital messages from, control devices (e.g., control-source devices and/or control-target devices). The digital messages may include association information for associating control-source devices and/or control-target devices. The system controller 150 may maintain the association between the control-target device and the control-source device when the system controller is integrated into the load control system. The system controller 150 may maintain the association between devices to enable control of the control-target devices by the associated control-source devices after integration of the system controller 150 into the load control system.

The system controller 150 may facilitate communication of control information from control-source devices to associated control-target devices using the association information. The system controller 150 may be a gateway device, a network bridge device, an access point, and/or the like. Examples of load control systems having system controllers 150 are described in greater detail in commonly-assigned U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, and U.S. Patent Application Publication No. 2015/0185752, published Jul. 2, 2015, entitled WIRELESS LOAD CONTROL SYSTEM, the entire disclosures of which are hereby incorporated by reference.

The control-source devices in load control system 100 may be associated with the control-target devices using various association techniques. For example, in an association procedure, the control-source devices may be associated with the control-target devices by the user 142 actuating a button on the control-source device and/or the control-target device. The actuation of the button on the control-source device and/or the control-target device may place the control-source device and/or the control-target device in an association mode, for example, for being associated with one another. In the association mode, the control-source device may transmit an association message to the control-target device. The association message from a control-source device may include a unique identifier of the control-source device. The control-target device may locally store the unique identifier of the control-source, such that the control-target devices may be capable of recognizing digital messages (e.g., subsequent digital messages) from the control-source device that may include load control instructions. The control-target device may be capable of responding to the digital messages from the associated control-source device by controlling a corresponding electrical load according to the load control instructions received in the digital messages. Examples of load control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and U.S. Pat. No. 8,417,388, issued Apr. 9, 2013, entitled LOAD CONTROL SYSTEM HAVING AN ENERGY SAVINGS MODE, the entire disclosures of which are hereby incorporated by reference.

A user may define, design, layout, and/or configure a load control system (such as the load control system 100) for a load control environment (such as the load control environment 102) using a design system as described herein. For example, a user may use the design system to define a graphical representation of the load control environment (e.g., a room, a floor with one or more rooms, several floors with several rooms, etc.), to define particular electrical devices for the load control system (e.g., electrical loads/fixtures and/or control devices, such as control-source devices and/or control target devices), to select defined electrical devices, to place graphical representations (e.g., icons) of the selected electrical devices within the graphical representation of the load control environment at desired locations within the environment, and to configure selected electrical devices (which may include generating graphical representations of connections (e.g., electrical and/or communication connections) and/or associations between selected electrical devices) to thereby create the load control system.

A user may also use the design system described herein to define particular window treatments, including motorized window treatments (e.g., shades, such as roller shades and/or cellular shades, blinds, such as venetian blinds, draperies, etc.) for the load control system, to select defined window treatments, to place graphical representations (e.g., icons) of the selected window treatments within the graphical representation of the load control environment at desired locations within the environment, and to configure selected window treatments (which may include generating graphical representations of connections and/or associations between selected window treatments and other electrical devices). For description purposes, the design system will be described hereinafter using the term shade or shades to refer to window treatments, but is applicable to other types of window treatments and the use of the term shade or shades is not meant to limit the applicability of the design system. Such a design system may have multiple uses for various types of users of the design system. For example, the graphical representation of the load control environment together with the graphical representation (e.g., icons) of the electrical devices and shades may allow a designer to design and/or layout a load control system and visually convey the resulting design and/or layout to a customer. The design system may generate a list of components (e.g., a bill of materials listing electrical devices, shades, etc.) needed to build the load control system. The graphical representation of the load control system together with the graphical representation of the electrical devices and shades may assist installers/electricians/builders, for example, in installing the actual load control system within the physical/real world load control environment. The connections and/or associations between electrical devices including shades generated by the design system may define the operation of the load control system once the load control system is installed in the physical load control environment and thus assist installers in configuring the load control system once installed. The design system may also generate warnings and errors as a user designs and/or configures a load control system. These are only some example benefits of the design system described herein and one will recognize that the design system need not provide all these benefits and may also provide additional benefits.

The design system described herein may include a design software, which may include computer-based instructions. The design software may include one more software-based modules, including for example, a graphical user interface (GUI) software and a software-based logic engine, which may each include one or more software-based modules. The GUI software may provide a GUI-based interface and/or GUI-based "window(s)" to a user and may allow the user to interact with the design system. The software-based logic engine may provide features of the GUI software and features of the design system in general as described herein, and may further include a database/database system for the storing of design, layout, and/or configuration information, for example, as defined by a user. The design software in whole or in part may reside in one or more computer readable tangible and non-transitory memory devices and may execute from one or more memory devices. Features of the design software may also be provided by firmware and/or hardware in addition to/as an alternative to software-based modules.

The design system may further include one or more computing systems having one or more processors and/or graphic processors that may execute the design software, in addition to other software, such an operating system(s) and/or database management system(s), to provide the features and functions described herein (hereinafter, reference to the design system providing the features and functions described herein may be understood to mean the computing system(s) executing software-based instructions, including the design software, for example, to provide the features and functions described herein). Such computing system(s) may include one or more visual display screen(s)/terminal(s) and/or touch sensitive visual display screen(s) (herein after also referred to as a visual display) for the displaying of information to a user, and may include one or more input/output devices (e.g., a keyboard, a touch sensitive screen, a touch-sensitive pad, a mouse, a trackball, audio speaker, audio receiver, etc.) for the user to interact with/control the design system. The computing system(s) may further include one or more transceivers and/or communication circuits and/or network devices for communicating over wired and/or wireless commination systems/networks. Example computing system(s) may include a personal computer (PC), a laptop, a tablet, a smart phone, etc. The design system may be a standalone system or in other words, a system where the GUI software, logic engine, and database(s)/database management system(s), for example, execute on a single computing system. For example, the computing system may comprise a computing device, such as a computer 144 shown in FIG. 1. The design system may be a distributed system or in other words, a system where the GUI software executes in whole or in part on a first computing system(s), the logic engine executes in whole or in part on another/second computing system(s), and the database(s)/database management system(s) execute in whole or in part on a third computing system(s) with each of the computing systems being networked over a wired and/or wireless communication system/network, and/or some combination thereof. The design system may be a web-based system. The design system may also interface via a communications system/network with one or more other systems (e.g., database(s)/database management system(s)) that may provide, for example, standard electrical devices and shade components that a user may select and thus use to define and thus build/install the actual load control system.

For purposes of description only, user interactions with the design system will be described herein from the perspective of a keyboard and a mouse/mouse cursor (e.g., a pointer), and actuations of one or more mouse buttons (e.g., the user using a mouse to move a cursor over a desired icon/feature of a GUI window and activating the feature/icon through one or more mouse clicks/actuations). Nonetheless, one will recognize that the design system is not limited to user interactions via a keyboard and mouse and a user may interact with the design system in other manners including voice commands, touchscreen, etc. In addition, movement of a mouse pointer, actuation of a mouse buttons and/or key board keys may be viewed as the user entering commands to the design system, and the design system detecting or receiving such commands or indications thereof.

FIGS. 2-16 illustrate an example GUI-based design window 200 that may be displayed on a visual display of the design system by the design software to a user. The design system may allow for the design and configuration of a load control system (e.g., a building control system), such as the load control system 100 shown in FIG. 1. The design software may allow for the creation of a project that may define one or more control devices of the load control system in a building. The design software may display a canvas 202 on which electrical devices (e.g., control devices of the load control system) may be illustrated. A user of the design software may interact with the elements of the software using a cursor 204 (e.g., by manipulating a mouse or other input device to move the cursor). The canvas 202 may display a floorplan (not shown) and the control devices of the load control system may be located at the appropriate locations on the floorplan.

Figure 2:
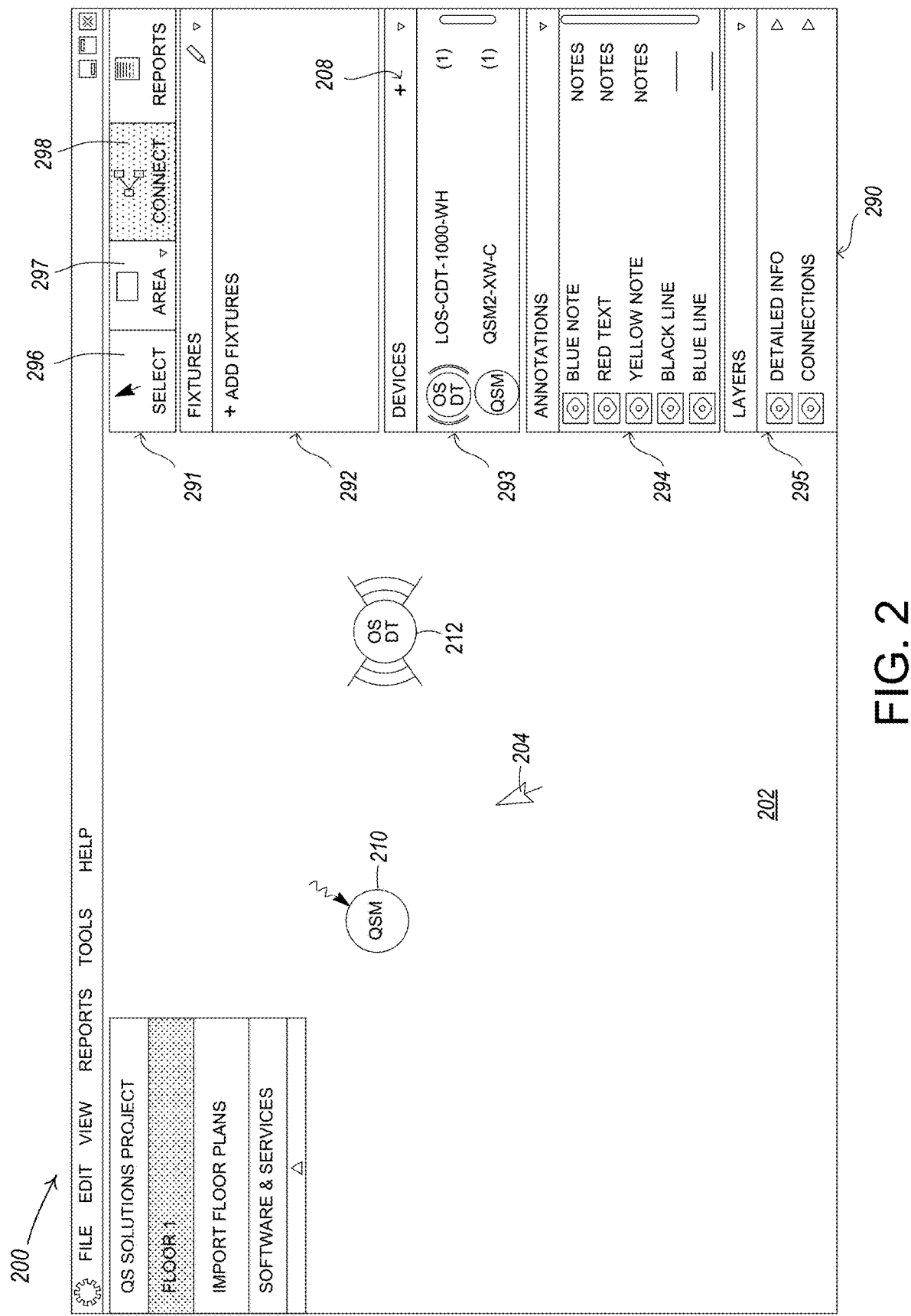
FIGS. 2-16 illustrate example graphical representations of a user interface that may be displayed on a visual display of a network device by a design software, e.g., a graphical user interface (GUI) software, for designing and configuring a load control system (e.g., a building control system).

The design software may display a palette 290 that may be located, for example, to the right of the canvas 202, as shown in FIG. 2. The palette 290 may allow and/or enable a user to define/configure electrical loads and/or fixtures (hereinafter referred to as fixtures), to define and/or configure control devices (hereinafter referred to as devices), and to define/configure as shades. The pallet 204 may also allow the user to select defined fixtures, devices, and shades, and to place graphical representations (hereinafter generally referred to as icons, although other representations may be used) of selected fixtures, devices, and/or shades within canvas 202 for defining a graphical representation of a load control system. The canvas 202 may be a workplace and/or workspace on which a user may define, design, layout, and/or configure a graphical representation of a load control system by placing icons of fixtures, devices, and shades selected from the palette 290, and by further configuring such fixtures, devices, and shades (such configuration may include, for example, generating graphical representations of connections and/or associations between selected fixtures, devices, and shades). Hereinafter, the terms canvas, workplace, and workspace will be used interchangeably refer to canvas 202. In general, the fixtures, devices, and shades placed within the canvas 202 and the configuration thereof may define at least in part a desired load control system for a load control environment. Again, a user may interact with the design window 200 (e.g., define, select, place, and configure fixtures, devices, and shades) using one or more of a mouse, trackball, touch sensitive screen, keyboard, speaker/receiver, etc.

With further reference to the canvas 202, the design system may allow or enable a user to import from a database/database management system, for example, one or more graphical representations of a floor plan(s) of a load control environment (e.g., a reflected ceiling or floor plan of a room, of a floor, of several floors, etc.) for which a load control system is being designed. The floor plan(s) may be a top down view of a room(s) or floor(s) (such as from the ceiling looking down) although other representations may be used. As one example, top down view of a floor plan may be a reflected ceiling view in that fixtures within the room, for example, may be shown on top of/over the floor of the room, or structures within the room, such as tables and desks, etc. Upon selection by the user, the design system may display one or more floor plans selected by the user within the canvas 202. The floor plan(s) may cover all or only part of the canvas 202. The design system may display the floor plan as a background over which a user may define a load control system for the load control environment. In other words, the background may provide a frame of reference for the user to work on. As a user selects fixtures, devices, and shades from palette 290, for example, the user may place the icons representing these selections within the canvas 202 over the displayed floor plan at specific desired locations. The placement of the icons over the floor plan may be viewed as a layout or design in that it may visually show where on a floor plan the fixtures, devices, and shades may need to go once physically installed within a physical/real world load control environment. As indicated, a user may also use the design system to define connections and/or associations between fixtures, devices, and shades. Graphical representations of these connections and/or associations also may be graphically displayed over the background (e.g., through icons depicted as lines). Similarly, the user may define notes and/or annotations and/or the design system may provide warnings, for example, which may also be displayed over the floor plan.

As shown in FIG. 2, the palette 290 may include multiple sections, including a control pane 291, a fixtures pane 292, a devices pane 293, an annotations pane 294, and a layers pane 295, although fewer and/or additional sections may be included. The sections may be individually expanded and contracted, with the fixtures pane 292, the devices pane 293, the annotations pane 294, and the layers pane 295 being shown as contracted. The fixtures pane 292 and the devices pane 293 may allow a user to define and/or configure specific fixtures and load control devices for the load control system, to select instances of defined fixtures and devices, and to place icons representing the selected fixtures and devices within the canvas 202, where the icons represent instances of physical fixtures and devices to be installed within the load control system. For example, the user may add additional control devices to the devices pane 293 by clicking on a button (e.g., an "add devices" button 208) on the devices pane 293. The "add devices" button 208 may be signified by one or more symbols, such as a "+" character. The canvas 202, in addition to defining the components of the load control system as the user places selected icons within the canvas 202, may also show and thereby define the layout of the load control system because the icons may be placed at specific locations within the canvas 202 with respect to a displayed background, for example.

The control pane 291 may include a select control tool 296 that, when the design system determines that the select control tool 296 is activated by a user (e.g., by mouse), may allow a user to select a particular icon(s), for example, within the canvas 202. Once selected, the design system may allow a user to move the icon, redefine features of the fixture, device, or shade that may be represented by the icon, copy the icon to place an addition fixture, device, or shade within the canvas 202, delete the icon, etc.

The control pane 291 may also include an area control tool 297 that, when the design system determines that the area control tool 297 is activated by a user, may allow the user to define and/or draw an area within the canvas 202. An area may be a geometric shape that may allow the user to define a space or room, for example, within a load control environment that is of particular interest to the user. The design system may allow the user to define the size and shape of an area. The shape of an area may include a box or rectangle or oval, although a user may define any shape. The user may use area control tool 297 to define and/or draw a geometric shape within the canvas 202, such as by drawing the shape over a specific area (e.g., a room) of a displayed floor plan. Nonetheless, a floor plan does not necessarily need to be displayed in the canvas 202 to draw an area. Hence, a user may use an area to define a particular space or room within a load control environment (here a conference room).

Once an area(s) is defined through area control tool 297, the design system may allow the user to then define fixtures, devices, and shades, for example, for each area using the fixtures pane 292 and the devices pane 293 by placing icons of selected fixtures and devices within the defined area. In other words, the area control tool 297 may be viewed as a tool to subdivide a load control environment into subspaces or subareas and to then define the load control system on a subspace or subarea perspective. Specifically, once an area is defined (and possibly named by a user) and once selected fixtures and/or devices are placed in the defined area, the design system may associate the defined area and the selected fixtures and devices together such that a user may view and examine the components of the load control system from a per area perspective—for example, what fixtures and/or devices are in a particular room. For ease of viewing, the figures herein may be shown as including a defined area without showing a floor plan background. Again, a floor plan may or may not be shown within the canvas 202, as a user may desire. One will also recognize that once an area is defined, it may be modified or deleted by the user at any time. In addition, a user does not need to define an area for the design system to allow the user to define fixtures and devices. Furthermore, if an area is used, it may be defined first and then fixtures and/or devices defined. Alternatively, fixtures and/or devices may be defined first and then an area defined, or some combination thereof.

The control pane 291 may also include a connect control tool 298 that, when the design system determines that the connect control tool 298 is activated by a user, may allow the user to define and/or generate graphical representations of connections (e.g., electrical and/or communication connections) and/or associations between fixtures, devices, and shades for example, that are defined in the canvas 202 to thereby create the load control system.

Examples of how the design system discussed herein may be used to define and/or configure a load control system using the fixtures pane 292 and the devices pane 293, for example, are described in commonly-assigned U.S. Patent Application Publication No. 2017/0228110, published Aug. 10, 2017, entitled CONFIGURING A LOAD CONTROL SYSTEM, the entire disclosure of which is hereby incorporated by reference.

The palette 290 may include one or more windows (e.g., palettes). The windows (e.g., palettes) may include items that may be added to the canvas 202, such as fixtures (e.g., lighting fixtures), devices (e.g., control devices of the load control system), and/or annotations. For example, a devices pane 293 may display one or more control devices of the load control system, which may be added to the canvas 202. The palette 290 may have a layers pane 295. For example, the layers pane 295 may be provided to allow a user to select one or more layers to show and/or hide pieces of information on the canvas 202.

As shown in FIG. 2, the design software may display one or more icons on the canvas 202. For example, the design software may display a first icon 210 (e.g., representing a first electrical device) and/or a second icon 212 (e.g., representing a second electrical device) on the canvas 202. The first electrical device may be a control-target device, such as a sensor module or a load control device, and/or the second electrical device may be a control-source device, such as an occupancy sensor. The first electrical device may be an electrical load, such as a lighting load. The second electrical device may be a load control device, such as a dimmer switch for controlling the electrical load.

The user may create (e.g., define) a relationship between the first electrical device and the second electrical device. For example, the relationship may define an electrical connection (e.g., a physical electrical connection, such as power wiring) between the first and second electrical devices, and/or an association between the first and second electrical devices (e.g., a control relationship, such as an association between wireless control devices). The relationship may be stored in an association table or dataset (e.g., in the computer 144 and/or the system controller 150). The relationship table or dataset may include an identifier (e.g., a unique identifier) of devices in the load control system. The relationship table or dataset may also, or alternatively, include an identifier (e.g., unique identifier) of the relationships of the devices. The identifier (e.g., unique identifier) of devices in the load control system may correspond to the identifier (e.g., unique identifier) of the relationships of the devices. The relationship information in the relationship table or dataset, including the unique identifiers, may be uploaded to the control-source devices, control-target devices, system controller, etc., for enabling control of electrical loads and/or communications (e.g., load control communications) between the related devices.

Figure 3:
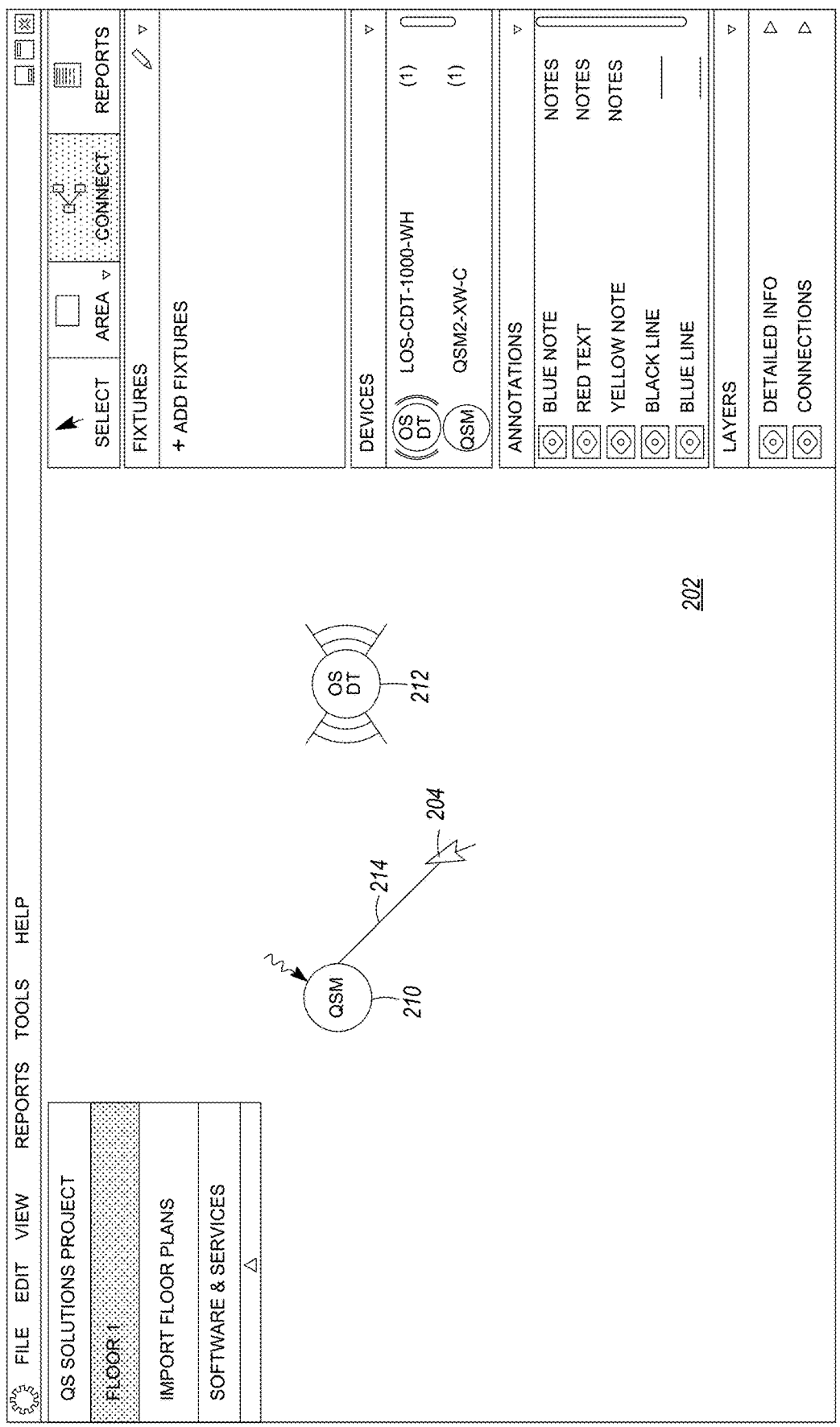

The user may make a relationship (e.g., a connection or an association) between the first electrical device and the second electrical device by drawing a line between the first electrical device (e.g., the first icon 210) and the second electrical device (e.g., the second icon 212) on the canvas 202. The user may select the first icon 210 with the cursor 204 (e.g., by actuating a button on the mouse). The user may select the first icon 210 with the cursor 204, for example, to cause the design software to generate a line 214 (e.g., a straight line) on the canvas 202 that may begin at the first icon 210 (e.g., at a first end of the line) and that may end at the cursor 204 (e.g., at a second end of the line), as shown in FIG. 3. The first end of the line 214 may remain anchored at the first icon 210 and/or the second end of the line 214 may move around. For example, the second end of the line 214 may move around as the cursor 204 moves around the canvas 202. The user may select the second icon 212 with the cursor 204 (e.g., by actuating a button on the mouse) to create a relationship between the first electrical device (e.g., the first icon 210) and the second electrical device (e.g., the second icon 212).

Figure 4:
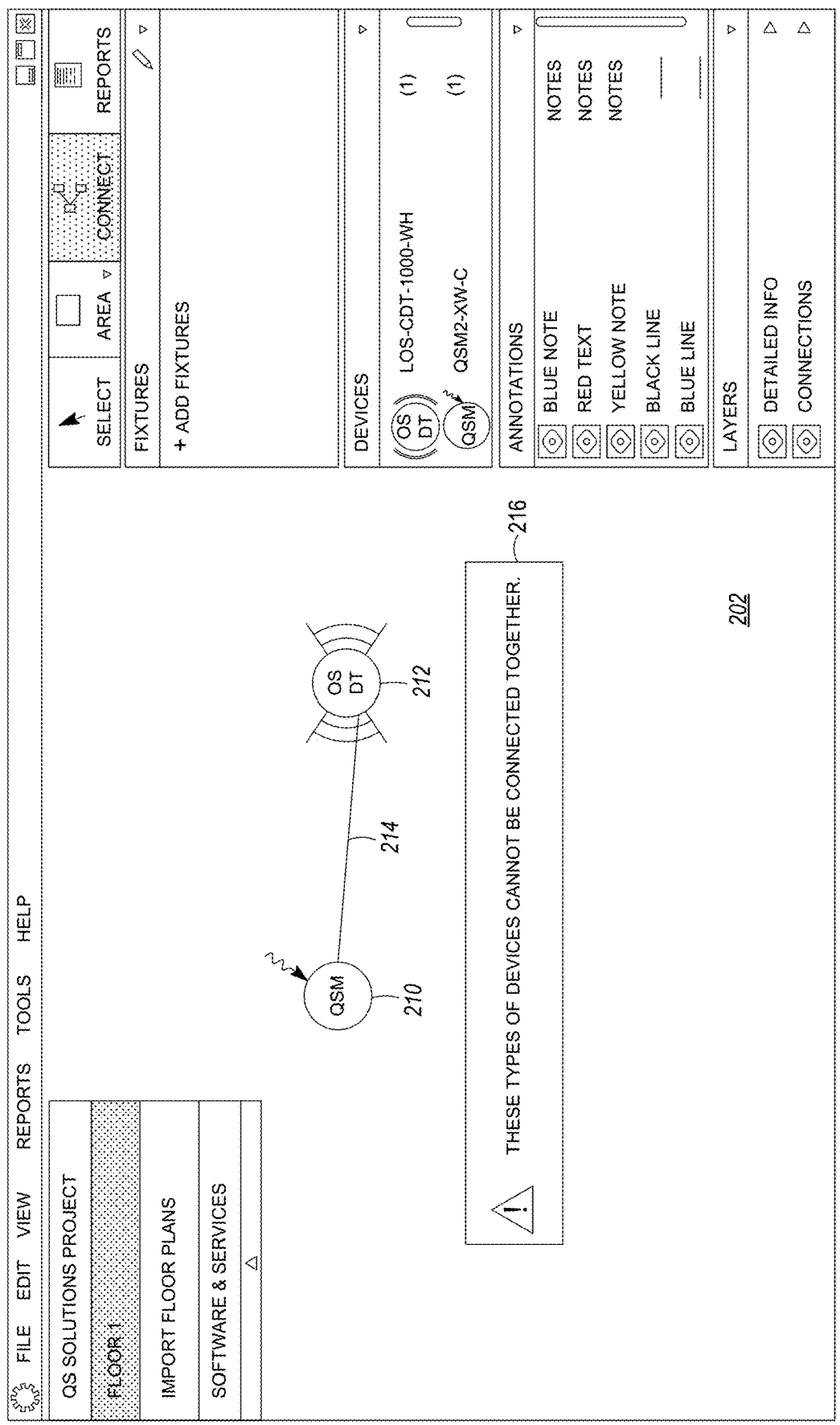

The design software may display a warning window 216 informing the user of an error, as shown in FIG. 4. For example, the design software may display a warning window 216 informing the user of the error, if electrical devices (e.g., the first electrical device and the second electrical device) are not compatible to work together during normal operation of the load control system. For example, the electrical devices may not be connectable to one another. The design software may display a warning window 216 informing the user of the error if the electrical devices cannot be connected to one another. The electrical devices may not be connectable to one another if the first electrical device has a power requirement that is incompatible with the second electrical device, if the first electrical device and the second electrical device use different communication links (e.g., the first electrical device uses a wired communication link and the second electrical device uses a wireless communication link), and/or if the first electrical device has software that is incompatible with the second electrical device. The electrical devices may not be connectable to one another if the number of devices to be connected to one another has been exceeded.

Figure 5:
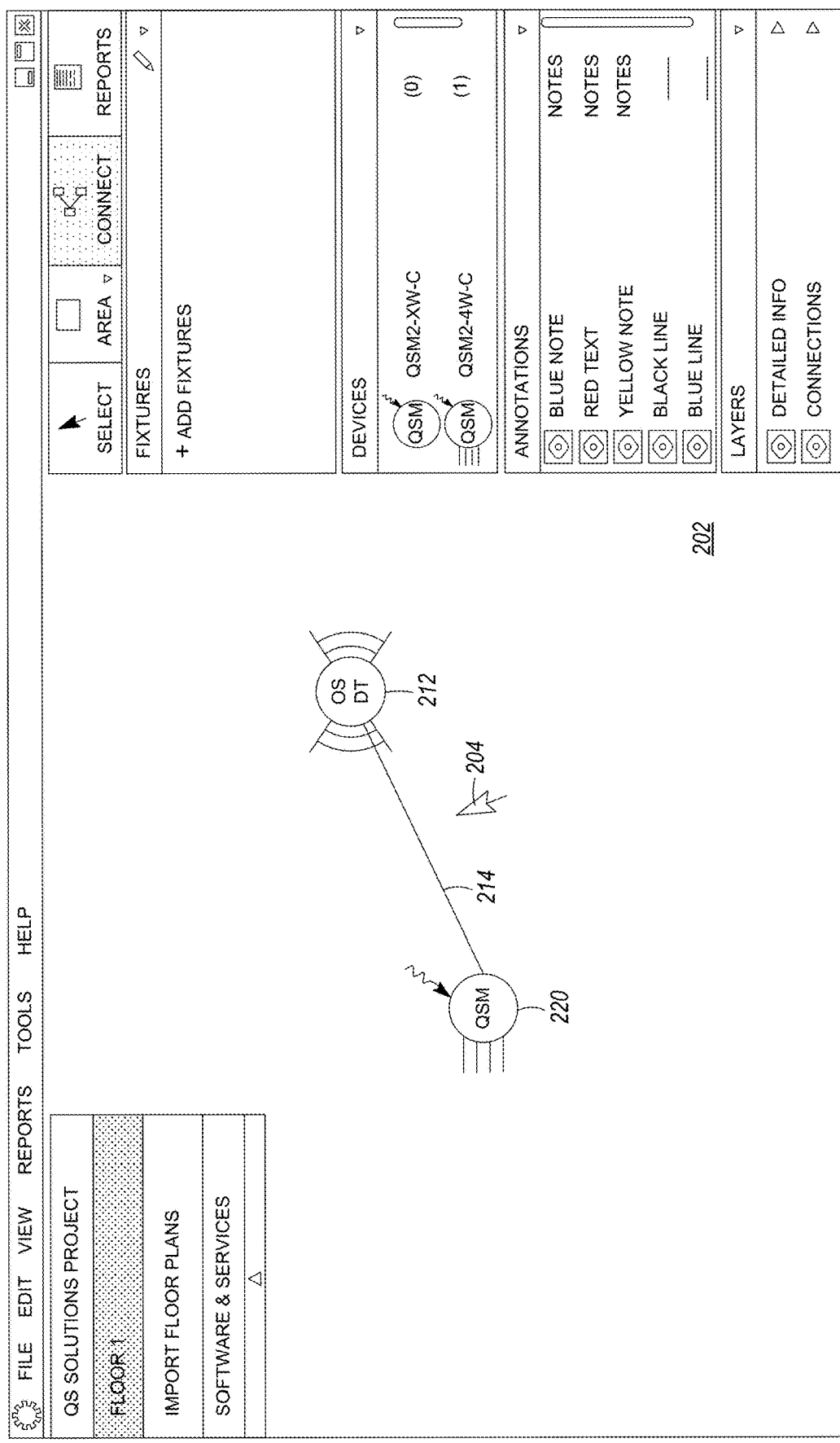

As shown in FIG. 5, the second electrical device (e.g., represented by the second icon 212) may be compatible with a third electrical device. The third electrical device may be represented by a third icon 220. When the user selects the third icon 220 with the cursor 204, the line 214 may be fixed (e.g., secured) between the second icon 212 and the third icon 220. The line 214 may change color after becoming fixed between icons. For example, the line 214 may change color after becoming fixed between the second icon 212 and the third icon 220. After the line 214 is fixed between the icons, the design software may create a relationship between the electrical devices that are represented by the icons. For example, after the line 214 is fixed between the second icon 212 and the third icon 220, the design software may create a relationship between the second electrical device and the third electrical device. The second electrical device may be represented by the second icon 212 and the third electrical device may be represented by the third icon 220, respectively.

Figure 6:
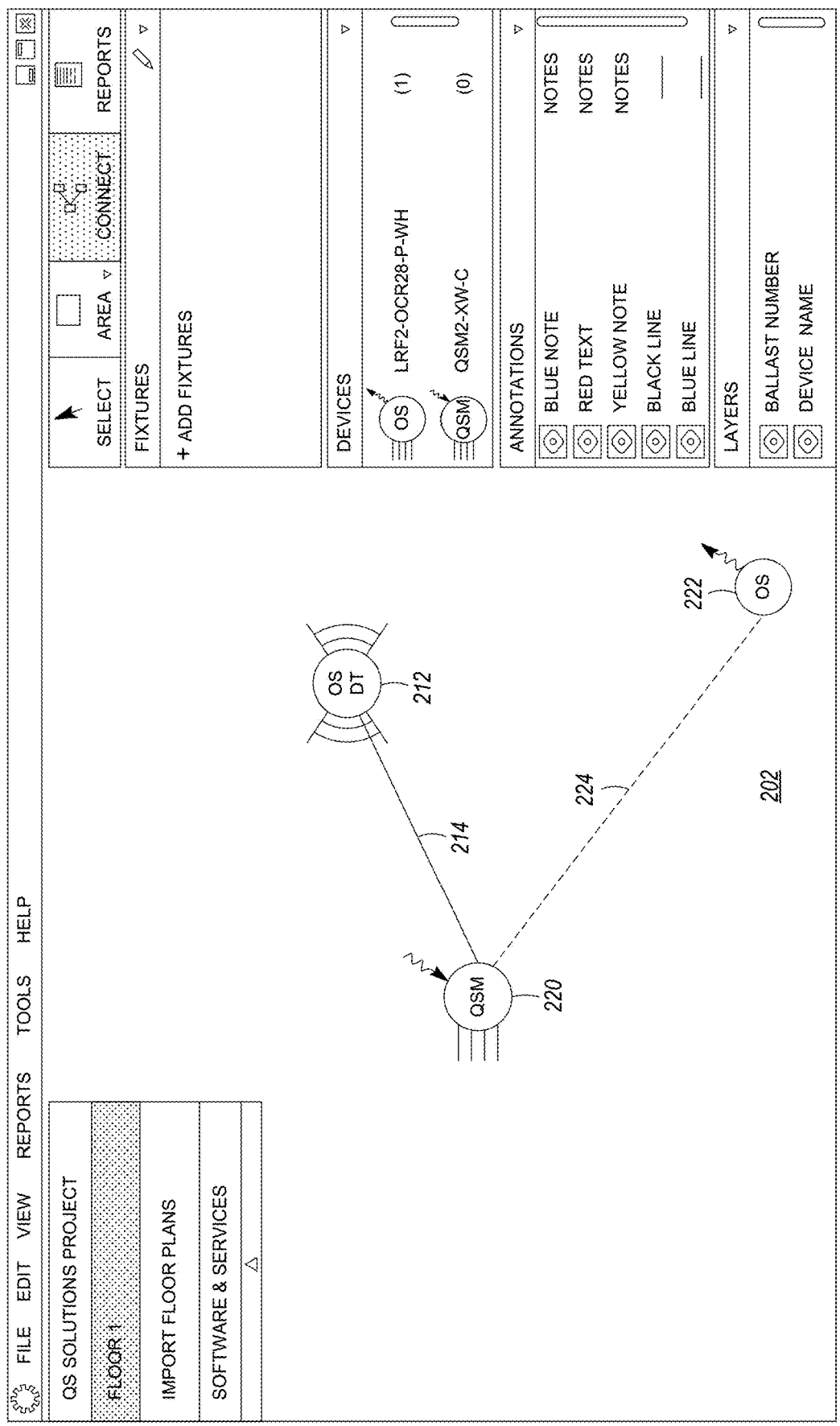

The third electrical device may be related to (e.g., associated with) a fourth electrical device (e.g., represented by a fourth icon 222). For example, the third electrical device may be associated with a fourth electrical device (e.g., represented by a fourth icon 222) in response to the user drawing a line 224 between the third icon 220 and the fourth icon 222, as shown in FIG. 6. The lines connecting electrical devices (e.g., lines 214, 224) may define relationships between respective electrical devices. The lines 214, 224 defining the relationships between the electrical devices may represent types of electrical connections. For example, the lines defining the associations between the electrical devices may represent load wiring, wired analog or digital communication links, wireless communication links, etc. The lines 214, 224 defining the relationships between the electrical devices may represent types of electrical connections according to the line type of the respective line. For example, as shown in FIG. 6, the line 214 between the second icon 212 and the third icon 220 may be solid to represent a wired communication link. The line 224 between the third icon 220 and the fourth icon 222 may be dashed, for example, to represent a wireless communication link (e.g., an association between wireless control devices).

Figure 7:
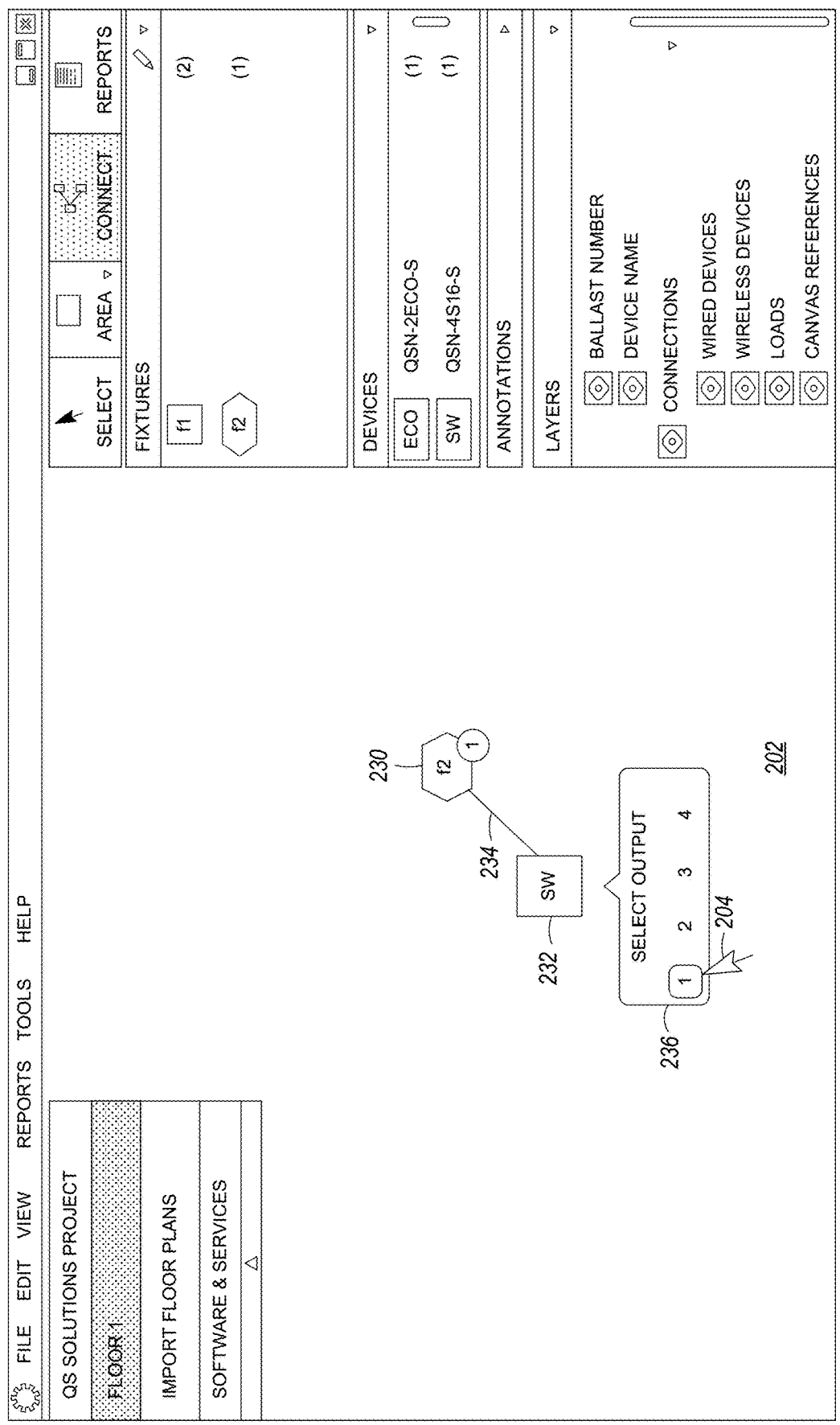

As shown in FIG. 7, a fifth electrical device (e.g., an electrical load) represented by a fifth icon 230 may be connected to one or more outputs of a sixth electrical device (e.g., a load control device, such as a multiple-zone switching module) represented by a sixth icon 232. For example, the user may draw a line 234 from a fifth icon 230 (e.g., representing the fifth electrical device) to a sixth icon 232 (e.g., representing the sixth electrical device).

An output-selection window may be displayed when the user selects an icon. For example, when the user selects the sixth icon 232 with the cursor 204, an output-selection window 236 may be displayed next to the sixth icon 232. The user may select one of the outputs of the sixth electrical device (e.g., represented by the sixth icon 232) with the cursor 204. The line 234 may change color when the user selects one of the outputs of the sixth electrical device (e.g., represented by the sixth icon 232). The line 234 may change color, for example, to indicate different states of line connections. For example, the line 234 may be black when the user is attempting to make a connection with line 234. The color of the line 234 may change from black to another color when the connection from line 234 is made. For example, the color of the line 234 may change when a connection with line 234 is confirmed. The color of the line 234 may change to indicate different communication links. For example, the color of the line 234 may be different for wired and wireless communication links. The design software may create a relationship (e.g., an association) between the fifth electrical device and the selected output of the sixth electrical device. For example, the design software may create an association between the fifth electrical device and the selected output of the sixth electrical device when the user selects one of the outputs of the sixth electrical device.

Figure 8:
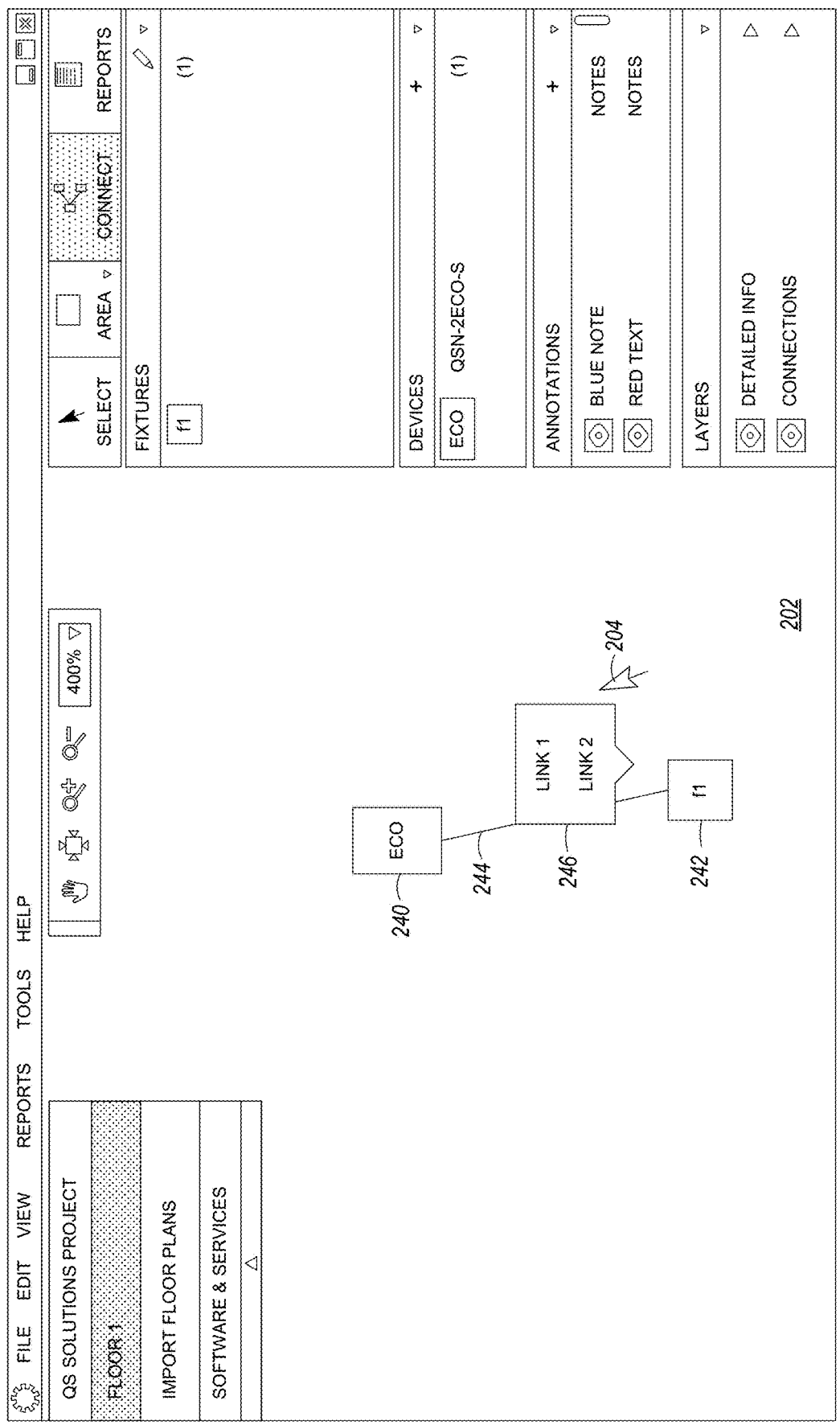
Figure 9:
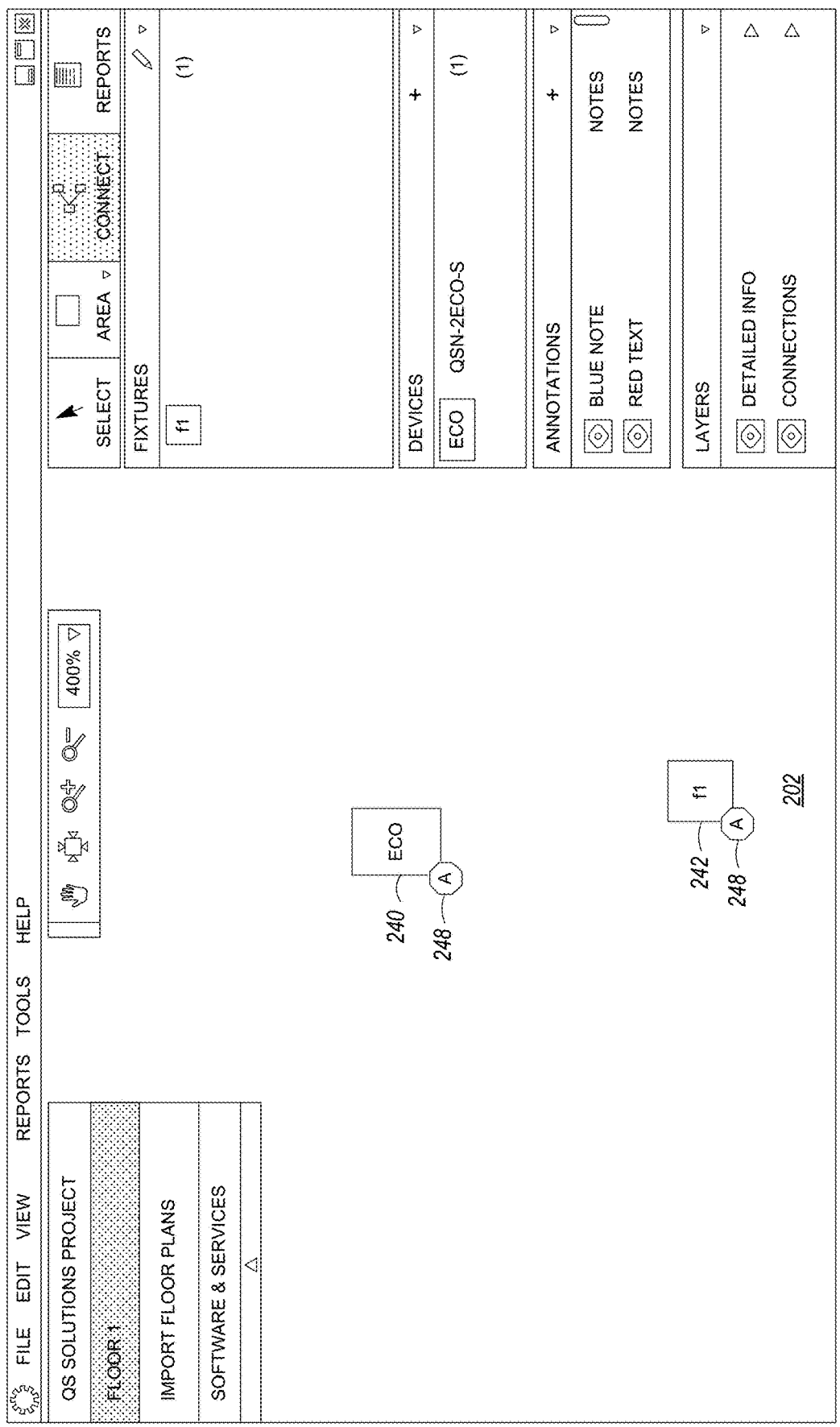

As shown in FIGS. 8 and 9, a seventh electrical device (e.g., digital bus supply device) represented by a seventh icon 240 may be connected to an eighth electrical device (e.g., a load control device, such as a light-emitting diode (LED) driver) represented by an eighth icon 242. The seventh electrical device may be connected to the eighth electrical device via a wired digital communication link. One or more LED drivers may be connected to the digital communication link. For example, one or more LED drivers may be connected to the digital communication link in any order. For example, the position that the LED drivers are wired along the digital communication link may be organized in a certain manner or may be organized in a random order.

The user may create a connection between the seventh icon 240 (e.g., representing the seventh electrical device) and the eighth icon 242 (e.g., representing the eighth electrical device) by drawing a line 244 between the seventh icon 240 and the eighth icon 242, as shown in FIG. 8. After the user connects the seventh icon 240 and the eighth icon 242 (e.g., with the line 244), a link-selection window 246 may be displayed. For example, the link-selection window 246 may be displayed next to the line 244. The link-selection window 246 may allow the user to select one or more wired digital communication links that may be connected to the seventh electrical device. After the user selects one or more of the wired digital communication links from the links-selection window 246, the design software may stop generating and/or displaying the line 244 between the seventh icon 240 and the eighth icon 242, as shown in FIG. 9.

The design software may display a badge 248 on one or more icons. For example, the design software may display a badge 248 having a notation (e.g., the letter A) on one or more icons. As an example, the design software may display a badge 248 having an identical notation (e.g., the letter A) on the seventh icon 240 and the eighth icon 242, to indicate that a connection exists between the seventh electrical device and the eighth electrical device. A badge may be provided, for example, when the connection order of the devices is less important or unimportant. For example, a badge may be provided when the connection between drivers may be connected on the digital communication link in any order. The badges may be displayed to provide a more efficient use of display space on the user interface. As connections between devices increase on the display, the representation of the connections may become confusing. The badges may occupy less display space and may provide for an organized and efficient identification of connections.

As shown in FIGS. 10-13, a relationship (e.g., an association) may be made between one or more devices located on one or more floors (e.g., floor plans) or canvases. The one or more devices may be located on a same floor, and/or the devices may be located on different floors. For example, the one or more devices may be located on one or more floors of a building in which the load control system may be installed. A single floor may be shown on a canvas and/or multiple floors may be shown on a canvas.

Figure 10:
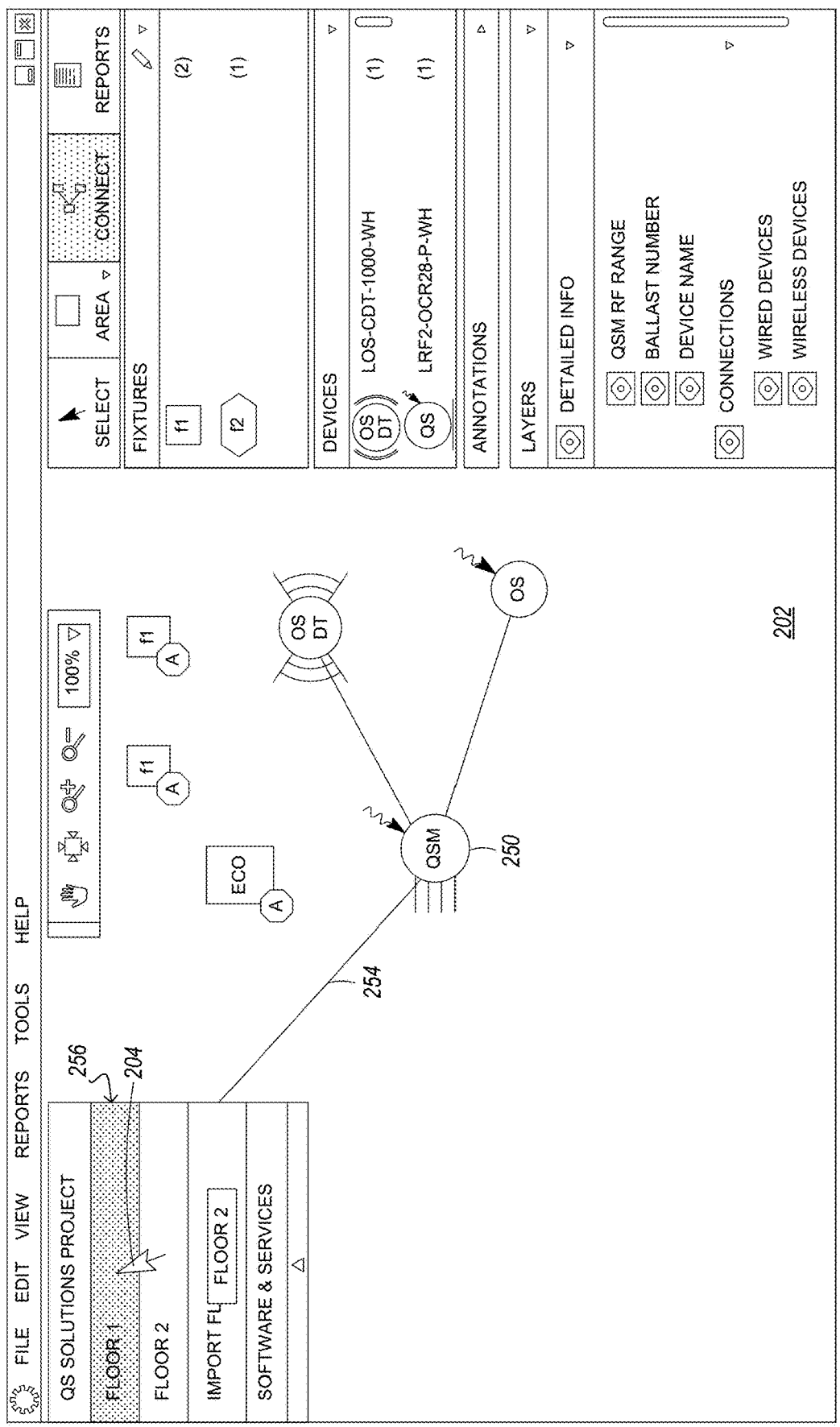
Figure 11:
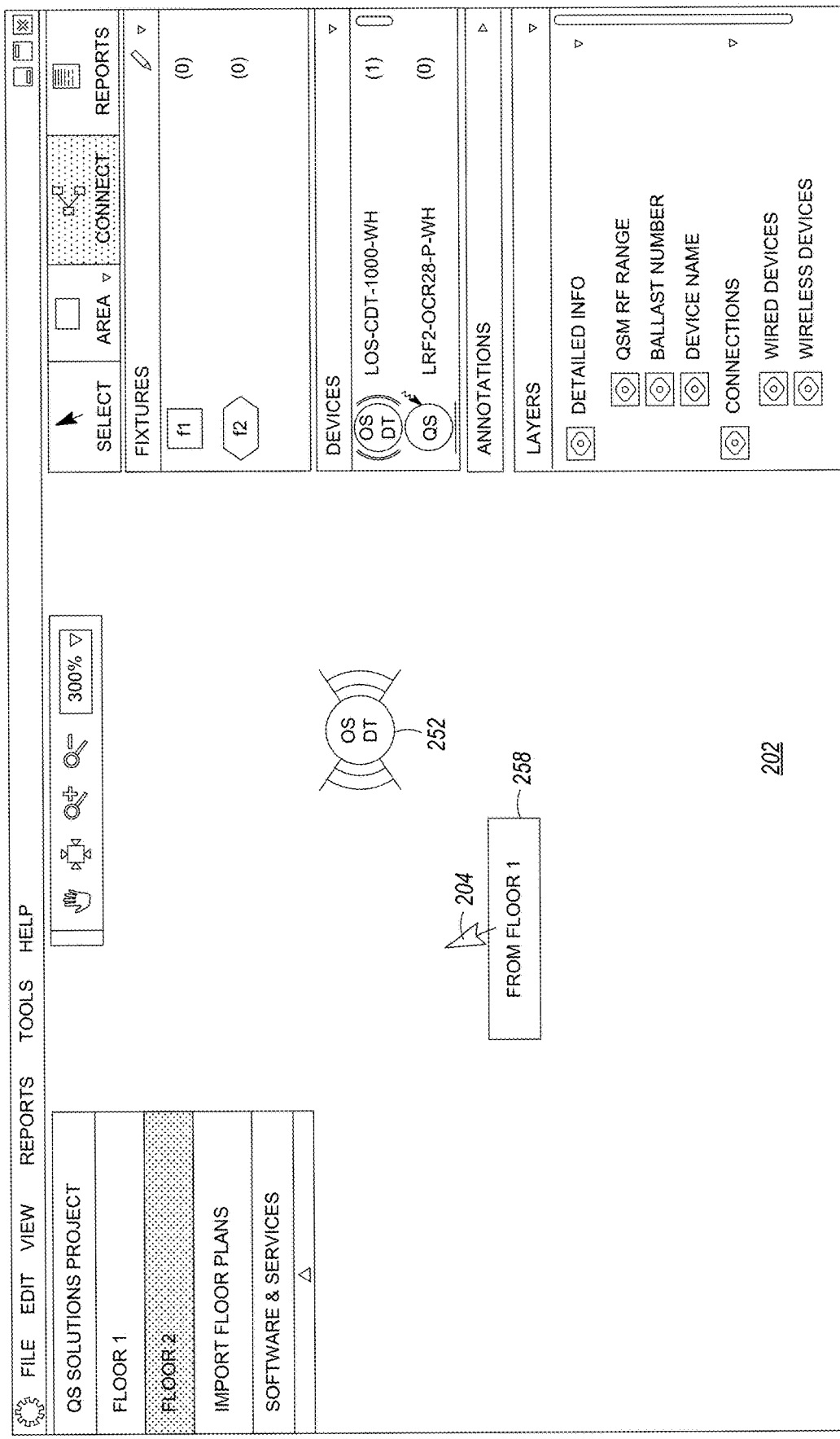
Figure 12:
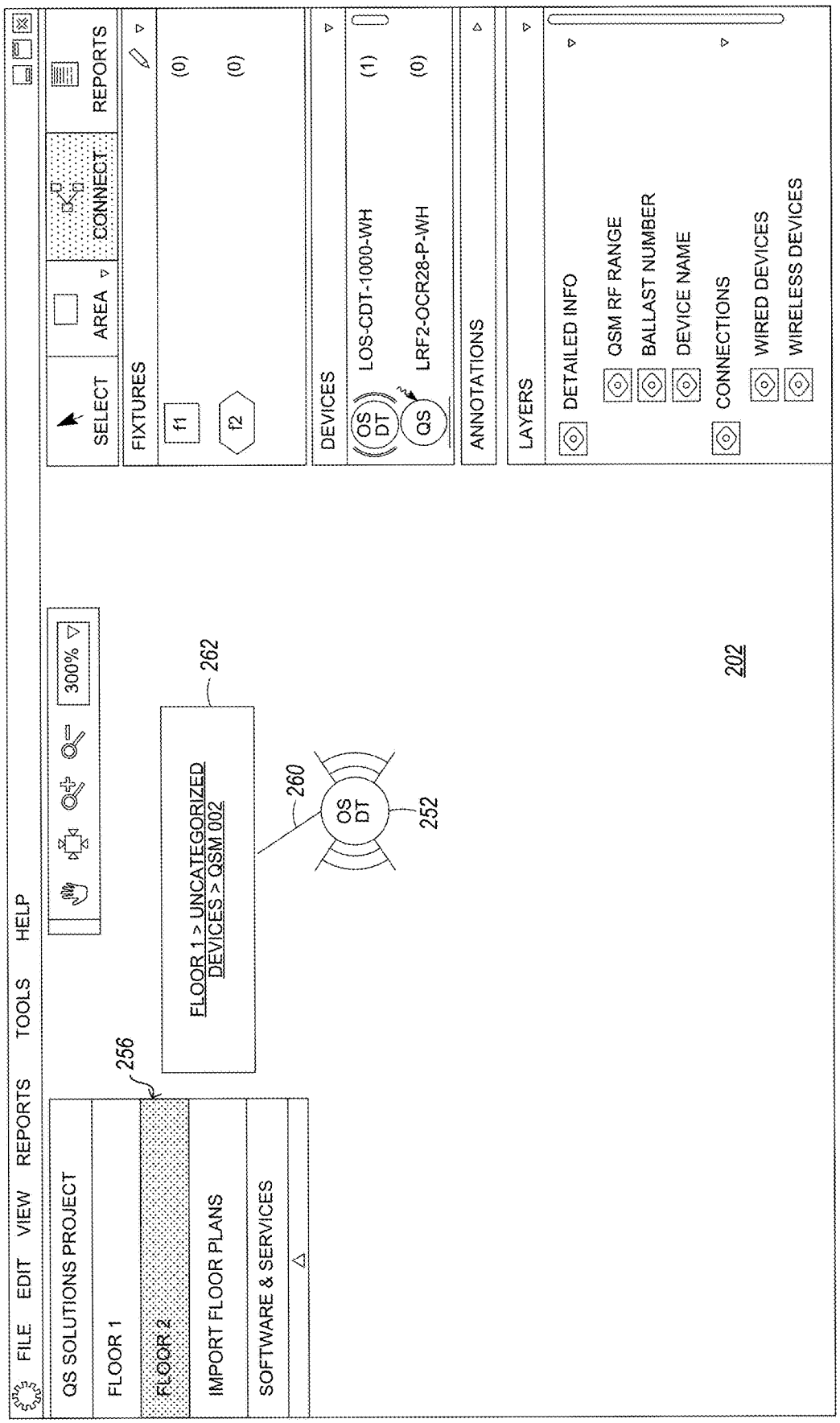

For example, an association (e.g., represented by line 254) may be made between a ninth electrical device (e.g., represented by the ninth icon 250) located on a first floor, as shown in FIG. 10, and a tenth electrical device (e.g., represented by the tenth icon 252) located on a second floor, as shown in FIG. 11. The user may select a ninth icon 250 (e.g., representing the ninth electrical device) and the design software may generate a line 254 extending from the ninth icon to the cursor 204. The cursor 204 may be positioned upon a floor window 256. The user may select a specific floor from the floor window 256, as shown in FIG. 10. After the user selects a specific floor (e.g., the second floor) from the floor window 256, the design software may display a tenth icon 252 representing the tenth electrical device, as shown in FIG. 11. The design software may display a floor cursor box 258 below the cursor 204 to indicate the floor on which the ninth electrical device is located. After the user selects the tenth icon 252, the design software may generate a line 260 between the tenth icon 252 and a floor indicator box 262. Line 260 may indicate the connection (e.g., fixed connection) between the tenth icon 252 and the ninth electrical device (e.g., represented by the ninth icon 250). Line 260 may also, or alternatively, indicate the connection (e.g., fixed connection) between the tenth icon 252 and the floor on which the ninth electrical device is located, as shown in FIG. 12.

Figure 13:
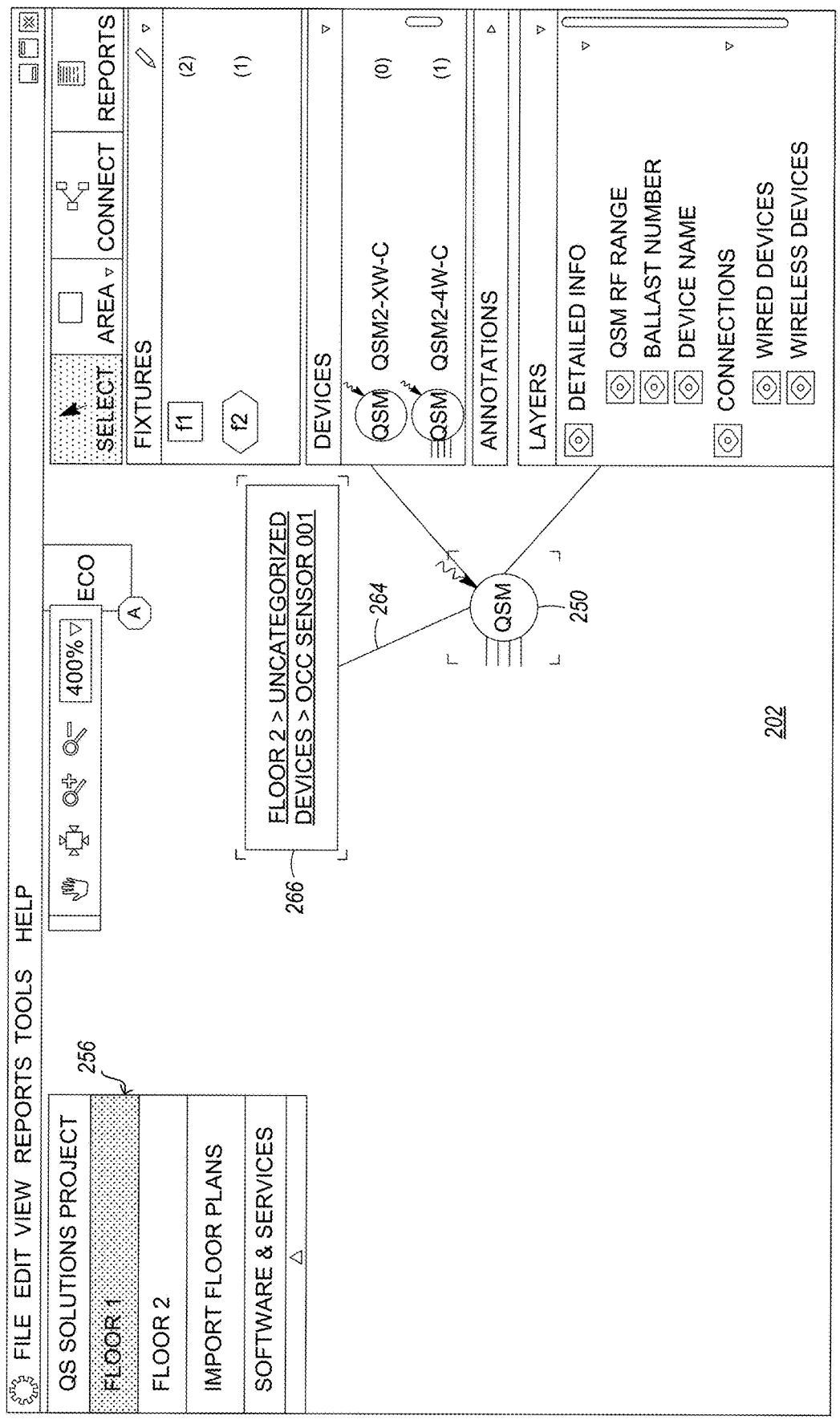

The floor indicator box 262 may include a link to redirect the user to the floor (e.g., floor plan) and/or the canvas being indicated. As shown in FIG. 13, the user may select the first floor from the floor window 256 to display the ninth icon 250. After the user makes the connection between the ninth electrical device (e.g., represented by the ninth icon 250) and the tenth electrical device (e.g., represented by the tenth icon 252), the design software may generate a line 264 between the ninth icon 250 and a floor indicator box 266 that may indicate the floor on which the tenth electrical device is located. The floor indicator box 266 may include a link to redirect the user to the floor being indicated.

Figure 14:
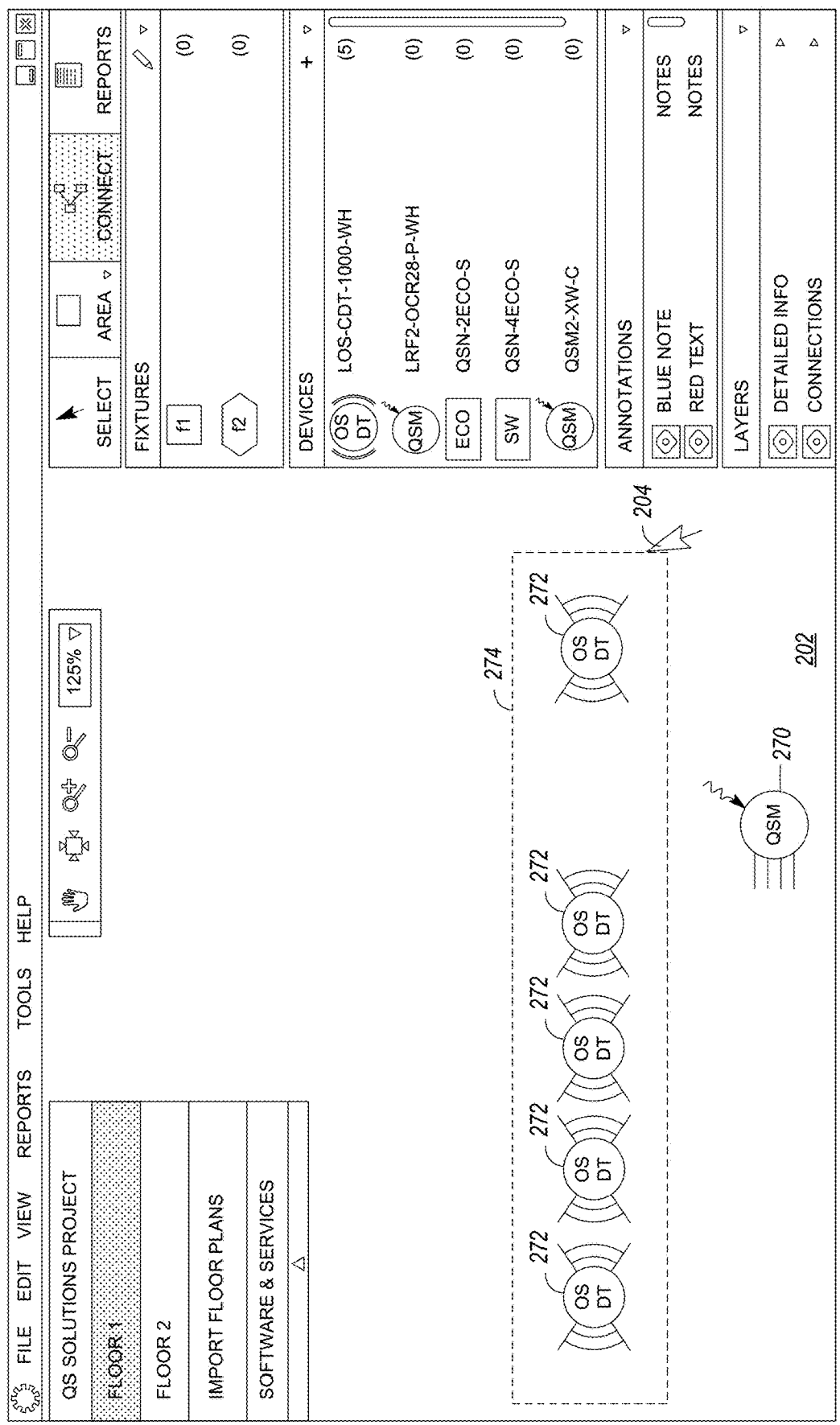
Figure 15:
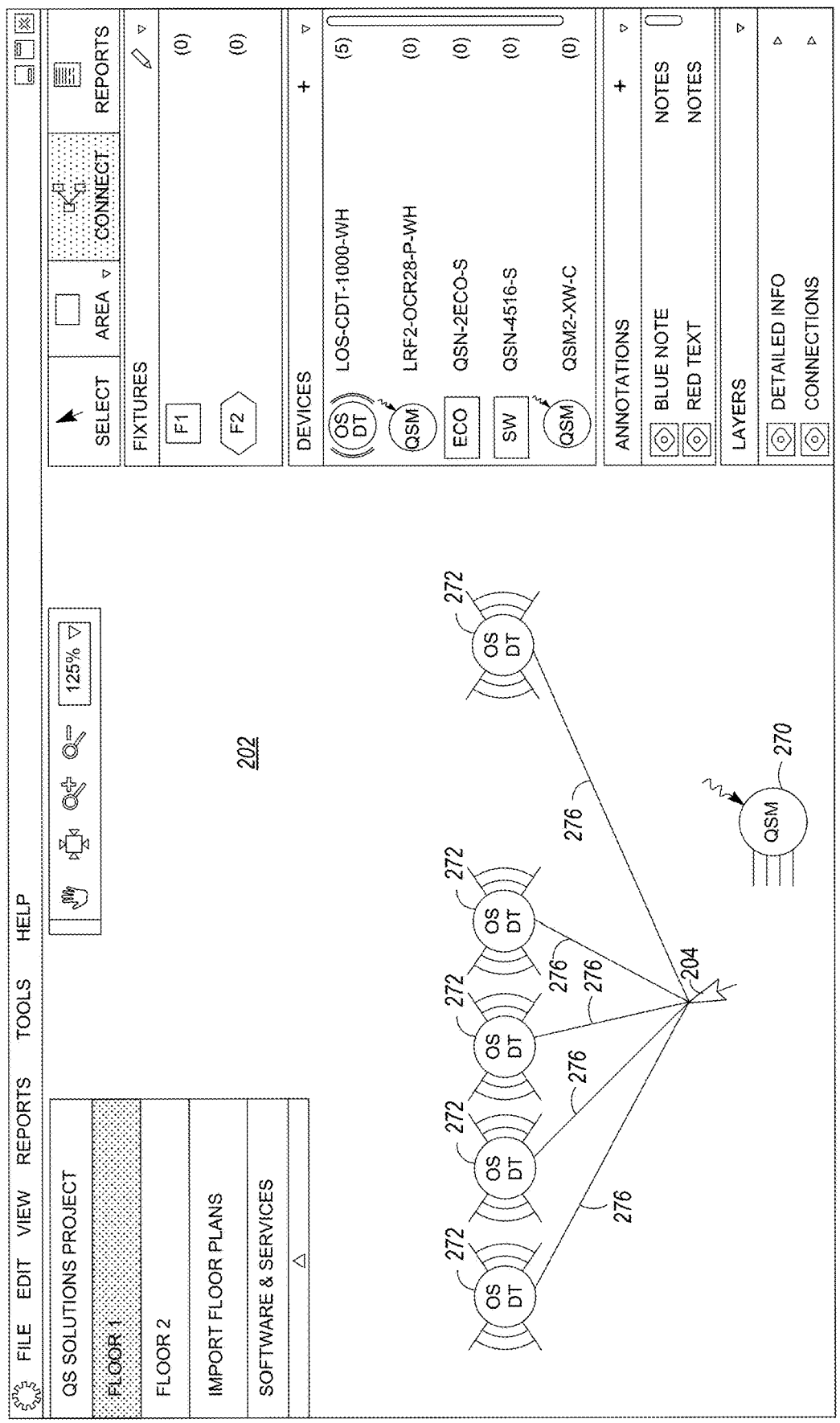
Figure 16:
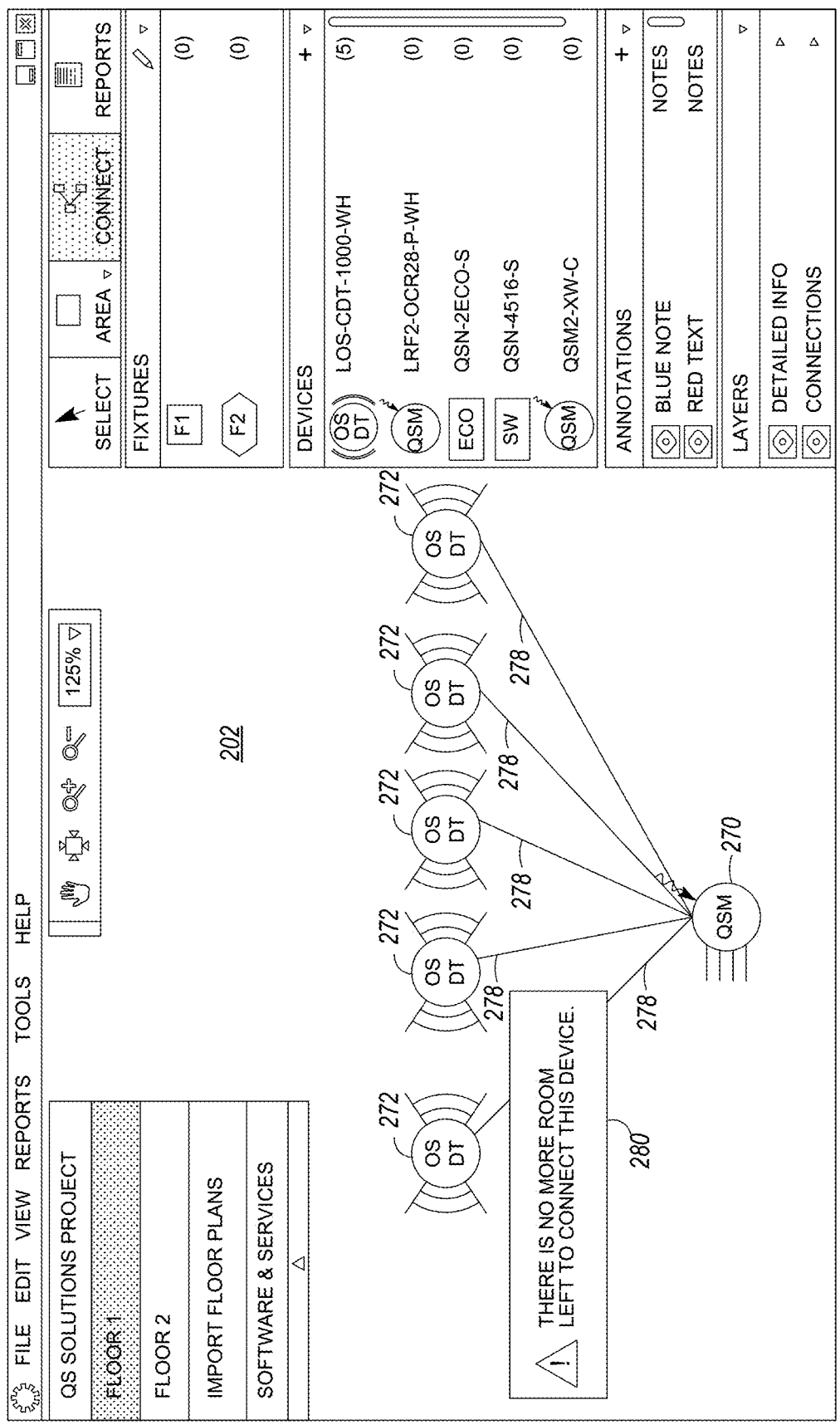

As shown in FIGS. 14-16, an electrical device may be related to (e.g., associated with) one or more other electrical devices. For example, an electrical device may be associated with one or more other electrical devices at one time. The user may select one or more of icons 272 (e.g., representing one or more electrical devices) by dragging the cursor 204 to generate a selection box 274 surrounding the icons 272, as shown in FIG. 14. The design software may generate one or more lines connecting an electrical device with one or more other electrical devices. For example, as shown in FIG. 15, the design software may generate lines 276 that connect to (e.g., begin at) one or more of the icons 272 representing one or more of the electrical devices. The lines 276 may connect to (e.g., end at) the cursor 204, as shown in FIG. 15. The user may select an icon 270 representing an electrical device with the cursor 204 to create an association between the electrical device represented by the icon 270 and one or more of the electrical devices represented by the icon 272.

The electrical device represented by the icon 270 may be capable of being connected to and/or associated with one or more devices that may be less than, or equal to, the number of electrical devices represented by the icons 272. For example, the electrical device represented by the icon 270 may be capable of being related to (e.g., connected to and/or associated with) one or more devices that may be less than, or equal to, the number of electrical devices selected by the selection box 274. The design software may create associations between the electrical device represented by the icon 270 and a subset of the plurality of electrical devices, as shown in FIG. 16. The design software may generate lines (e.g., fixed lines 278) between the icon 270 representing the electrical device and the icons 272 representing the subset of the plurality of electrical devices (e.g., four electrical devices as shown in FIG. 16). The design software may generate and/or omit a line between the icon 270 representing the electrical device and an icon 272 representing a fifth one of the plurality of electrical devices.

The design software may display a warning window 280 indicating an error condition, as shown in FIG. 16. For example, the design software may display a warning window 280 informing the user of an error if one or more of the electrical devices (e.g., represented by icons 272) are not compatible to work with an electrical device (e.g., represented by icon 270) during normal operation of the load control system. The design software may display a warning window 280 informing the user of the error if the electrical device (e.g., represented by icon 270) cannot be connected to one or more of the electrical devices (e.g., represented by icon 272). The electrical devices may not be connectable to one another, for example, if a maximum number of devices connectable to a device has been met. For example, additional electrical devices may not be connectable to an electrical device (e.g., represented by icon 270) if the maximum number of devices connectable to the electrical device (e.g., represented by icon 270) has been met. The electrical devices may not be connectable to one another, for example, if the electrical device (e.g., represented by icon 270) has a power requirement that is incompatible with one or more of the electrical devices (e.g., represented by icon 272). The electrical devices may not be connectable to one another if the electrical device (e.g., represented by icon 270) and the plurality of electrical devices (e.g., represented by icon 272) use different communication links. For example, the electrical devices may not be connectable to one another if the electrical device uses a wired communication link and the plurality of electrical device uses a wireless communication link. The electrical devices may not be connectable to one another if the electrical device (e.g., represented by icon 272) has software that is incompatible with the plurality of electrical devices (e.g., represented by icon 272), etc. The design software may not generate a line between the plurality of electrical devices (e.g., represented by icons 272) and the electrical device (e.g., represented by icon 270), for example, if the plurality of electrical devices are not compatible to work with the electrical device and/or if the electrical device cannot be connected to one or more of the plurality of electrical devices.

Electrical devices that are coupled together (e.g., via a wired digital communication link) and/or that communicate with one another may be grouped together in zones. For example, electrical devices that are coupled together (e.g., via a wired digital communication link) and/or that communicate with one another may be grouped together in zones to be controlled together in response to a control-source device (e.g., the remote control device 122, the occupancy sensor 110, the daylight sensor 108, and/or the window sensor 120 shown in FIG. 1). For example, the seventh and eighth electrical devices of FIGS. 8 and 9 may be grouped together in zones to be controlled together in response to a control-source device.

Figure 17:
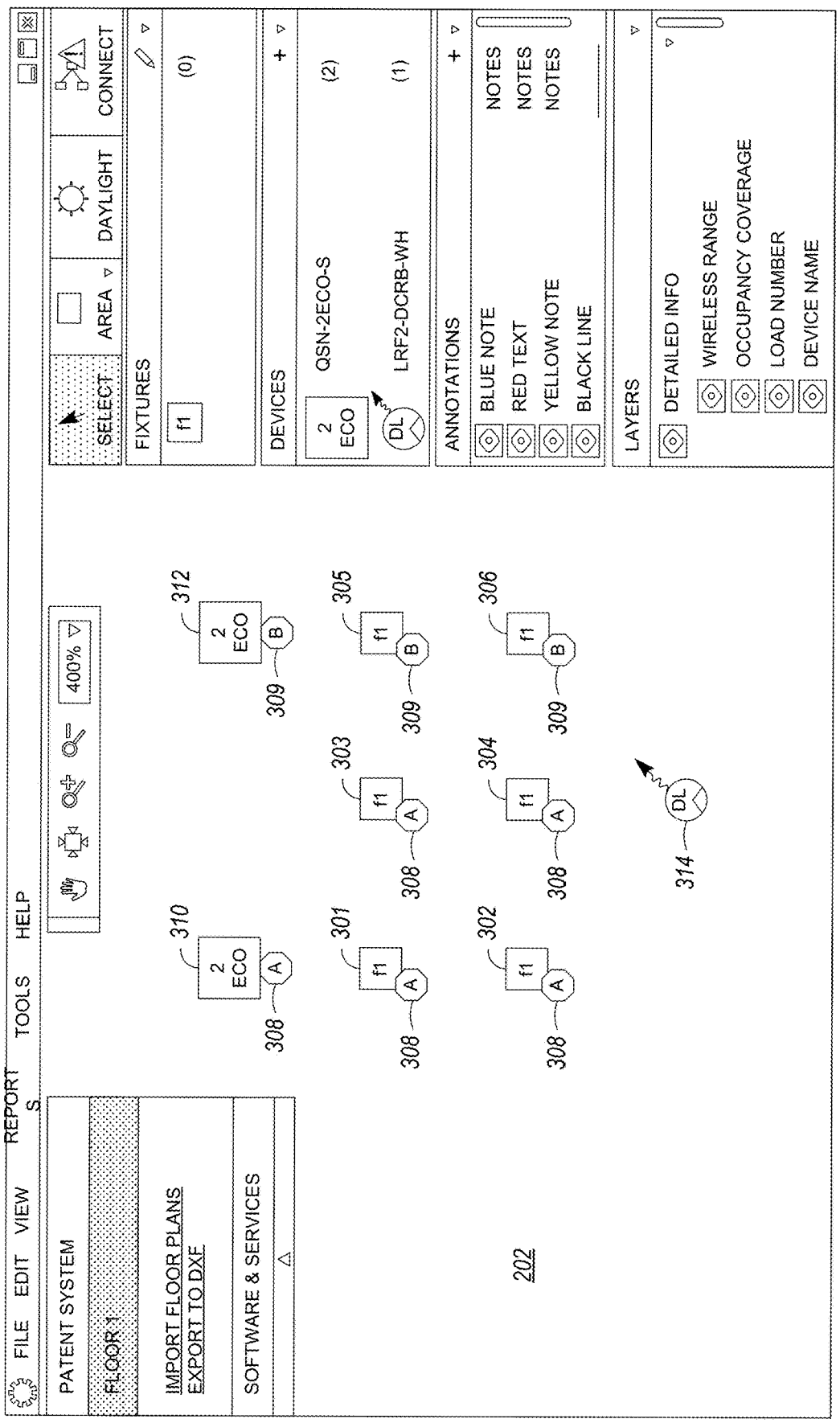
FIGS. 17-29 illustrate example graphical representations of a user interface that may be displayed on the visual display of the network device by the design software for grouping together (e.g., into one or more zones) the control-target devices of the load control system.

FIGS. 17-28 illustrate example graphical representations of a user interface that may be displayed on the visual display of the network device by the design software for grouping together (e.g., grouping together into one or more zones) the control-target devices of the load control system. The control devices may be grouped together independent of whether the control devices are coupled to a wired digital communication link. The control devices may be grouped together independent of which wired digital communication link the control devices may be coupled to. For example, as shown in FIG. 17, the canvas 202 may show icons 301-306 representing control-target devices (e.g., LED drivers in lighting fixtures). Four of the LED drivers (e.g., represented by icons 301-304) may be coupled to a first digital communication link of a first digital bus supply device that is represented by an icon 310 (e.g., as indicated by badges 308). Two of the LED drivers (e.g., as represented by icons 305-306) may be coupled to a second digital communication link of a second digital bus supply device that is represented by an icon 312 (e.g., as indicated by badges 309).

The icons 301-304 (and the corresponding badges 308) of the LED drivers coupled to the first digital communication link may be a first color, and the icons 305-306 (and the corresponding badges 309) of the LED drivers coupled to the second digital communication link may be a second color. For example, as shown in FIG. 17, the icons 301-304 (and the corresponding badges 308) of the LED drivers coupled to the first digital communication link may be green, and the icons 305-306 (and the corresponding badges 309) of the LED drivers coupled to the second digital communication link may be red. The use of one or more colors and/or patterns may be used to visually indicate to the user that the LED drivers are connected to one or more digital communication links. The canvas 202 may show an icon 314, for example, representing a daylight sensor.

Figure 18:
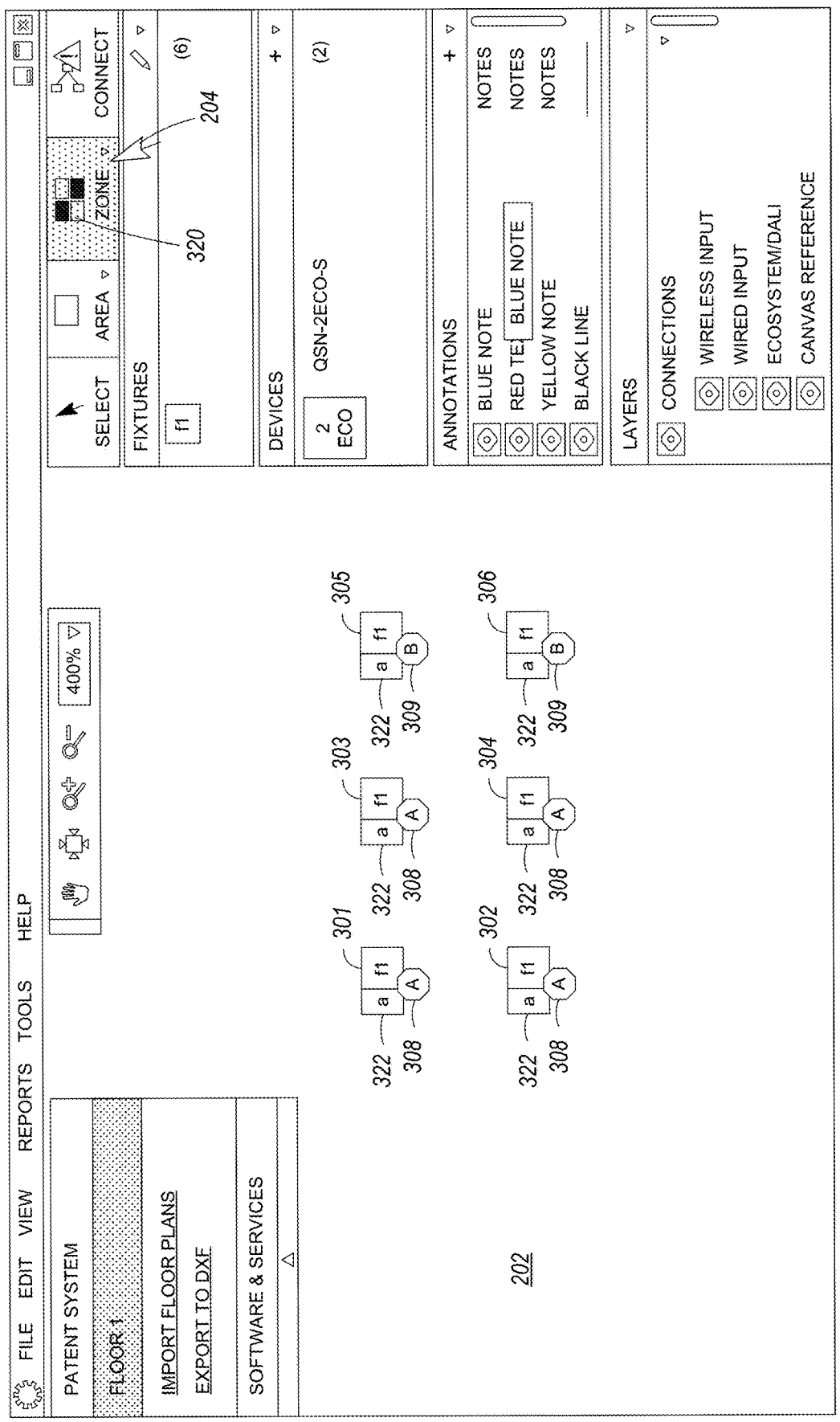

As shown in FIG. 18, the user may select a zone button 320 with the cursor 204 (e.g., by actuating a button on the mouse). Selecting the zone button 320 may cause the design software to change to a zone assignment mode. In a zone assignment mode, icons may be appended with a zone assignment indicator. For example, in the zone assignment mode, one or more of the icons 301-306 of the LED drivers may be appended with a zone assignment indicator 322. The LED drivers may be assigned to a same zone (e.g., as indicated by an "a" in FIG. 18). For example, the LED drivers may be assigned to a same zone by default. The zone assignment indicators 322 may be one or more colors. For example, the zone assignment indicators 322 may be the same color when the LED drivers are assigned to the same zone. In the zone assignment mode, the icons 301-306 of the LED drivers (e.g., portions of the icons other than the zone assignment indicators 322) may be adjusted to a neutral color (e.g., gray). The icons 301-306 of the LED drivers may be adjusted to a neutral color to de-emphasize the digital communication links to which the LED drivers may be coupled. The icons 310, 312 representing the digital bus supply devices and/or the icon 314 representing the daylight sensor shown in FIG. 17 may be faded out and/or removed from the canvas 202, as shown in FIG. 18.

Figure 19:
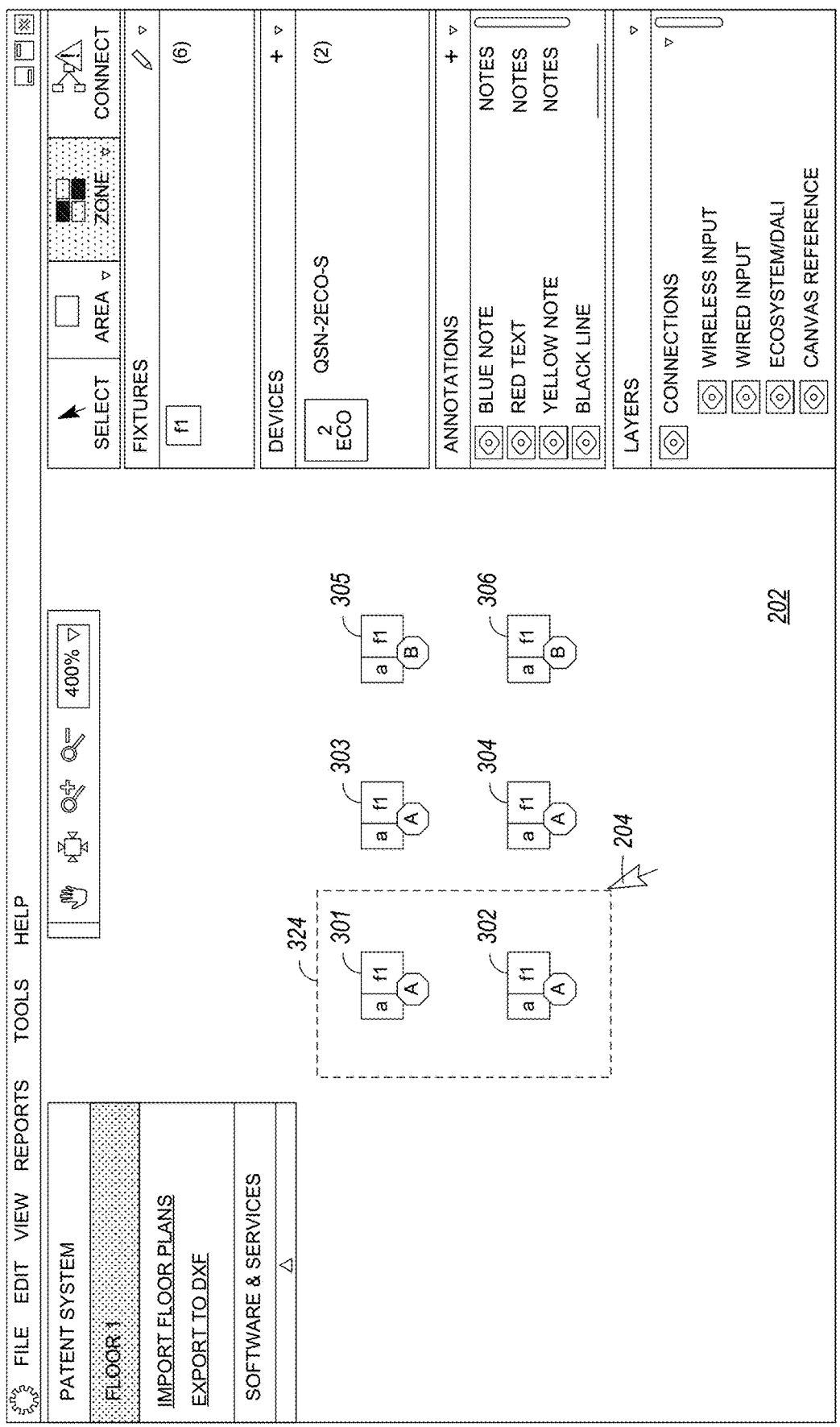
Figure 20:
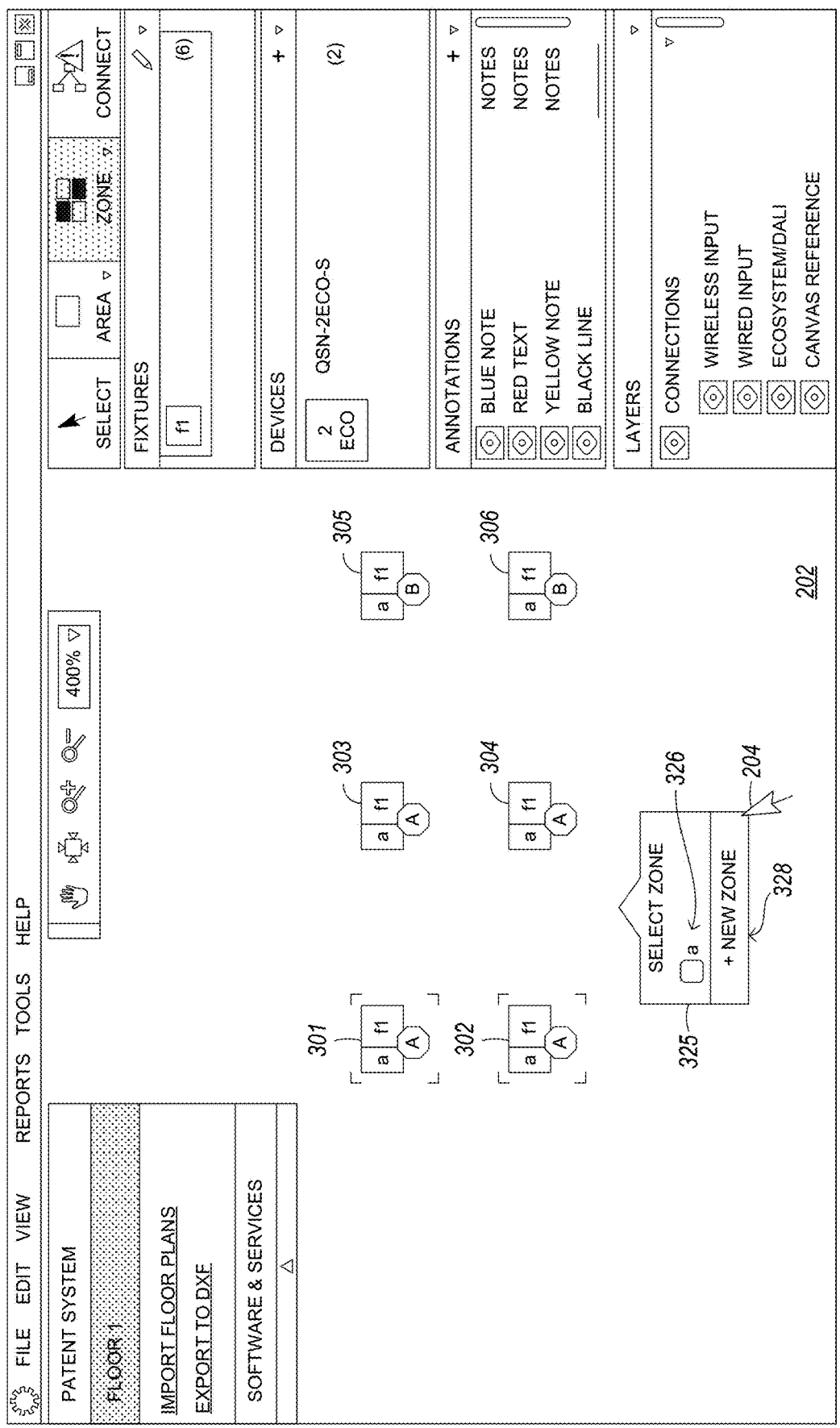
Figure 21:
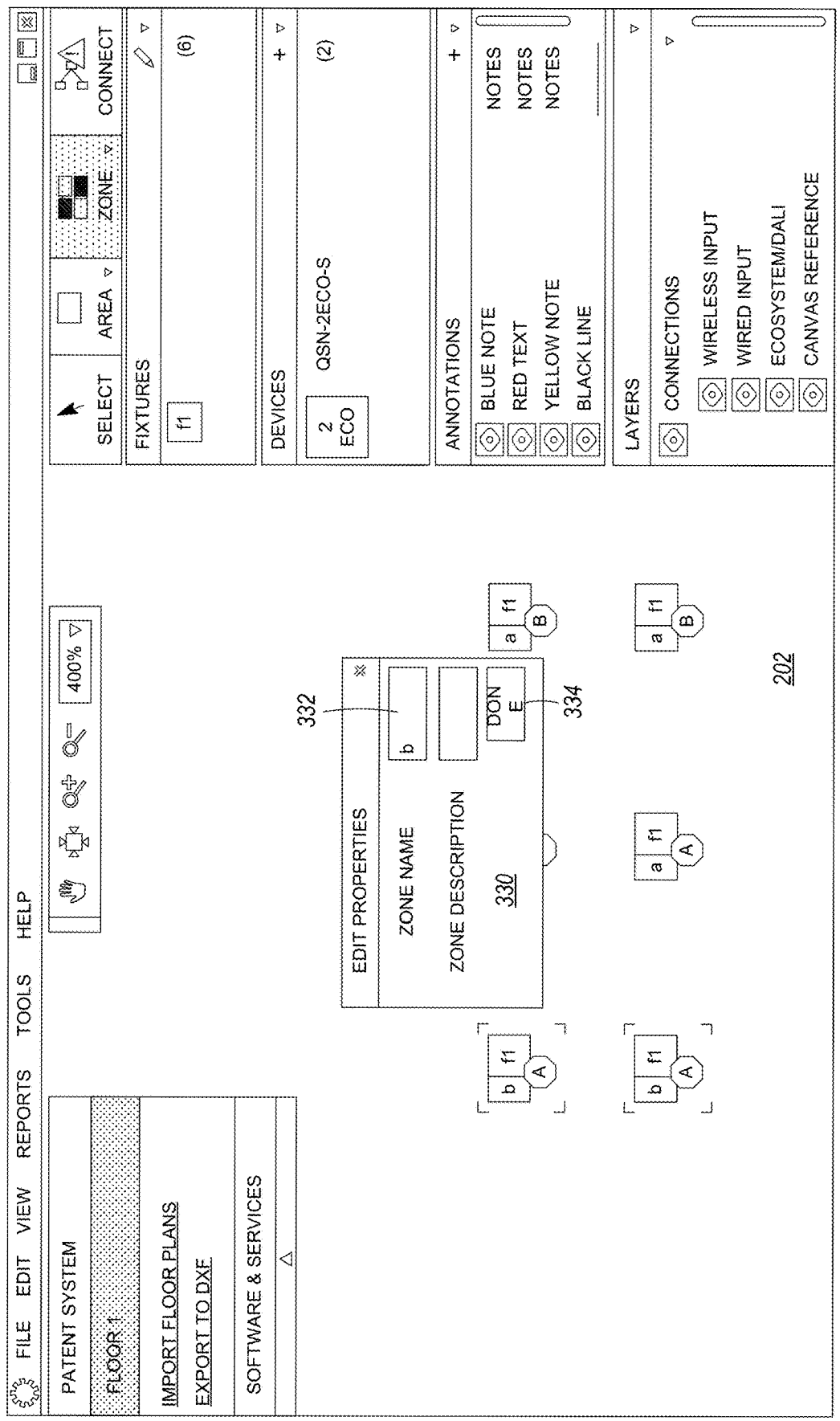
Figure 22:
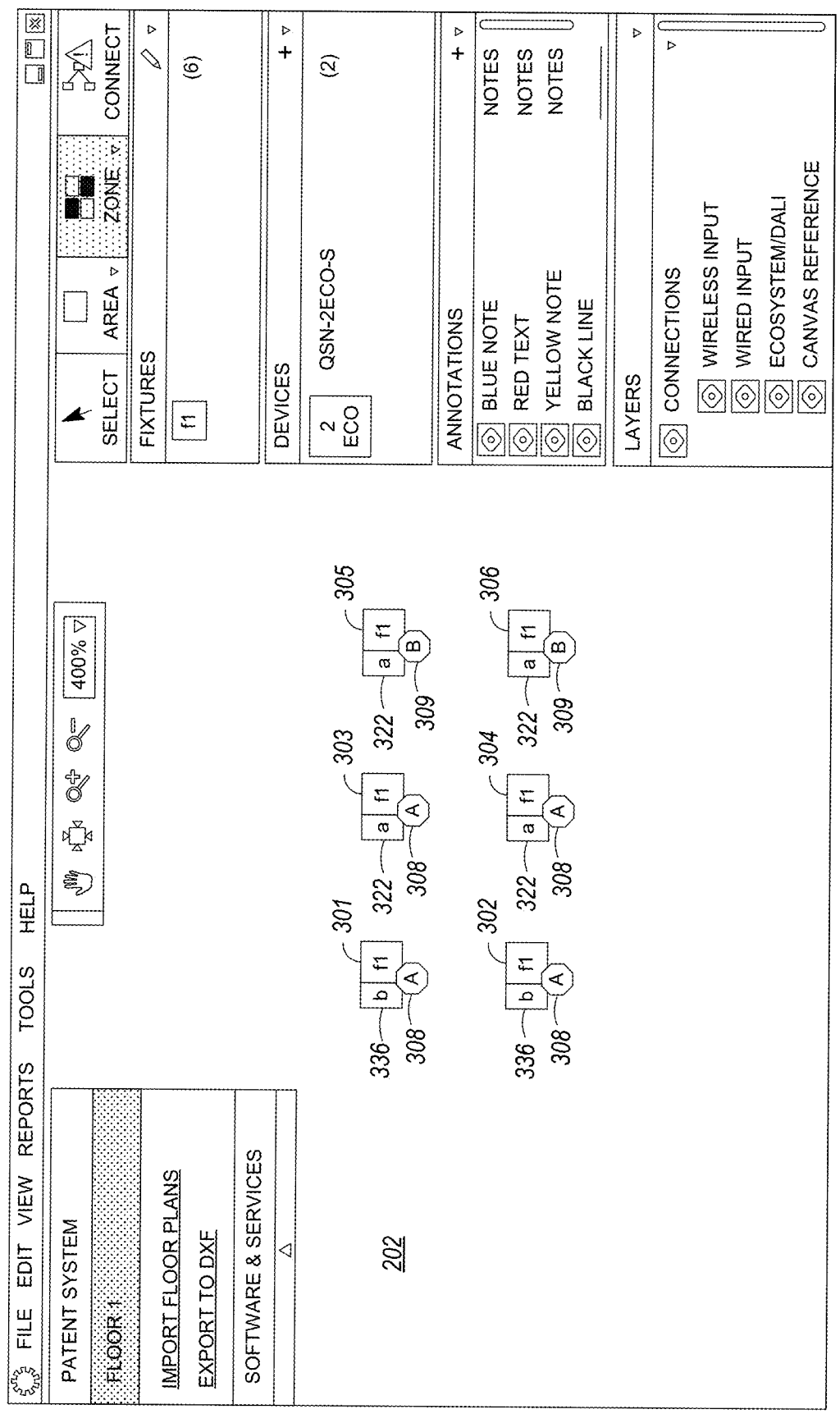

The user may assign the LED drivers represented by the icons 301-306 to one or more zones. For example, as shown in FIG. 19, the user may select one or more of the icons 301-306 by dragging the cursor 204 to generate a selection box 324 surrounding the icons (e.g., icons 301, 302). As shown in FIG. 20, after selecting the icons 301, 302, the design software may display a zone selection window 325. The user may select a zone from a list 326 of zones in the zone selection window 325 (e.g., zone "a," as shown in FIG. 20) or select a "new zone" option 328 to assign the selected LED drivers to a new zone. The design software may display a zone name window 330, as shown in FIG. 21. For example, in response to a selection of the "new zone" option 328 in the zone selection window 325, the design software may display a zone name window 330, as shown in FIG. 21. The design software may display a zone name window 330 to allow the new zone name to be entered into a zone name field 332 (e.g., "b" as shown in FIG. 21). The new zone name entered into the zone name field 332 may be assigned by selecting a button (e.g., a "Done" button 334). As shown in FIG. 22, the icons 301, 302 of the LED drivers assigned to the new zone may be appended with different zone assignment indicators 336 (e.g., indicated by "b"). The zone assignment indicators 336 of the icons 301, 302 may be a same color, and/or a different color, than the zone assignment indicators 322 of the icons 303-306.

Figure 23:
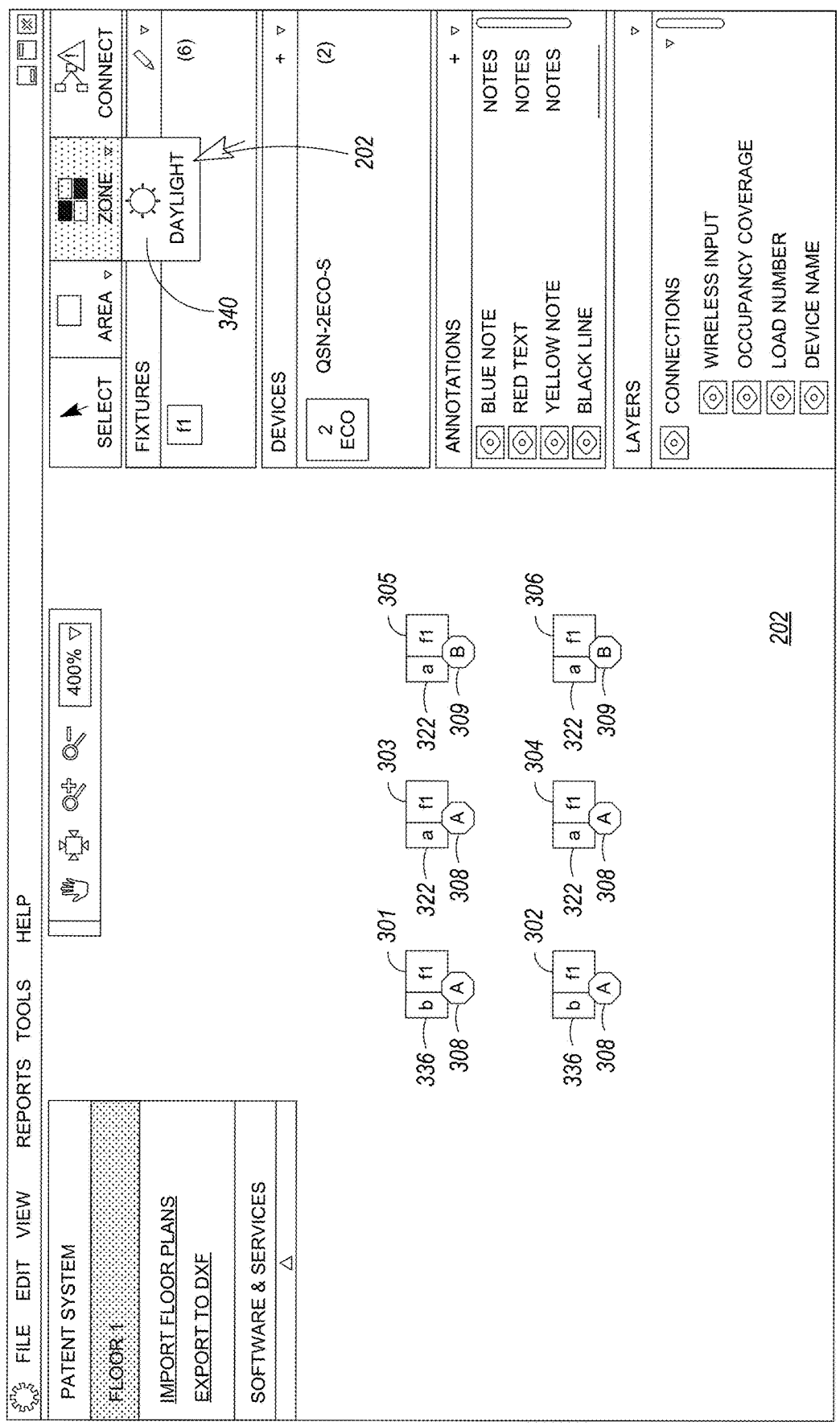
Figure 24:
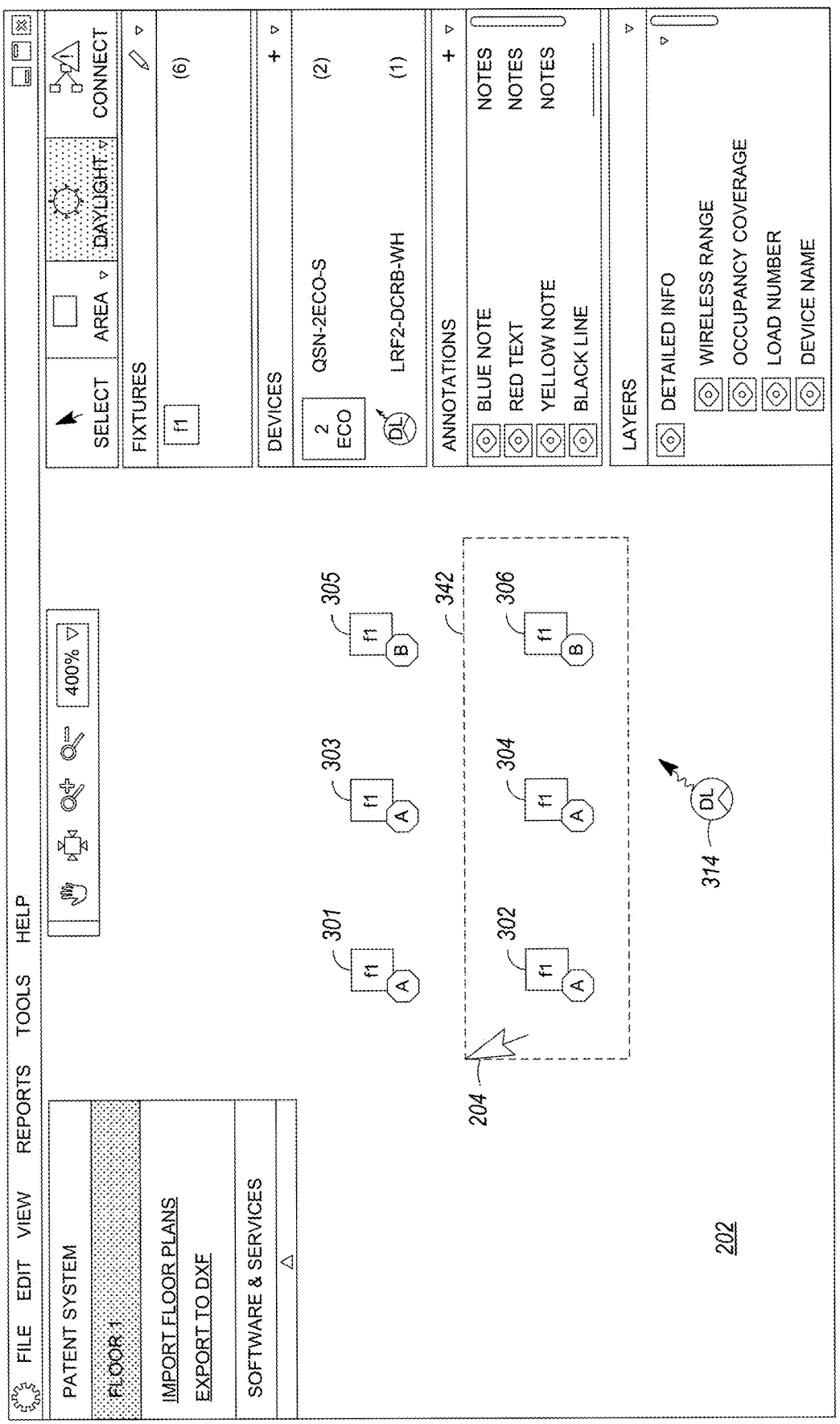
Figure 25:
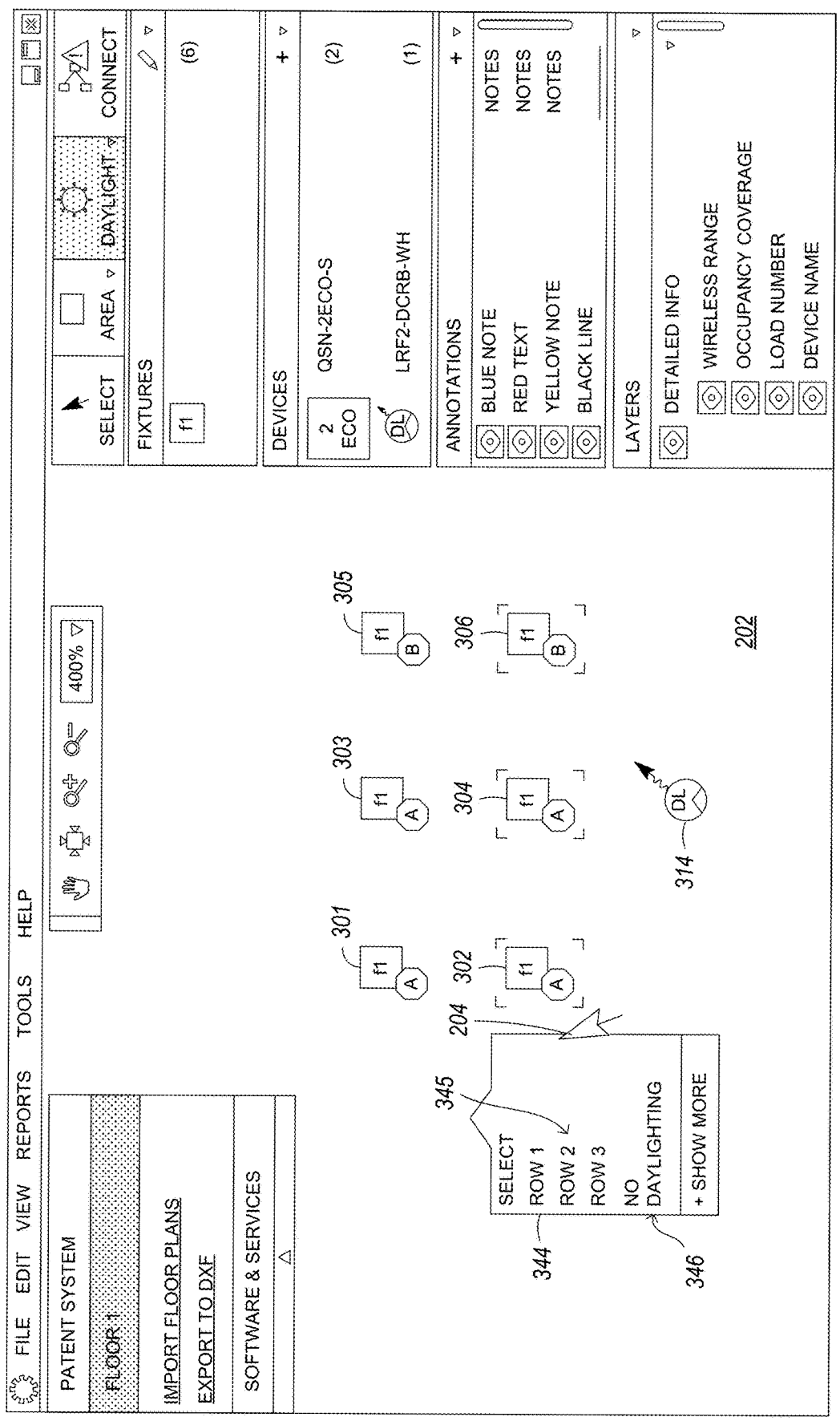

A daylighting zone button may be provided to cause the design software to change to a daylighting zone assignment mode. For example, as shown in FIG. 23, the user may select a daylighting zone button 340 with the cursor 204 to cause the design software to change to a daylighting zone assignment mode. In the daylighting zone assignment mode, as shown in FIG. 24, the design software may show the icon 314 for the daylight sensor on the canvas 202. To assign one or more of the LED drivers to a daylighting zone, the user may select one or more of the icons 301-306 by dragging the cursor 204 to generate a selection box 342 surrounding the icons (e.g., three of the icons 302, 304, 306 as shown in FIG. 24). As shown in FIG. 25, the design software may display a daylighting row selection window 344 having a list 345 of daylighting rows. The user can select a daylighting row to which the LED drivers represented by the icons 302, 304, 306 will be assigned from the list 345 on the daylighting row selection window 344. The daylighting row may be controlled together in a group based on daylighting readings from daylight sensors. If the LED drivers had been assigned to a daylighting row, the user can select a "no daylighting" option 346. After the user selects the "no daylighting" option, the LED drivers may be unassigned from the previously-assigned daylighting row.

Figure 26:
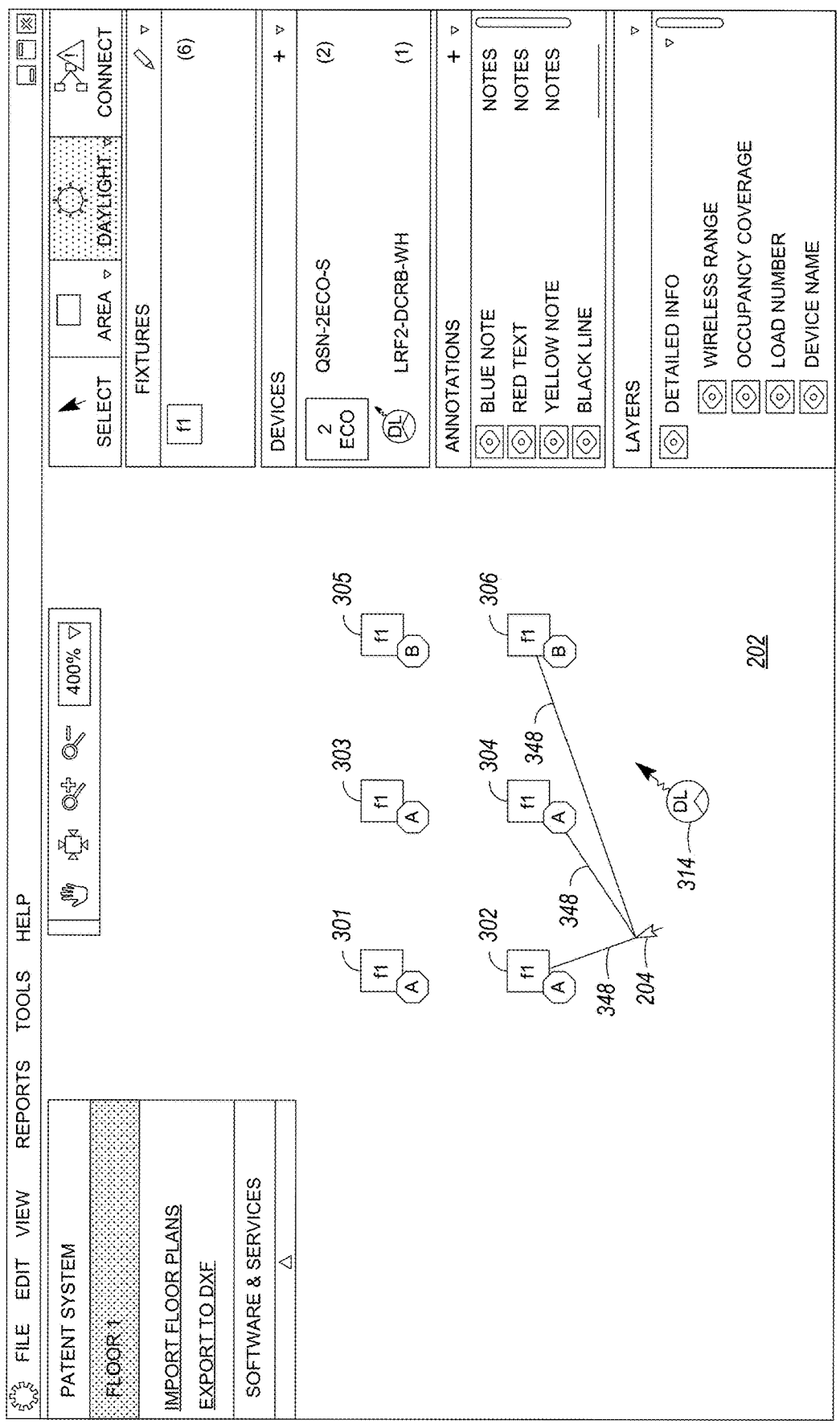
Figure 27:
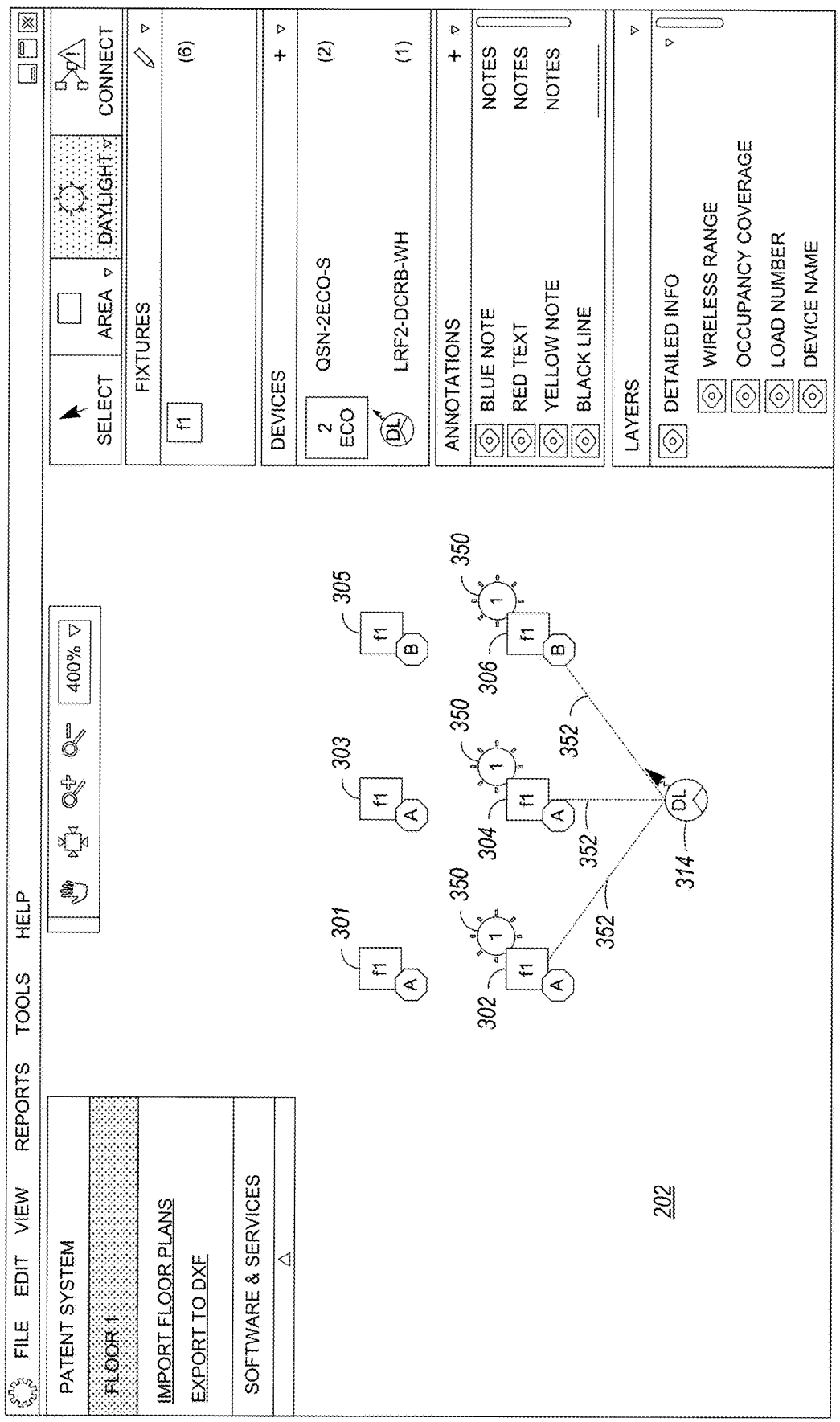

After the user selects one of the daylighting rows (e.g., Row 1) from the list 345 of the daylighting row selection window 344, the design software may generate lines 348 that connect to (e.g., begin at) one or more of the icons 302, 304, 306, as shown in FIG. 26. The lines 348 may connect to (e.g., end at) the cursor 204. The user may select the icon 314 representing the daylight sensor with the cursor 204 to create a relationship (e.g., an association) between the daylight sensor and the LED drivers in the first daylighting row (e.g., the LED drivers represented by the icons 302, 304, 306). As shown in FIG. 27, after the icon 314 representing the daylight sensor is selected, one or more of the icons 302, 304, 306 of the LED drivers in the first daylighting row may be appended with a daylighting row indicator 350. The daylighting row indicators 350 may take different form factors. For example, the daylight row indicators 350 may look like an image of the sun, may be yellow, etc. The daylighting row indicators 350 may include a number signifying the daylighting row to which the LED drivers are assigned. The design software may display lines having one or more appearances (e.g., weights, dashes, arrows, etc.). For example, the design software may display dotted lines 352 between the icons 302, 304, 306 of the LED drivers in the first daylighting row and the icon 314 representing the daylight sensor.

Figure 28:
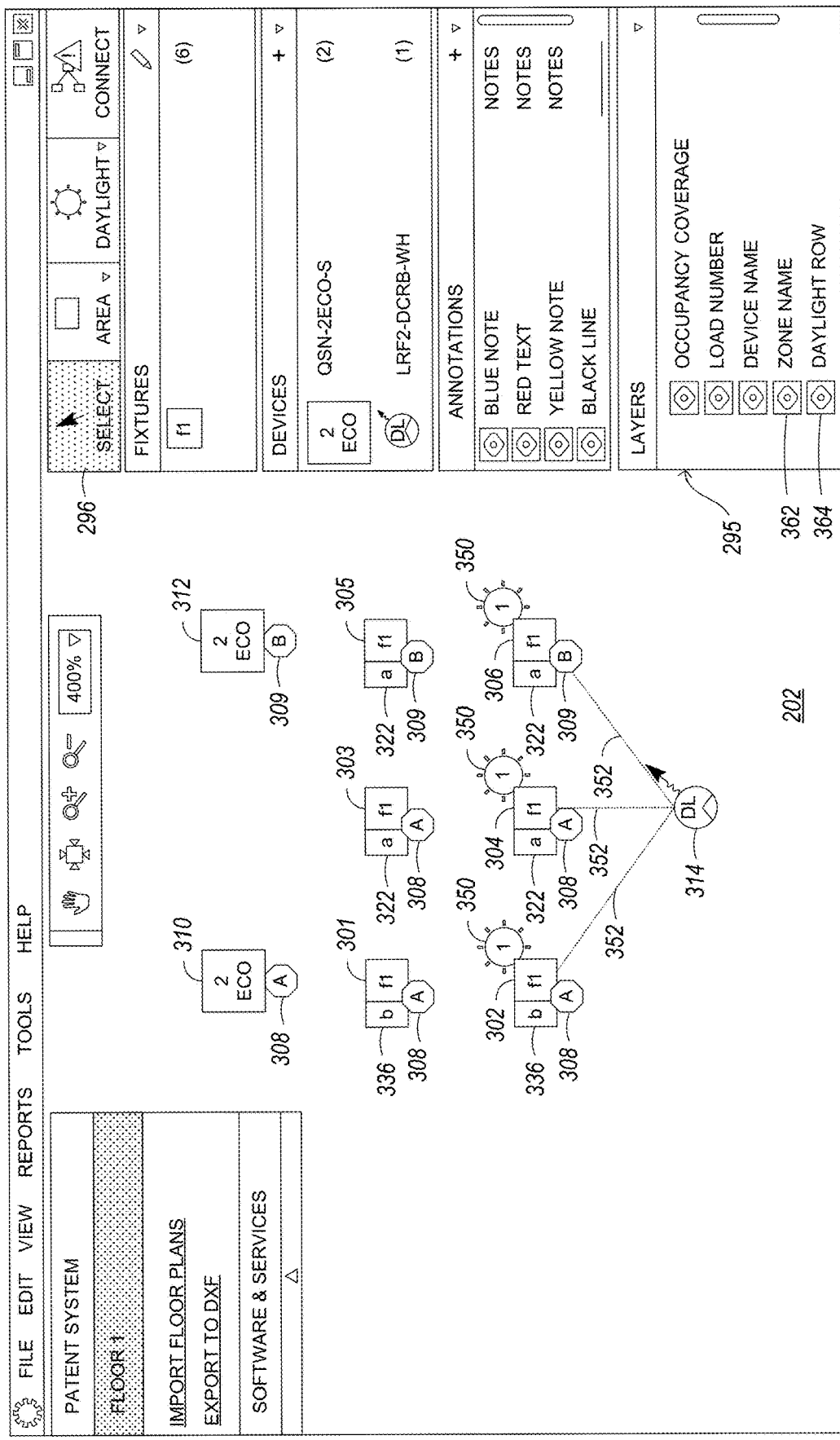
Figure 29:
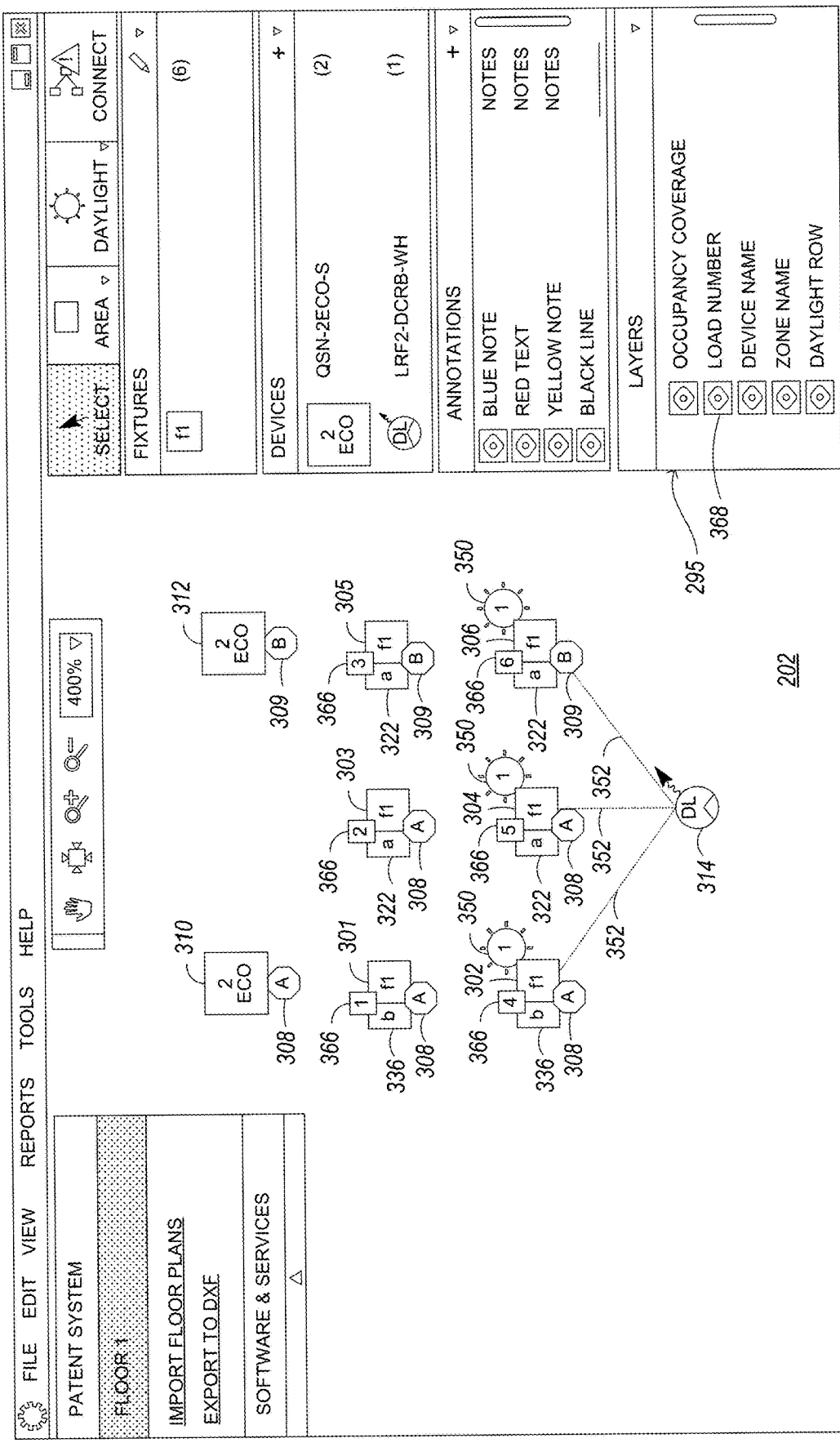

The user may exit the zone assignment mode and/or the daylighting assignment mode. For example, as shown in FIG. 28, the user may exit the zone assignment mode and/or the daylighting assignment mode by selecting the select control tool 296. The user may select a zone name layer 362 and/or a daylighting row layer 364 from the layers pane 295 of the palette 290 to cause the design software to append the zone assignment indicators 322, 336 and the daylighting row indicators 350 onto the icons 301-306, as shown in FIG. 28. As shown in FIG. 29, the icons 301-306 may be appended with a load number indication 366 in response to the selection of a load number layer 368 from the layers pane 295 of the palette 290. The load number indication 366 may include a unique number for one or more fixtures in an area.

The design software may be configured to display specified and/or rated ranges (e.g., occupancy ranges) for one or more occupancy and/or vacancy sensors on the canvas 202. FIGS. 30-33 illustrate example graphical representations of a user interface that may be displayed on the visual display of the network device by the design software for displaying specified occupancy sensor ranges for various occupancy and/or vacancy sensors.

Figure 30:
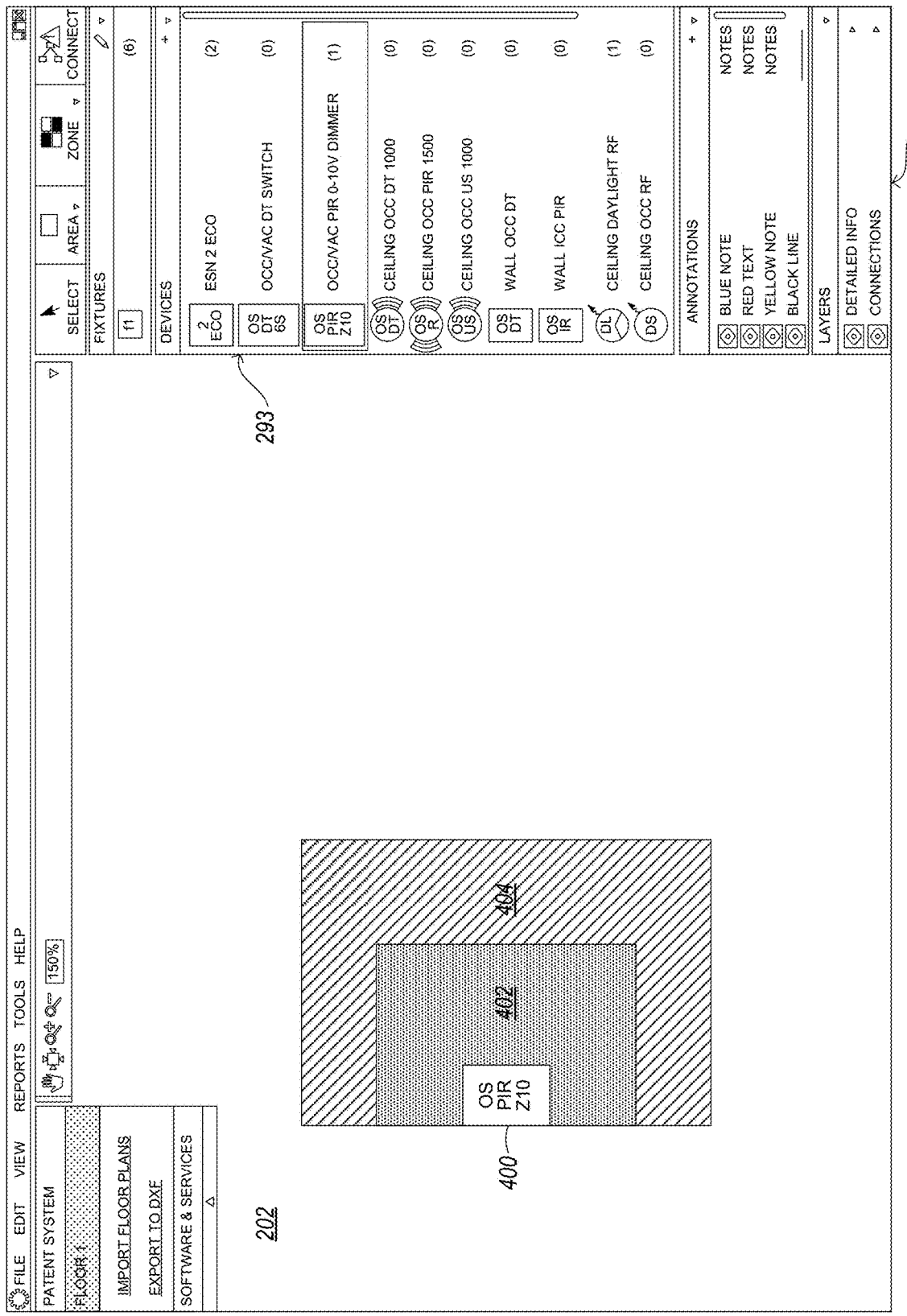
FIGS. 30-33 illustrate example graphical representations of a user interface that may be displayed on the visual display of the network device by the design software for displaying specified occupancy sensor ranges for various occupancy and vacancy sensors.

For example, as shown in FIG. 30, if a wall-mounted passive-infrared (PIR) occupancy sensor dimmer is selected from the devices pane 293 of the palette 290, the canvas 202 may display a first occupancy sensor icon 400 representing the wall-mounted PIR occupancy sensor dimmer. The PIR occupancy sensor circuitry of the wall-mounted PIR occupancy sensor dimmer may be characterized by a first specified occupancy sensor range 402 and/or a second specified occupancy sensor range 404. The first specified occupancy sensor range 402 and/or the second specified occupancy sensor range 404 may be displayed on the canvas 202 in relation to the first occupancy sensor icon 400. For example, the first specified occupancy sensor range 402 may represent a minor motion occupancy sensor range in which detection of minor motions of an occupant (e.g., hands moving) may be detected, and the second specified occupancy sensor range 404 may represent a major motion occupancy sensor range in which detection of major motions of an occupant (e.g., an occupant walking) may be detected. The second specified occupancy sensor range 404 may be larger than the first specified occupancy sensor range 402 and/or the second specified occupancy sensor range 404 may encompass the first specified occupancy sensor range 402, as shown in FIG. 30. The first specified occupancy sensor range 402 and the second specified occupancy sensor range 404 may be represented on the canvas 202 as different colors and/or different shades of the same color. The first occupancy sensor icon 400 may be moved and/or rotated. For example, when a floorplan is provided on the canvas 202, the first occupancy sensor icon 400 may be moved and/or rotated to ensure that the desired occupancy sensor coverage is achieved.

Figure 31:
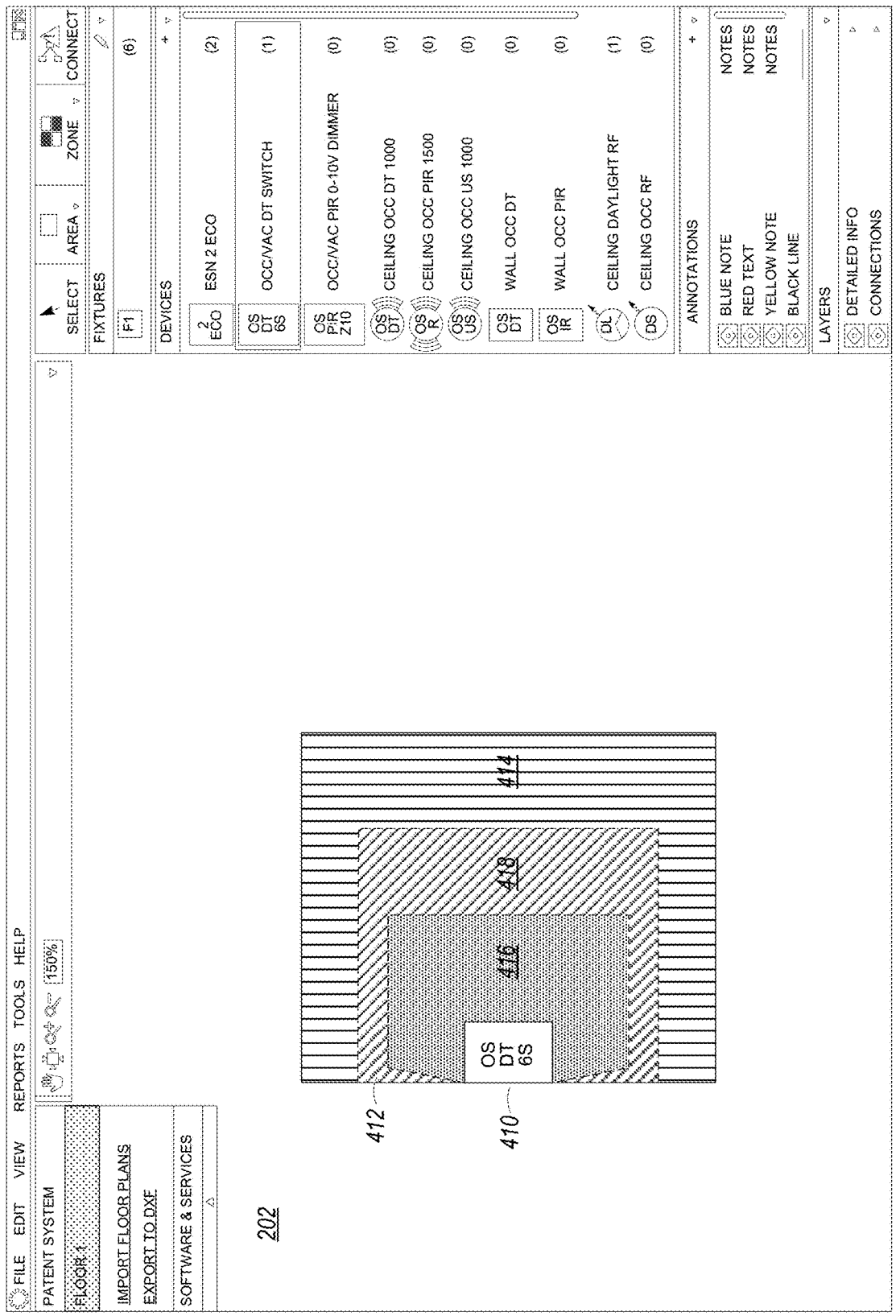

The user may select a wall-mounted dual-tech occupancy sensor switch from the devices pane 293 of the palette 290. For example, the user may select a wall-mounted dual-tech occupancy sensor switch from the devices pane 293 of the palette 290 to cause the canvas 202 to display a second occupancy sensor icon 410 representing the wall-mounted dual-tech occupancy sensor switch, as shown in FIG. 31. The wall-mounted dual-tech occupancy sensor switch may include PIR occupancy sensor circuitry and/or ultrasonic occupancy sensor circuitry. The PIR occupancy sensor circuitry of the wall-mounted dual-tech occupancy sensor switch may be characterized by a first specified occupancy sensor range 412 (e.g., a minor motion occupancy sensor range) and/or a second specified occupancy sensor range 414 (e.g., a major motion occupancy sensor range) that may be displayed on the canvas 202 in relation to the second occupancy sensor icon 410. The ultrasonic occupancy sensor circuitry of the wall-mounted dual-tech occupancy sensor switch may be characterized by a third specified occupancy sensor range 416 (e.g., a minor motion occupancy sensor range) and/or a fourth specified occupancy sensor range 418 (e.g., a major motion occupancy sensor range) that may be displayed on the canvas 202 in relation to the second occupancy sensor icon 410. The first specified occupancy sensor range 412 and/or the second specified occupancy sensor range 414 may be represented on the canvas 202 as different shades of a first color (e.g., purple), and/or the third and/or fourth specified occupancy sensor ranges 416, 418 may be represented on the canvas 202 as different shades of a second color (e.g., yellow).

Figure 32:
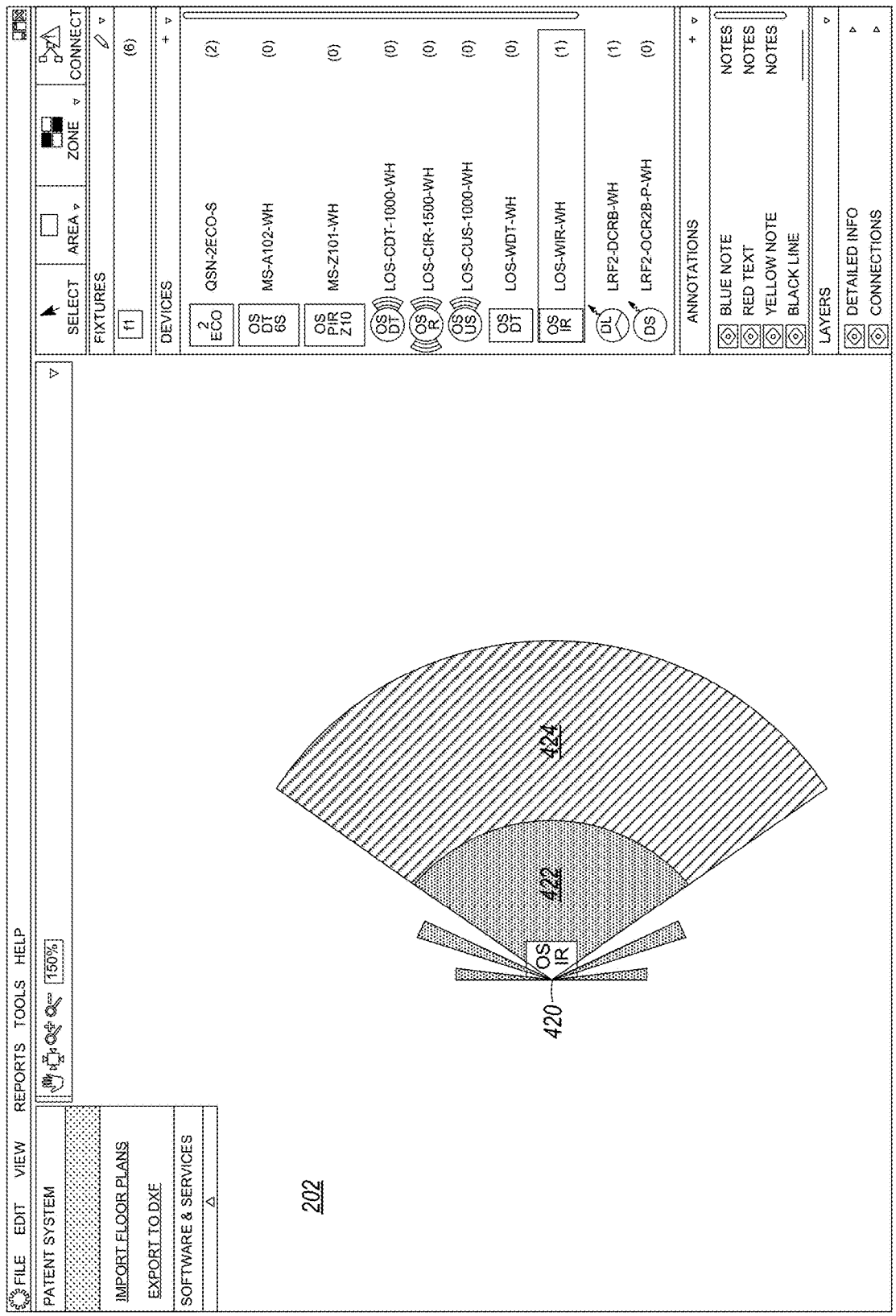

As shown in FIG. 32, the canvas 202 may display a third occupancy sensor icon 420. The third occupancy sensor icon 420 may represent a wall-mounted PIR occupancy sensor. The PIR occupancy sensor circuitry of the wall-mounted PIR occupancy sensor may be characterized by a first specified occupancy sensor range 422 (e.g., a minor motion occupancy sensor range) and/or a second specified occupancy sensor range 424 (e.g., a major motion occupancy sensor range) that may be displayed on the canvas 202 in relation to the third occupancy sensor icon 420.

Figure 33:
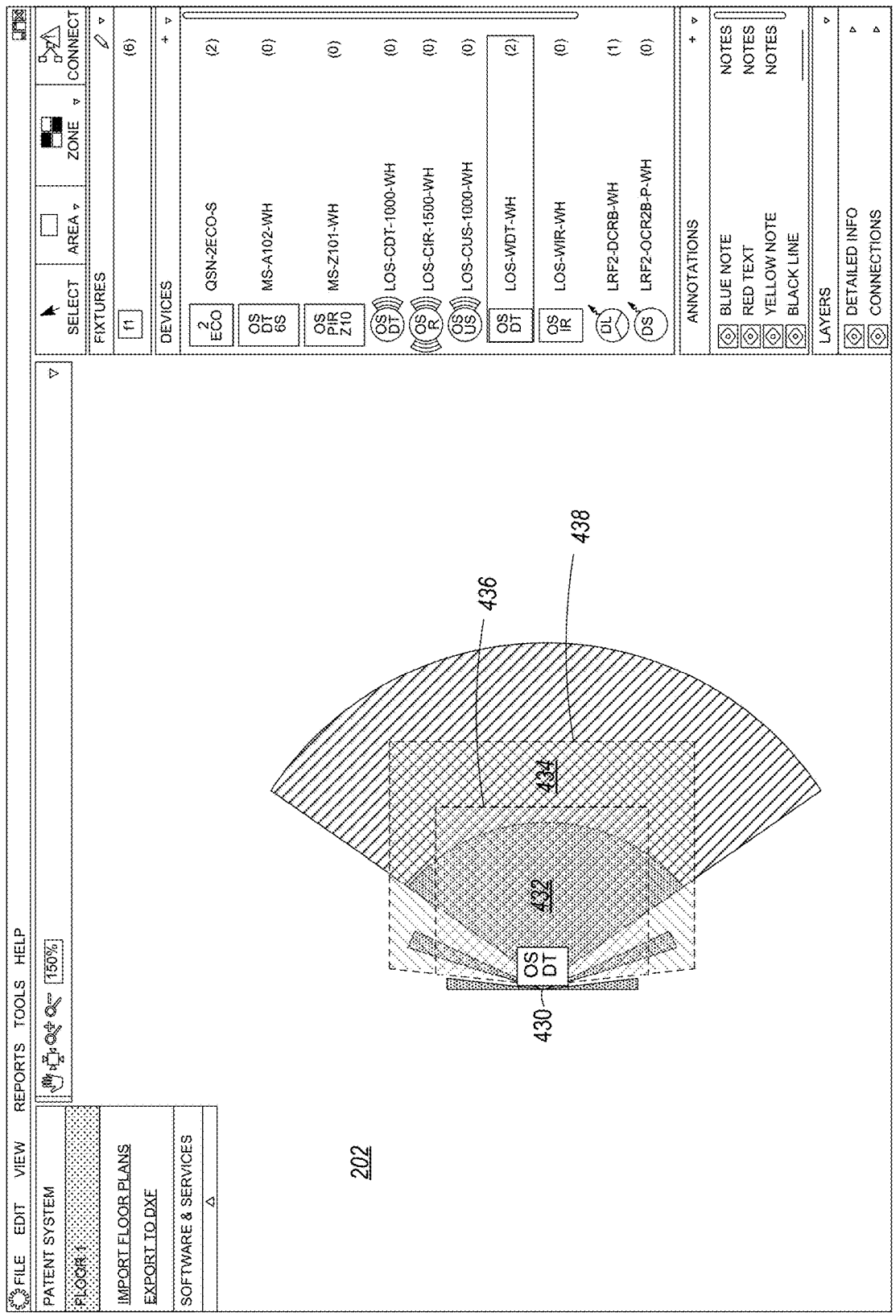

As shown in FIG. 33, the canvas 202 may display a fourth occupancy sensor icon 430. The fourth occupancy sensor icon 430 may represent a wall-mounted dual-tech occupancy sensor. The PIR occupancy sensor circuitry of the wall-mounted dual-tech occupancy sensor may be characterized by a first specified occupancy sensor range 432 (e.g., a minor motion occupancy sensor range) and/or a second specified occupancy sensor range 434 (e.g., a major motion occupancy sensor range) that may be displayed on the canvas 202 in relation to the fourth occupancy sensor icon 430. The ultrasonic occupancy sensor circuitry of the wall-mounted dual-tech occupancy sensor may be characterized by a third specified occupancy sensor range 436 (e.g., a minor motion occupancy sensor range) and/or a fourth specified occupancy sensor range 438 (e.g., a major motion occupancy sensor range) that may be displayed on the canvas 202 in relation to the fourth occupancy sensor icon 430.

While the design software shown in FIGS. 2-33 has been described herein for use with configuring a load control system, the design software may also be used for designing the load control system. For example, the design software may be used for designing the load control system before sale of the load control system and/or for the purpose of generating a quote for the load control system.

FIGS. 34-57 illustrate example graphical representations of a user interface that may be displayed on the visual display of the network device by the design software for designing and configuring the load control system using templates. For example, a template (or "solution"), such as a load control template, may include one or more control-target and/or control-source devices of the load control system. The templates may be pre-defined, for example, by the design software to provide load control templates that may satisfy the requirements of an energy code and/or to provide a desired control application.

Figure 34:
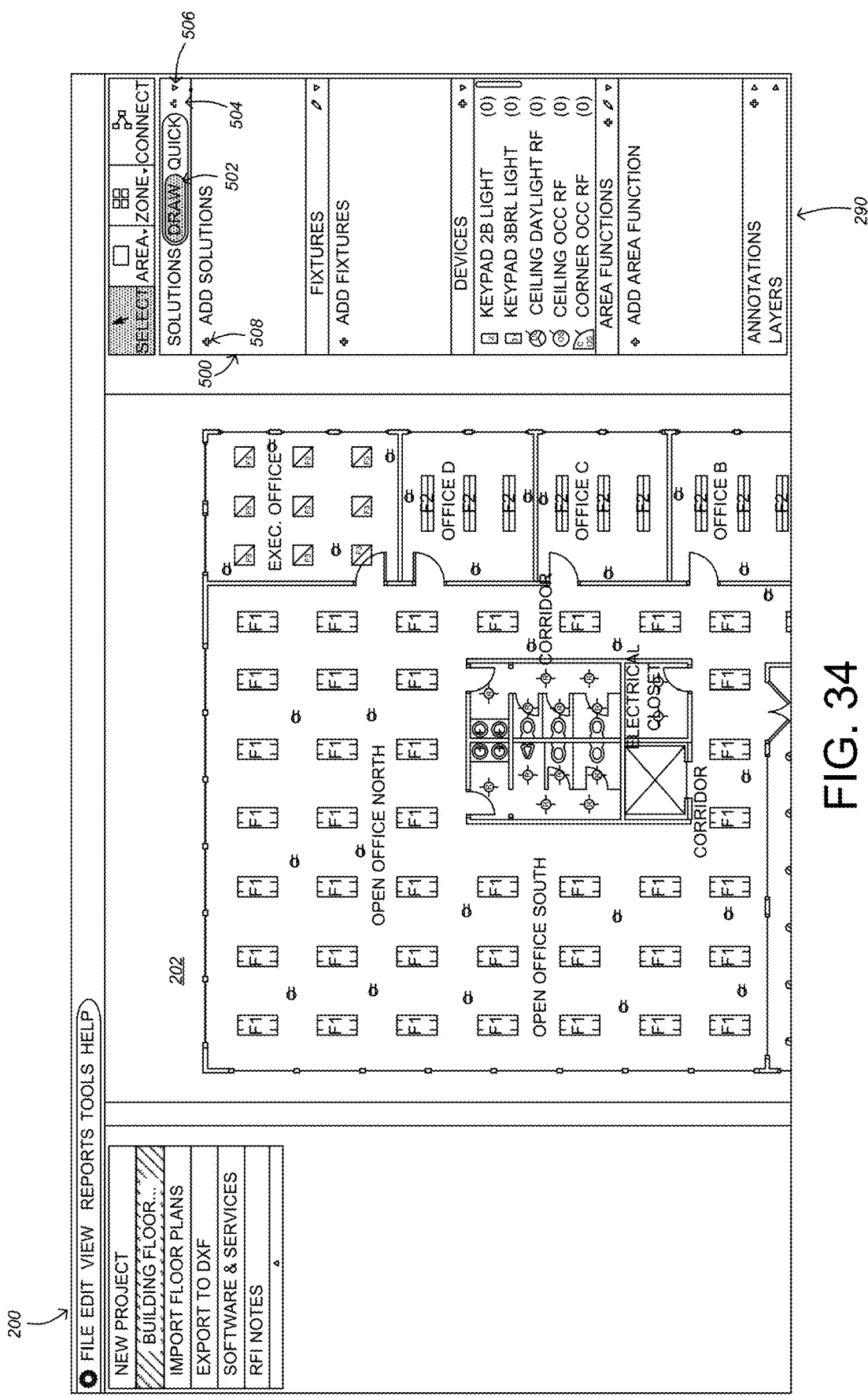
FIGS. 34-57 illustrate example graphical representations of a user interface that may be displayed on the visual display of the network device by the design software for designing and configuring the load control system using templates.
Figure 35:
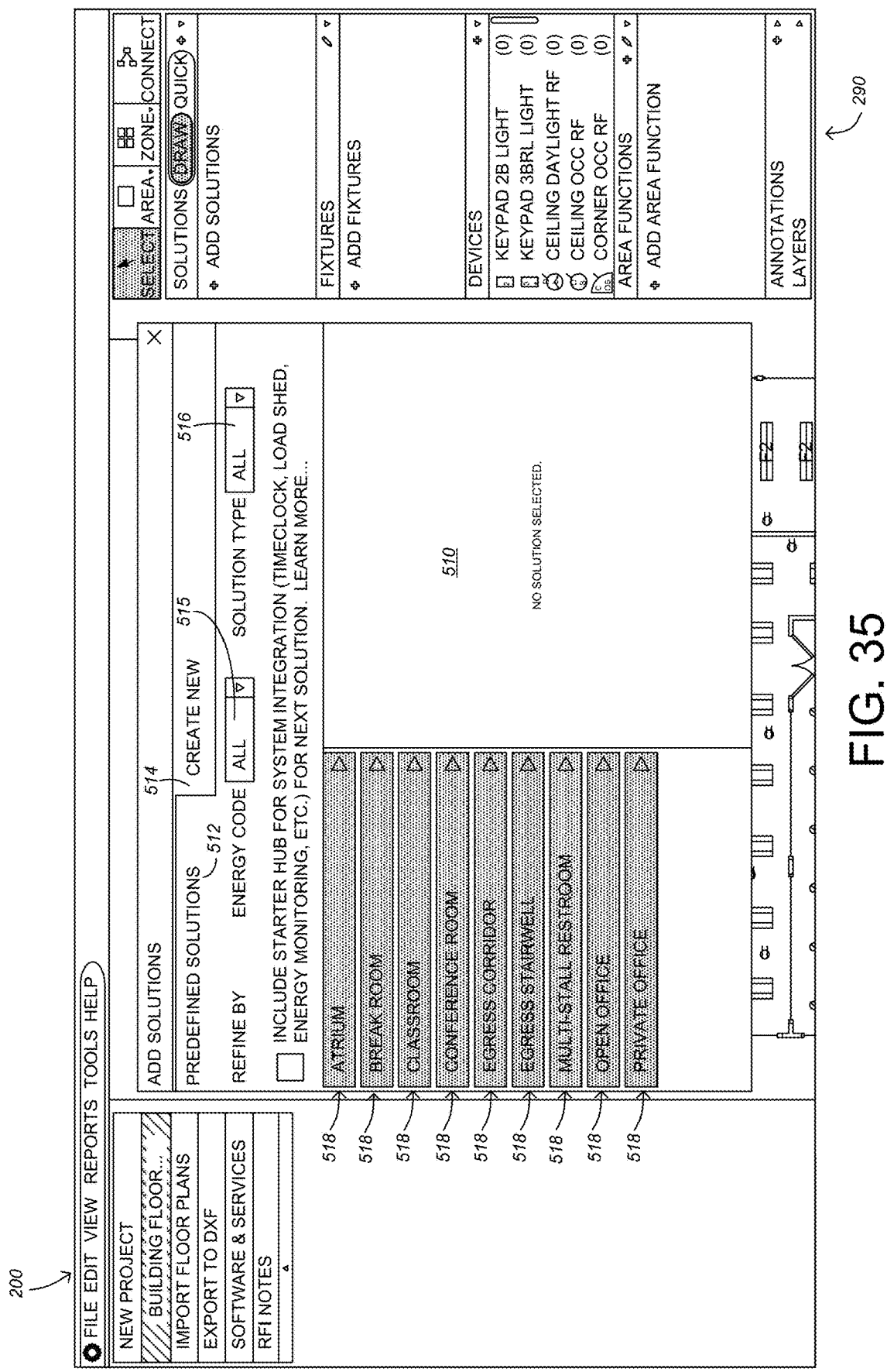

As shown in FIG. 34, the palette 290 may include a solutions pane 500, which may allow a user to define and/or configure specific load control templates (e.g., solutions) for the load control system, to select instances of defined load control templates, and to place the load control templates (e.g., icons representing the load control templates and/or icons representing the fixtures and devices of the load control templates) within the canvas 202. The solutions pane 500 may include a draw/quick selection tool 502, an add solution icon 504, and an expand contract icon 506. The add solution icon 504 may allow a user to select and/or define one or more load control templates to be added to the solutions pane 500. An add solution icon 508 on the solutions pane 500 may also provide a similar function as the add solution icon 504. For example, the add solution icon 508 may allow a user to select and/or define one or more load control templates to be added to the solutions pane 500 (e.g., similar or same as the add solution icon 504). Upon selection of either of the add solution icon 504 and/or the add solution icon 508, the design system may display a solutions selection window 510 as shown in FIG. 35. The solution selection window 510 may help guide a user through a template configuration with predefined selections. The solutions selection window 510 may include a predefined solutions tab 512 that may allow for the selection of one or more predefined solutions and/or a create new tab 514 that may allow for the creation of new load control templates (e.g., from scratch).

When the predefined solutions tab 512 is selected, the solutions selection window 510 may display an energy code selection tool 515, a solution type selection tool 516, and one or more room solution types 518 (e.g., which may be collapsed as shown in FIG. 35). The solutions selection window 510 may display one or more possible solutions in response to selections of the energy code selection tool 515, the solution type selection tool 516, and the room solution types 518. For example, the energy code selection tool 515 may allow for the selection of one of a plurality of energy codes (e.g., ASHRA 90.1-2016, IECC-2015, Title 24-2016, etc.) to narrow down the possible solutions to be displayed on the solutions selection window 510. The solution type selection tool 516 may allow for the selection of one or more solution types (e.g., retrofit, new construction, etc.) to further narrow down the possible solutions. Based on the user's selection of the energy code selection tool 515 and/or the solution type selection tool 516, the predefined solutions tab 512 may provide one or more typical device types associated with a room. For example, the one or more room solution types 518 may display one or more typical predefined device types for the load control templates based on the information from the energy code selection tool 515 and/or the solution type selection tool 516.

The create new tab 514 may create a load control template from scratch. For example, if a user selects the create new tab 514, the solutions selection window 510 may allow the user to select from all device types or predefined sets of device types (e.g., similar to selecting the predefined solutions tab 512).

Figure 36:
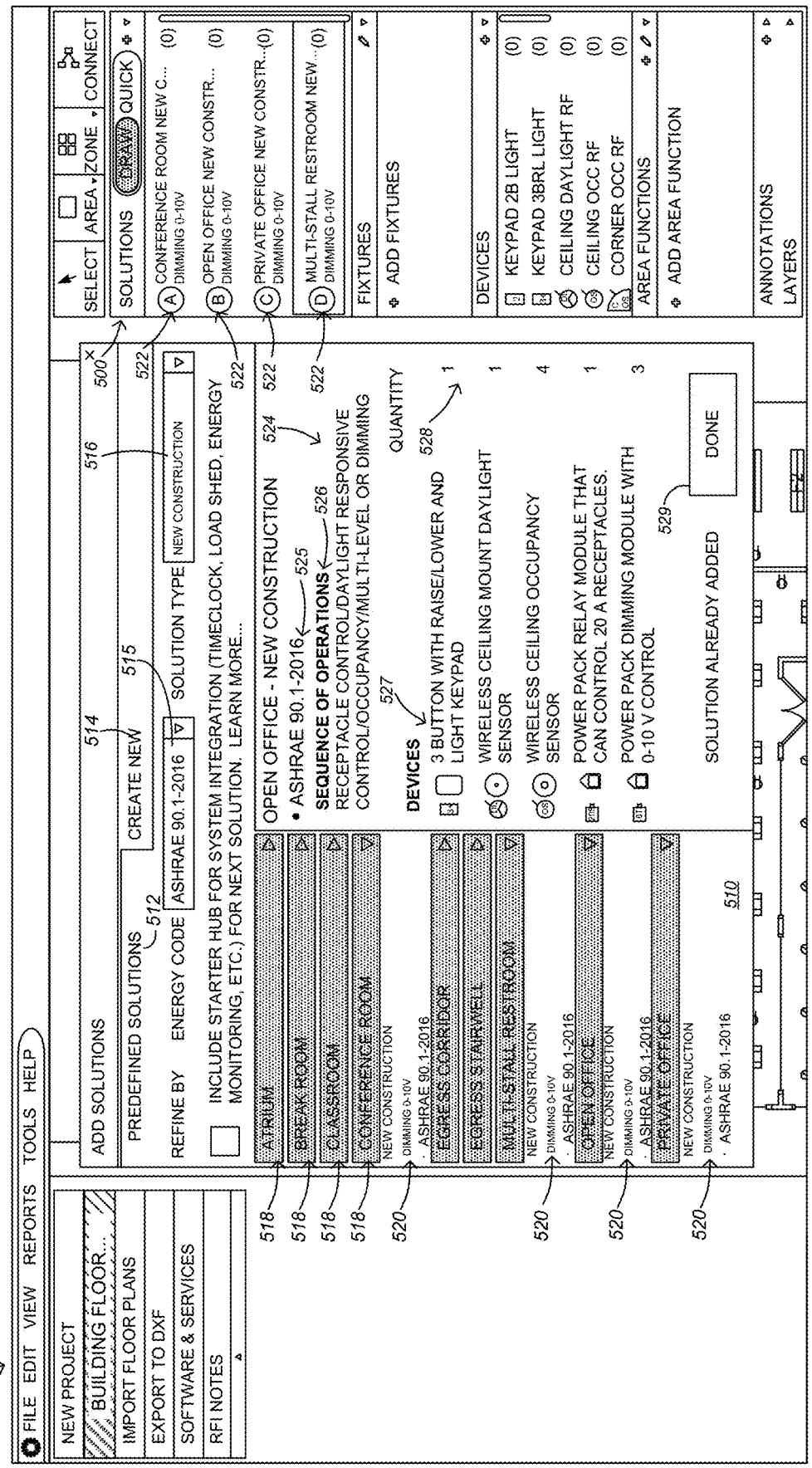

Once an option of the energy code selection tool 515 and an option of the solution type selection tool 516 have been selected, the user may select one or more of the room solution types 518 to display corresponding solutions 520 as shown in FIG. 36. If one of the room solution types 518 is selected before options of the energy code selection tool 515 and the solution type selection tool 516 are selected, all possible solutions 520 for the selected room solution type may be displayed. If options for one or both of the energy code selection tool 515 and the solution type selection tool 516 are selected, a shortened (e.g., filtered) list of solutions 520 may be displayed (e.g., as shown in FIG. 36). In addition, the design software may require options for both of the energy code selection tool 515 and the solution type selection tool 516 to be selected before displaying the solutions 520 (e.g., the solutions may not be displayed until options for both of the energy code selection tool 515 and the solution type selection tool 516 are selected. The options for the energy code selection tool 515 and the solution type selection tool 516 may be selected in any order.

Upon the selection of the solutions 520, corresponding solution icons 522 may be added to the solutions pane 500. In addition, the solutions selection window 510 may display a solution description pane 524 for a selected one of the solutions 520. For example, the solutions selection window 510 may display a solution description pane 524 for the last selected one of the solutions 520 (e.g., as shown in FIG. 36). The solution description panel 524 may display a title 525 that summarizes the selections of the energy code selection tool 515, the solution type selection tool 516, and the room solution types 518 for the selected solution. For example, the solution description panel 524 shown in FIG. 36 illustrates that the current load control template may be for energy code ASHRA 90.1-2016, for new construction, and for open office room type. The solution description panel 524 may display a sequence of operations 526 that summarizes the various control requirements for the selected solution, a list of devices 527 that may be recommended and/or required for the selected solution, and a recommended quantity 528 of those devices. The various control requirements for the selected solution, a list of devices 527 summarized on the sequence of operations 526 may be based on the information that the user selected (e.g., energy code 515, solution type 516, and/or room solution types 518). For example, the recommended quantity 528 of devices may be based on a typical (e.g., average-sized) building operating at the selected energy code 515. In addition, the recommended 528 of devices may be based on additional information entered by the user, for example, a total size or area (e.g., square footage) of the building, and/or the typical areas of the rooms associated with one or more of the room solution types 518. For example, the user may enter the total size or area of the building and/or the typical areas of the rooms associated with one or more of the room solution types 518 when creating the project for the building. The solution selection window 510 may close upon the selection of a done button 529 (e.g., when the user has added solution icons 522 for all of the desired load control templates to the solutions pane 500).

Once the user selects the done button 529, the load control template associated with the selections of the energy code selection tool 515, the solution type selection tool 516, and the room solution types 518 for the selected load control template may be stored as an example template for a particular space (e.g., open office room for a new construction with ASHRA 90.1-2016 energy code). The user may drag and drop the stored template in other areas of the project for similar/same purpose. For example, the user may drag and drop the template for open office room in one or more other open office rooms on the canvas 202 instead of or in addition to the user selecting the details about the open office room. For a large project, such as multi-story office buildings, the user may drag and drop one or more stored templates, such as the one created and shown in FIG. 36, and may not have to select/create from the scratch. For the large project and/or a project where the user wants to have similar (e.g., the same) configuration for one or more rooms (e.g., open office space), by dragging and dropping the one or more templates as described herein may improve efficiency and save cost as the user may not recreate/reselect similar (e.g., same) setup for each of the space. The user may use one or more templates multiple times.

Figure 37:
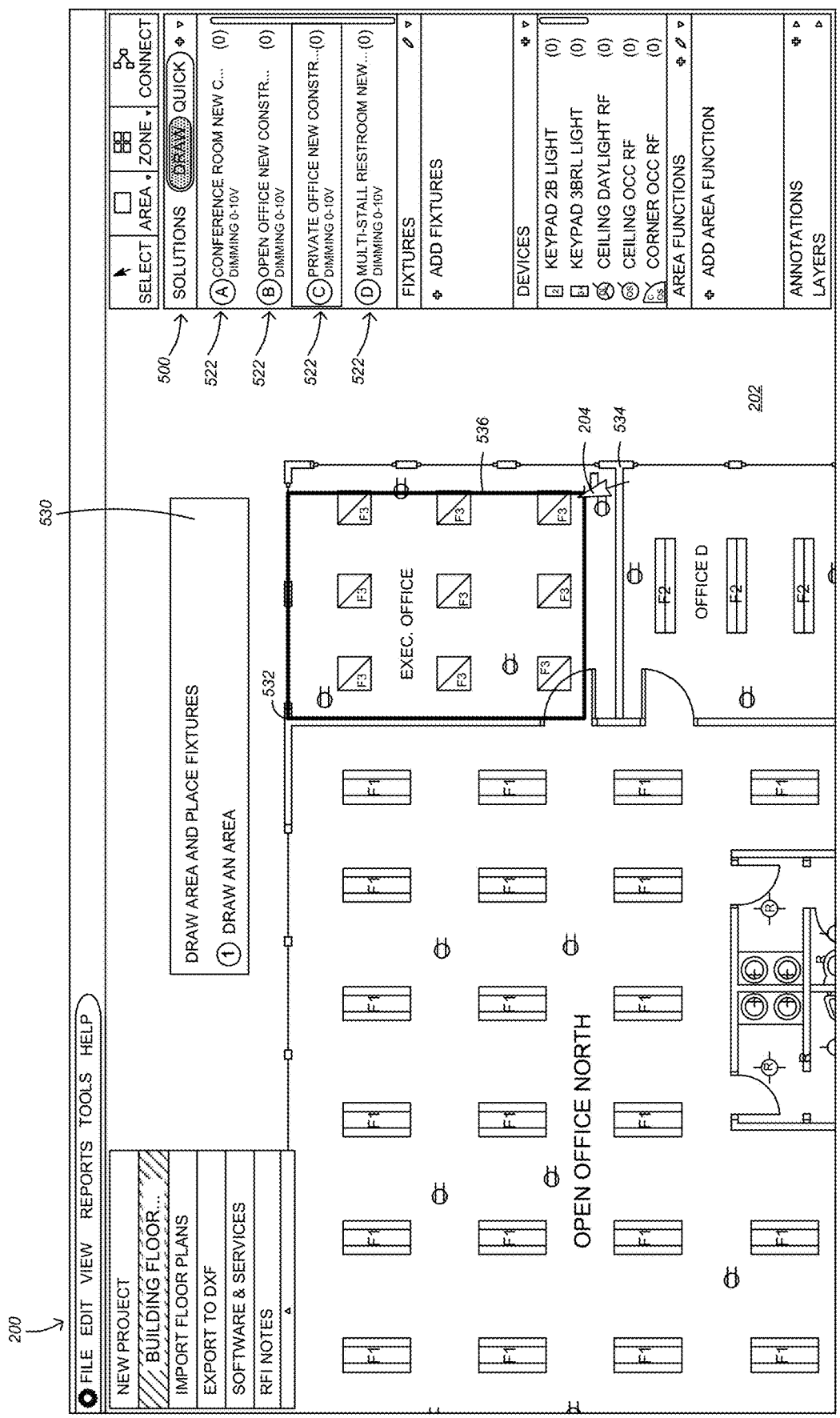

As shown in FIG. 37, the load control templates (e.g., solutions) may be added to the canvas 202 upon selection of the solution icons 522 in a draw solution mode and a quick-add solution mode. The design system may switch between the draw solution mode and the quick-add solution mode in response to the draw/quick selection tool 502 of the solutions pane 500. The draw selection mode may allow the user to drag and drop one or more of the solution icons 522 (e.g., load control templates) into an area (e.g., a room) on the canvas 202. The draw selection mode may allow the user to draw an outline of the area, and place the lighting fixtures in the area at specific locations and/or defining specific electrical circuits of lighting fixtures. The draw selection mode may then auto-populate one or more icons for load control devices, controls, sensors, and/or the like that the user may further arrange in the drawn area. The quick selection mode may allow the user to select a solution icons 522 int the solution pane 500 and create respective solution group icon (e.g., as shown by solution group icon 590 in FIG. 53) on an area (e.g., a room) on the canvas 202 (e.g., without drawings an outline of the area). For example, each solution group icon on the canvas 202 may represent a collection of light fixtures, load control devices, controls, sensors, and/or the like (e.g., as a group), with the number of each of the devices defined by the recommended quantity 528 of devices in the solution description panel 524 (e.g., as shown in FIG. 36). For example, the number of light fixtures may be set as a predetermined number of light fixtures per load control device (e.g., three light fixtures per load control device). The user may click (e.g., double-click) on each solution icon 522 on the canvas 202 to open a solution configuration window (not shown) that may allow for adjustment of the number of devices in that specific solution.

When one of the solution icons 522 is selected in the draw solution mode (e.g., the private office new construction solution icon), the design system may display a draw solution prompt window 530 as shown in FIG. 37. The draw solution prompt window 530 may instruct the user to draw a load control area 536 in which the deploy the solution. The load control area may be used to identify and/or associate one or more load control devices and control devices (e.g., remotes, sensors, and/or the like) in a load control environment. In examples, the user may use the cursor 204 to click on a first corner 532 of a load control area (e.g., an office) and drag the cursor towards a second opposing corner 534 of the office as shown in FIG. 37. In examples, the user may use the cursor 204 to first click on a first corner 532 of a load control area (e.g., an office) to start the area and use the cursor 204 to second click and/or release the first click at a second opposing corner 534 of the area (e.g., the office) to define the area as shown in FIG. 37. The design system may display the load control area 536 on the canvas 202.

Figure 38:
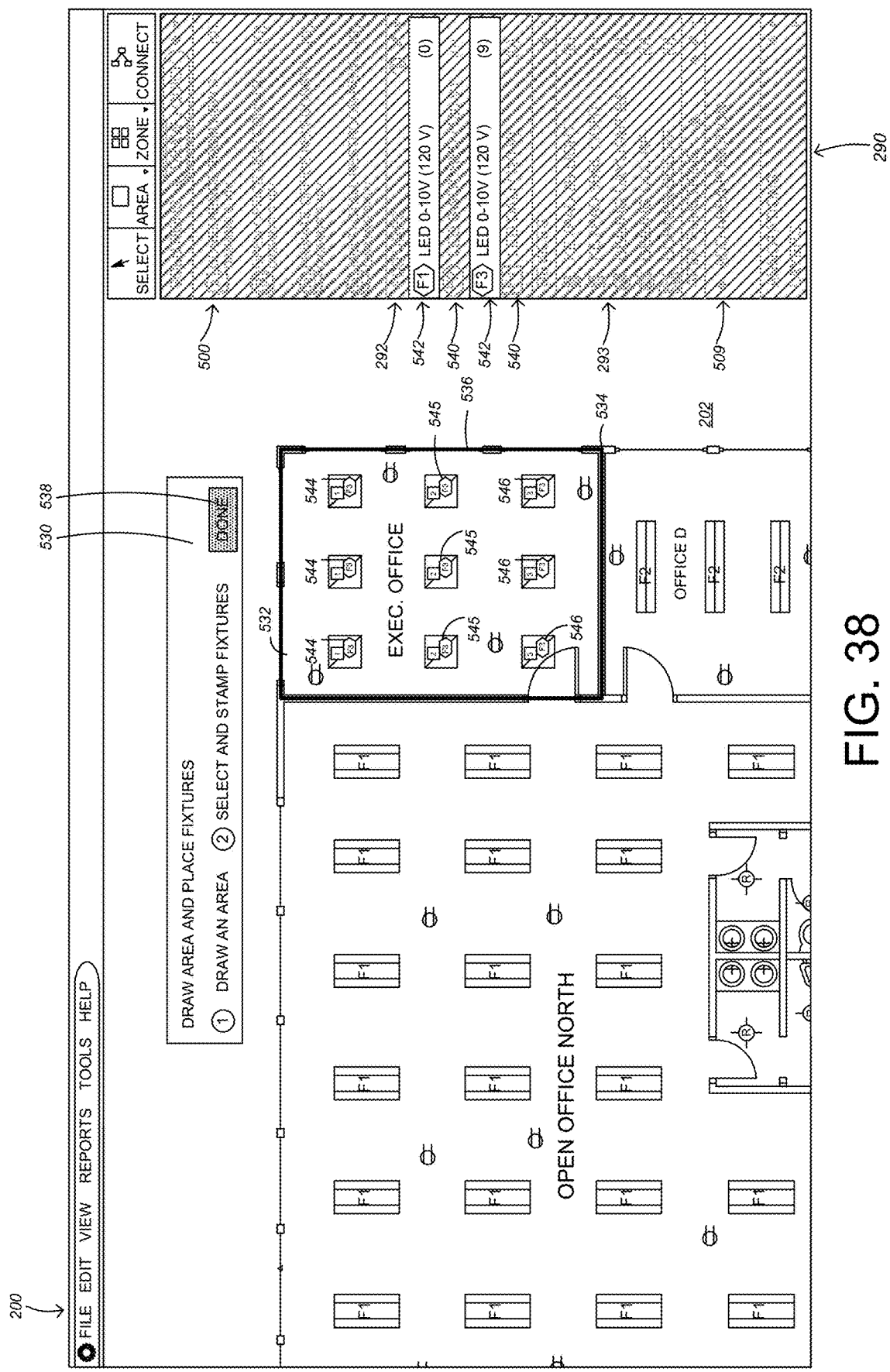

When the user clicks on the second corner 534 of the office using the cursor 204 (e.g., or releases at the second corner), the draw solution prompt window 530 may instruct the user to select and place fixtures as shown in FIG. 38. The design system may gray out the panes of the palette 290 other than the fixture pane 292 (e.g., the solutions pane 500, the devices pane 293, an area functions pane 509, etc.) to indicate that those panels are blocked (e.g., automatically blocked). The grayed-out panes may prevent the user from selecting icons in the panes other than the fixture pane 292. The design system may also block icons of fixtures in the fixture pane 292 that are not able to be controlled by the load control devices of the selected solution to prevent the user from selecting those fixture icons. For example, as shown in FIG. 38, the design system may gray out first fixture icons 540 that are not able to be controlled by the load control devices that are a part of the selected load control template (e.g., solution), which may maintain second fixture icons 542 that are not grayed-out and are able to be selected by the user. As described herein, by graying out panes to prevent the user from selecting the fixture icons that may not be appropriate and/or associated with the selected load control template (e.g., solution), the design program may provide information relevant to the user so that the user may select and place fixtures easily and quickly. For a large project, such as a large multi-story office building project, the user may not need to remember all the details about each room of the project when the designer program provides relevant information associated with the room as described herein.

After the user has selected one of the second fixture icons 542 in the fixture pane 292, the user may place fixture icons 544, 545, 546 inside of the load control area 536 that defines the area for the selected load control template (e.g., solution) on the canvas 202 as shown in FIG. 38. For example, the top row of fixture icons 544 may be connected to a first electrical circuit, the middle row of fixture icons 545 may be connected to a second electrical circuit, and the bottom row of fixture icons 546 may be connected to a third electrical circuit. The user may select, for example, one of the second fixture icons 542 and stamp (e.g., place) a first one of the fixture icons 544 onto the canvas 202 by moving the cursor 204 to a location on the canvas (e.g., over one the fixtures on the floorplan) and actuating a button on the mouse. The user may then continue to stamp fixture icons 544 onto the canvas by moving the cursor 204 to new locations on the canvas and actuating the button on the mouse. Since the fixture icons 544 are stamped in succession (e.g., without any intermediate button actuations on the mouse), the fixture icons 544 may be connected to the same electrical circuit (e.g., the first electrical circuit as described above). The user may double-click the button on the mouse (e.g., two actuations in quick succession) and/or actuate a different button on the mouse to start a new electrical circuit. For example, after placing the three fixture icons 544 of the first electrical circuit, the user may double-click the button on the mouse to start the second electrical circuit, and then stamp the fixture icons 546 onto the canvas 202 to form the second electrical circuit. When the user is done placing the fixture icons 544, 545, 546 on the canvas 202, the user may select a done button 538 on the draw solution prompt window 530.

Figure 39:
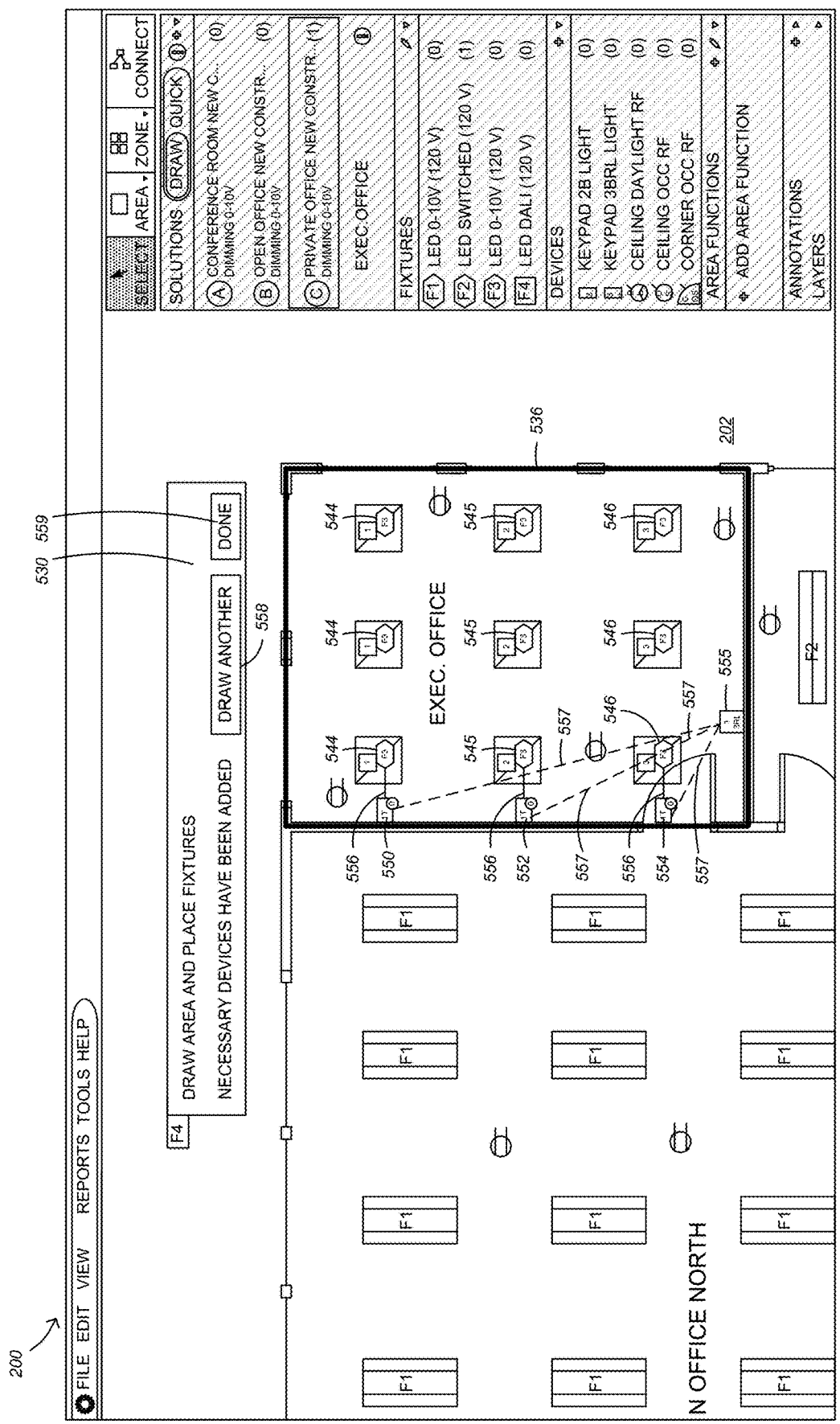

As shown in FIG. 39, upon the selection of the done button 538 (e.g., from FIG. 38), the design system may place (e.g., automatically place) device icons, such as load control device icons 550, 552, 554 and a remote control device icon 555 inside of the load control area 536 that defines the area for the selected solution on the canvas 202. The design system may be configured to determine the number of each device icon to place on the canvas 202 based on the quantities 528 of the devices listed on the solution description panel 524 of the solution selection window 510 (e.g., as shown at FIG. 36) for the selected solution. The design system may also determine the number of load control device icons 550, 552, 554 to place on the canvas 202 based on the number of fixture icons 544, 545, 546 and/or electrical circuits established by the fixture icons in the load control area 536 that defines the area for the selected solution. For example, as shown in FIG. 39, the design system may determine to place three load control device icons 550, 552, 554 since the user defined three electrical circuits for the fixture icons 544, 545, 546 in the load control area 536 that defines the area for the selected solution. If the design system places (e.g., automatically places) the correct number of the load control device icons 550, 552, 554 based on the user's definition of the electrical circuits when stamping the fixture icons 544, 545, 546 in the load control area 536 as shown in FIG. 39, the user may not worry about missing and/or additional load control device icons that may be required to control the lighting fixtures associated with the fixture icons. Also, for a large construction projects, such as a large-scale multistory office building, the user may not think about this level of granularity as the system would autogenerate appropriate number of the load control device icons associated to the user's selected fixture icons. This may increase productivity and/or efficiency and may reduce human errors.

The design system may also create (e.g., automatically create) relationships between fixtures and devices in the load control area 536 in response to the selection of the done button 538 on the draw solution prompt window 530 (e.g., from FIG. 38). For example, the design system may automatically generate relationships between the load control device icons 550, 552, 554 and the respective electrical circuits of the fixture icons 544, 545, 546 as indicated by lines 556. For example, the design system may automatically draw the lines 556 between each of the load control device icons 550, 552, 554 and at least one of the fixture icons 544, 545, 546 of the respective electrical circuits on the canvas 202. The relationships defined by the lines 556 may be similar to the relationship defined by the line 234 between the fifth icon 230 (e.g., representing an electrical load) and the sixth icon 232 (e.g., representing a load control device) as shown in FIG. 7, and may each represent an electrical connection for supplying power from the load control device to the electrical load and/or a communication link for allowing the load control device to control the electrical load. By automatically creating relationships between the fixture icons 544, 545, 546 and the load control device icons 550, 552, 554, the user may not need to create the relationships by drawings the lines 556, which may increase productivity and/or efficiency and may reduce human errors. In addition, the user may be configured to edit the relationships between the fixture icons 544, 545, 546 and the load control device icons 550, 552, 554 that have been automatically created. Further, the user may be required to create the relationships between the fixture icons 544, 545, 546 and the load control device icons 550, 552, 554 rather than having the design system automatically create the relationships.

The design system may also create (e.g., automatically create) relationships between devices in the load control area 536 in response to the selection of the done button 538 on the draw solution prompt window 530 (e.g., from FIG. 38). For example, the design system may automatically generate relationships between the control-source device(s) (e.g., all of the control-source devices in the load control area 536) and each of the control-target device(s) (e.g., each of the control-target devices in the load control area 536) as indicated by lines 557. For example, the design system may automatically draw the lines 557 between the remote control icon 555 and each of the load control device icons 550, 552, 554 on the canvas 202. The associations (e.g., relationships) defined by the lines 557 may be similar to the relationship defined by the line 224 between the third icon 220 and the fourth icon 222, and may each represent a wireless communication link (e.g., an association between wireless control devices). By automatically creating relationships between the control source device(s) (e.g., the remote control icon 555) and the control-target device(s) (e.g., the load control device icons 550, 552, 554), the user may not need to create the relationships by drawings the lines 557, which may increase productivity and/or efficiency and may reduce human errors. In addition, the user may be configured to edit the relationships between the control source device(s) and the control-target device(s) that have been automatically created. Further, the user may be required to create the relationships between the control source device(s) and the control-target device(s) rather than having the design system automatically create the relationships.

The design system may store information defining the relationships between the fixtures and the devices and/or between the devices of the selected solution in memory. The user may move the device icons with in the load control area 536 after the design system automatically places the device icons on the canvas 202. When the user has completed configuring the solution in the present area, the user may select a draw another area button 558 to draw another area using the presently selected solution or may select a done button 559 to stop placing the present solution and then choose another solution icon 522 from the solutions pane 500 to place on the canvas 202.

Figure 40:
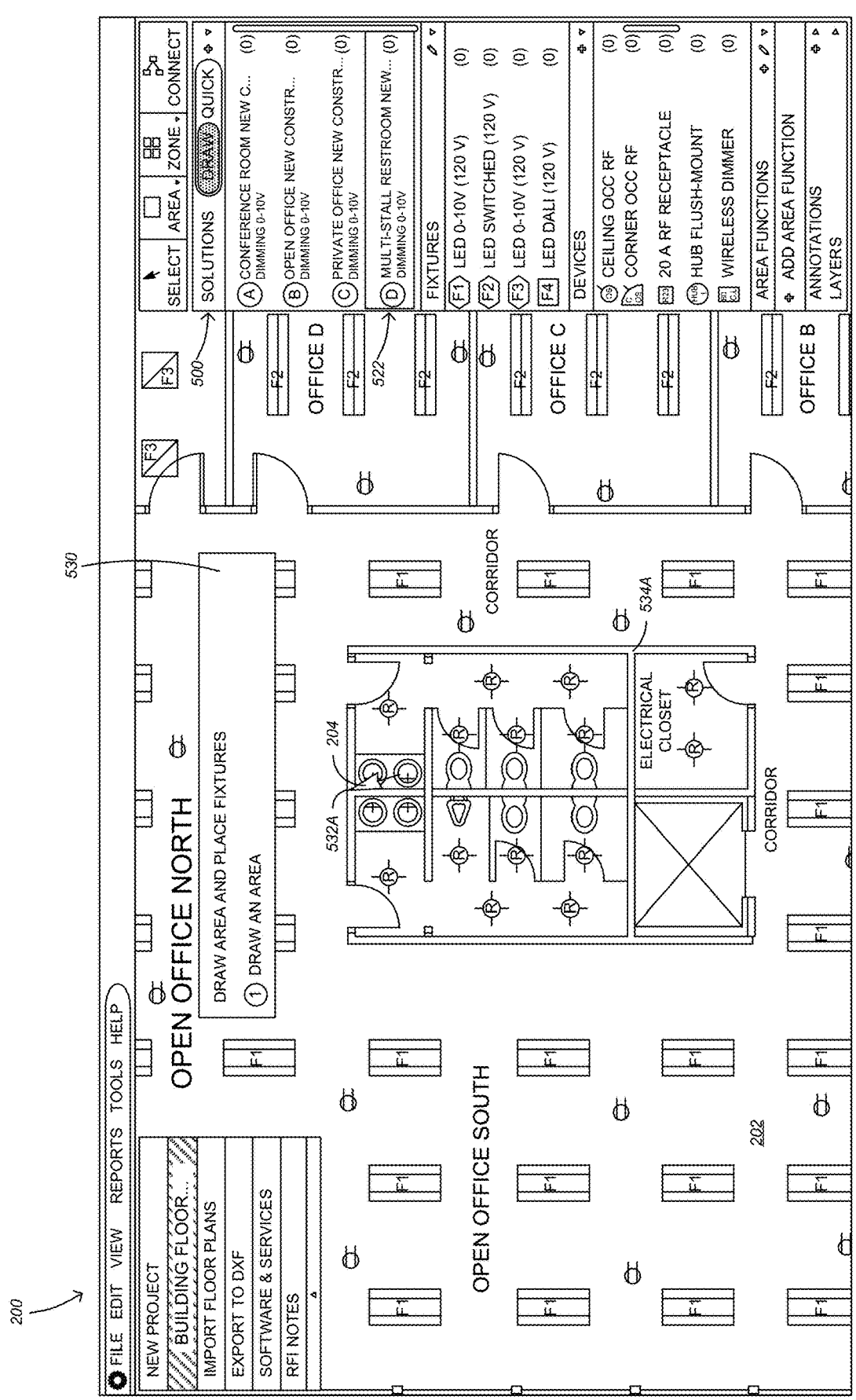
Figure 41:
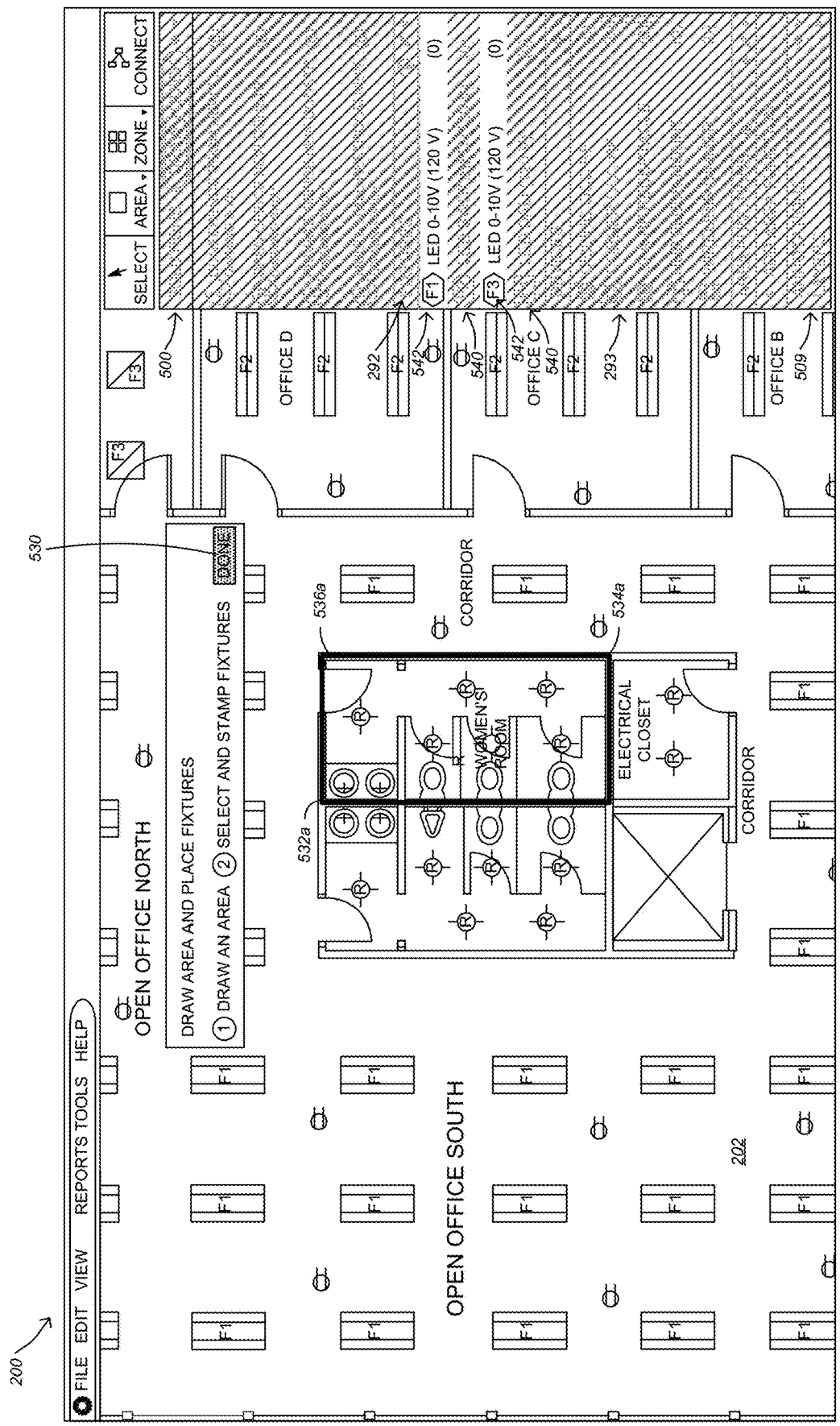
Figure 42:
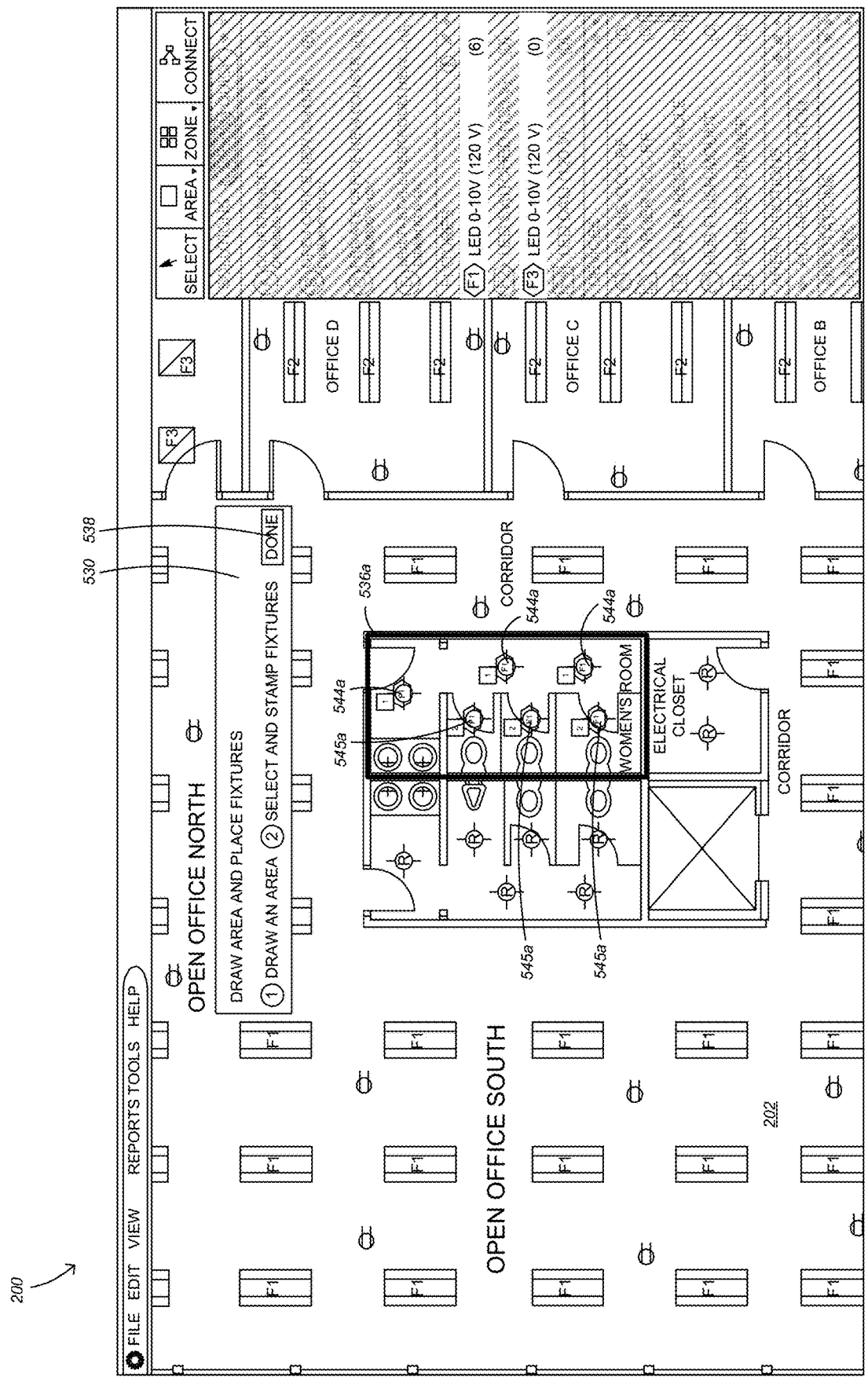

As shown in FIG. 40, upon selection of the done button 559 from the draw solution prompt window 530 (e.g., from FIG. 39), the user may move the canvas 202 to show a different area of the floorplan and select another solution icon 522, such as the multi-stall restroom new construction solution. For example, the user may move the canvas 202 by dragging the floorplan to a different area of the floorplan using the cursor 204 and/or using a button(s) on a keyboard (not shown). The design system may display the draw solution prompt window 530. The user may use the cursor 204 to define an area for identifying and/or associating load control devices and control devices (e.g., remotes, sensors, and/or the like) in a load control environment as described herein. For example, the user may use the cursor 204 to click on a first corner 532*a* of an area (e.g., a bathroom) and drag the cursor towards a second opposing corner 534*a* of the office to draw a load control area 536*a* defining the area on the canvas 202 as shown in FIG. 41. The design system may once again gray out panes to indicate blocked panes (e.g., automatically blocked panes) on the palette 290 other than the fixture pane 292 to prevent the user from selecting icons in the solutions pane 500, the devices pane 293, an area functions pane 509, etc. The design system may also once again gray out panes to indicate blocked icons of fixtures in the fixture pane 292 that are not able to be controlled by the load control devices that are a part of the selected solution to prevent the user from selecting those fixture icons. The user may select the second fixture icons 542 that are not grayed out and indicated to be blocked and place fixture icons 544*a*, 545*a* inside of the load control area 536*a* that defines the area for the selected solution on the canvas 202 as shown in FIG. 42. For example, the fixture icons 544*a* may be connected to a different electrical circuit than the fixture icons 545*a*. When the user is done placing the fixture icons 544a, 545a on the canvas 202, the user may select the done button 538 on the draw solution prompt window 530.

Figure 43:
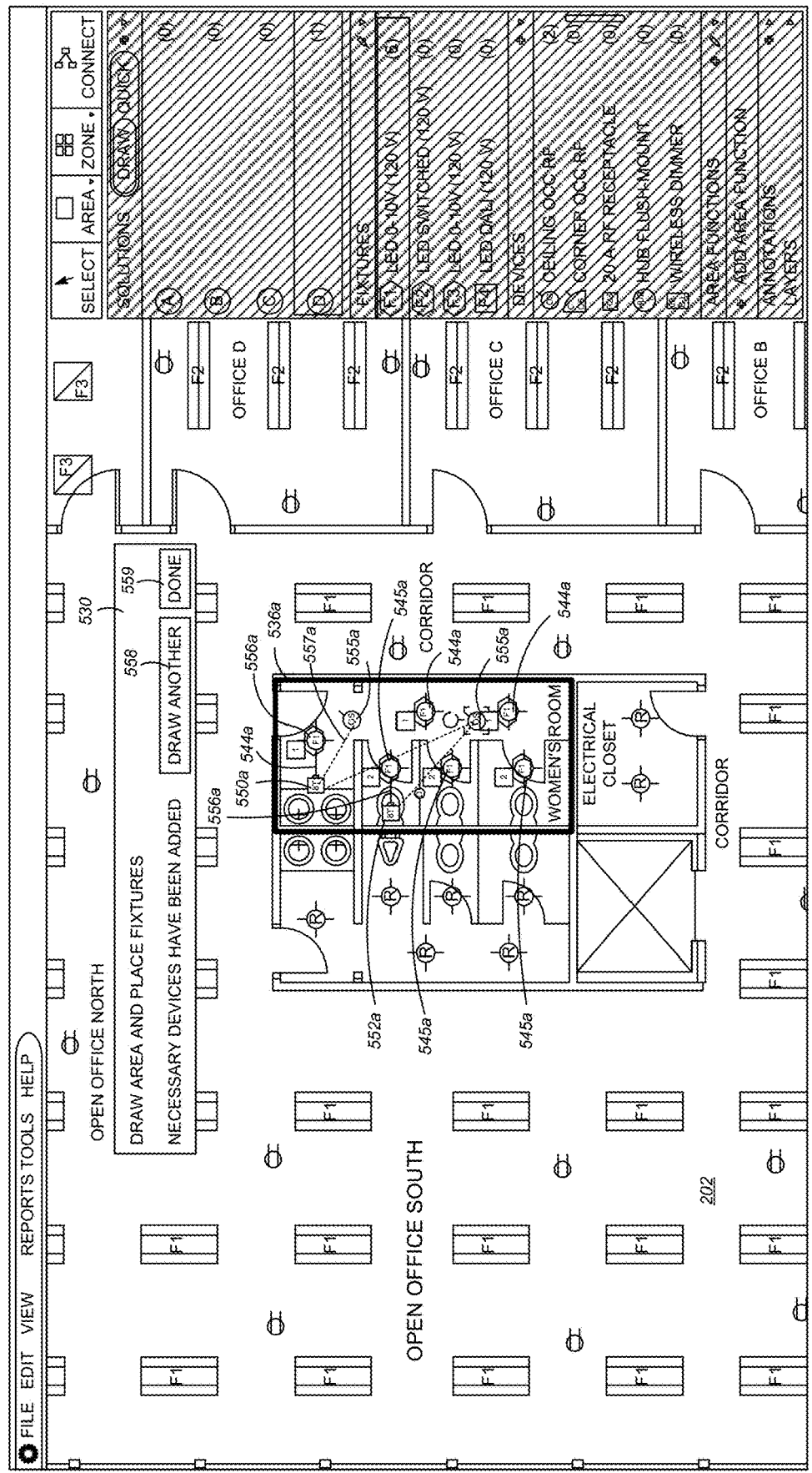

In response to the selection of the done button 538, the design system may automatically place the load control device icons 550a, 552a and sensor device icon 555a, 555b inside of the load control area 536a that defines the area for the selected solution on the canvas 202 as shown in FIG. 43. The design system may be configured to determine the number of each device icon to place on the canvas 202 based on the quantities of the devices listed on the solution description panel 524 of the solution selection window 510 for the selected solution as shown at FIG. 36. The user may drag and drop and/or move the determined number of device icons to place on the canvas 202 using the cursor. The design system may also determine the number of load control device icons 550a, 552a to place on the canvas 202 based on the number of fixture icons 544a, 545a and/or electrical circuits established by the fixture icons in the load control area 536a that defines the area for the selected solution. For example, as shown in FIG. 43, the design system may determine to place two load control device icons 550a, 552a since the user defined two electrical circuits for the fixture icons 544a, 545a in the load control area 536a that defines the area for the selected solution. As described herein, if the design system determines and places the load control device icons based on the user's selection on the number of electrical circuits for the fixture icons in the load control area, the user may not worry about missing and/or placing one or more load control device icons associated with the fixture icons (e.g., as the design system determines appropriate numbers for the user). Also, for a large construction projects, such as a large-scale multistory office building, the user may not think about this level of granularity for each room for the project as the design system would autogenerate appropriate number of the load control device icons associated to the user's selected fixture icons. This may increase productivity and/or efficiency and may reduce human errors.

As shown in FIG. 43, the design system may automatically create associations (e.g., relationships) between the fixtures and the devices and/or between the devices in response to the selection of the done button 538 on the draw solution prompt window 530. For example, the design system may automatically generate relationships between each of the load control device icons 550a, 552a and at least one of the fixture icons 544a, 545a of the respective electrical circuits as indicated by lines 556a (e.g., similar to the lines 556 of FIG. 39). The design system may also automatically generate relationships between each of the load control device 550a, 552a and each of the sensor devices 555a, 555b as indicated by lines 557a (e.g., similar to the lines 557 of FIG. 39). The user may move the device icons with in the load control area 536a after the design system automatically places the device icons on the canvas 202.

Figure 44:
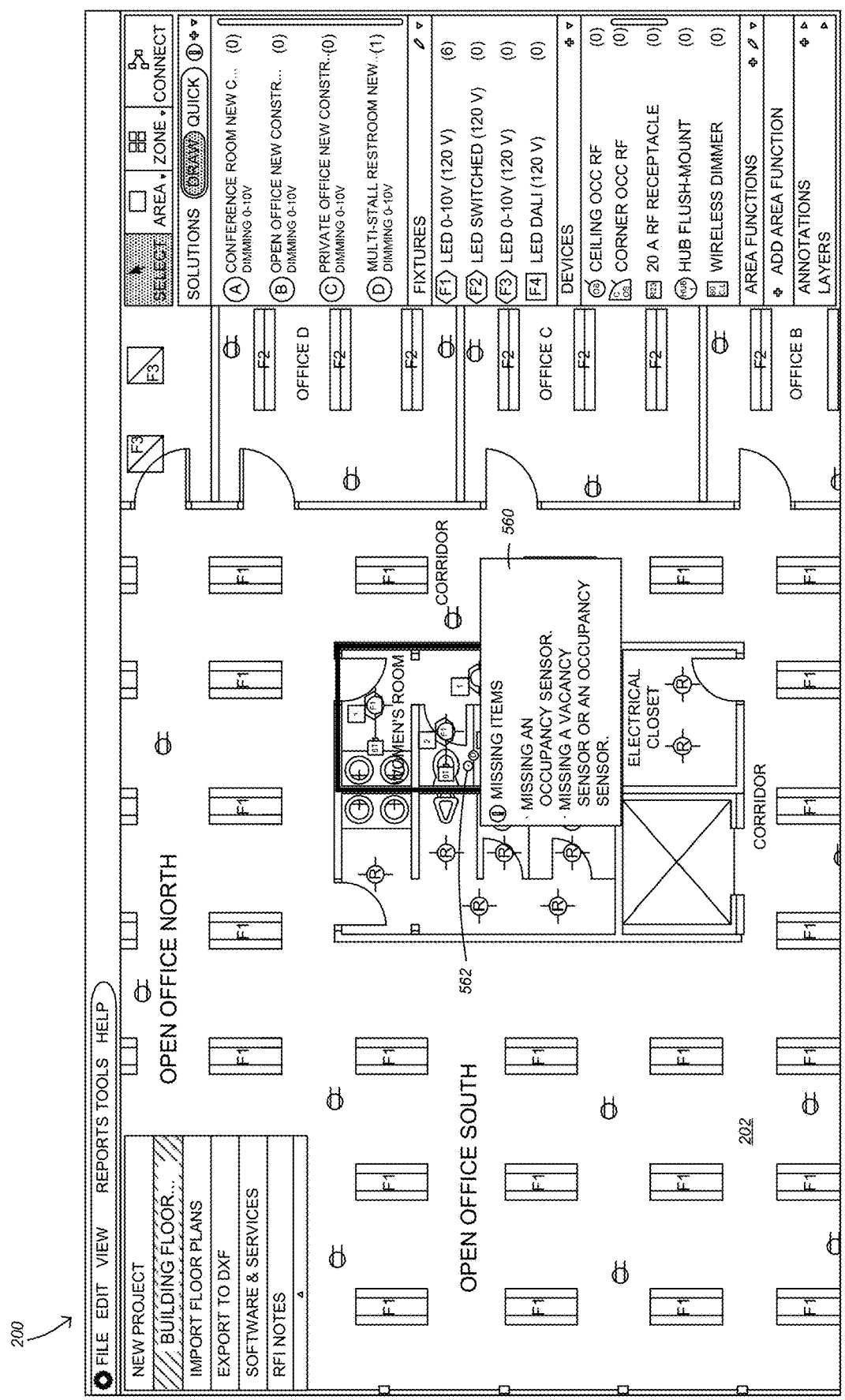

As previously mentioned, each load control template may include one or more different types of devices (e.g., a particularly load control device, a particular remote control device, and/or a particular sensor device) as defined by the list of devices 527 on the solution description panel 524 of the solution selection window 510 as shown at FIG. 36. If the types and/or number of devices of the load control area 536a is adjusted by the user such that the load control area 536a does not include at least one of the required device types, the design system may display a warning window 560 as shown in FIG. 44. For example, based on the selected energy code that the user previously selected, one or more devices may be auto-populated in the load control area. If the user incorrectly and/or accidently deletes one or more auto-populated devices from the load control area that may be needed based on the selected energy code, the design system may detect the missing device and may alert the user by prompting a warning window 560. The warning window 560 may alert the user what device is missing from the load control area. For example, the sensor device icons 555a, 555b may be deleted (e.g., accidently or incorrectly deleted) from the load control area 536a as shown in FIG. 44 and may not be associated with the load control system. The design system may display a warning icon 562 in the load control area 536a in response to the user deleting and/or disassociating the sensor device icons 555a, 555b.

Figure 45:
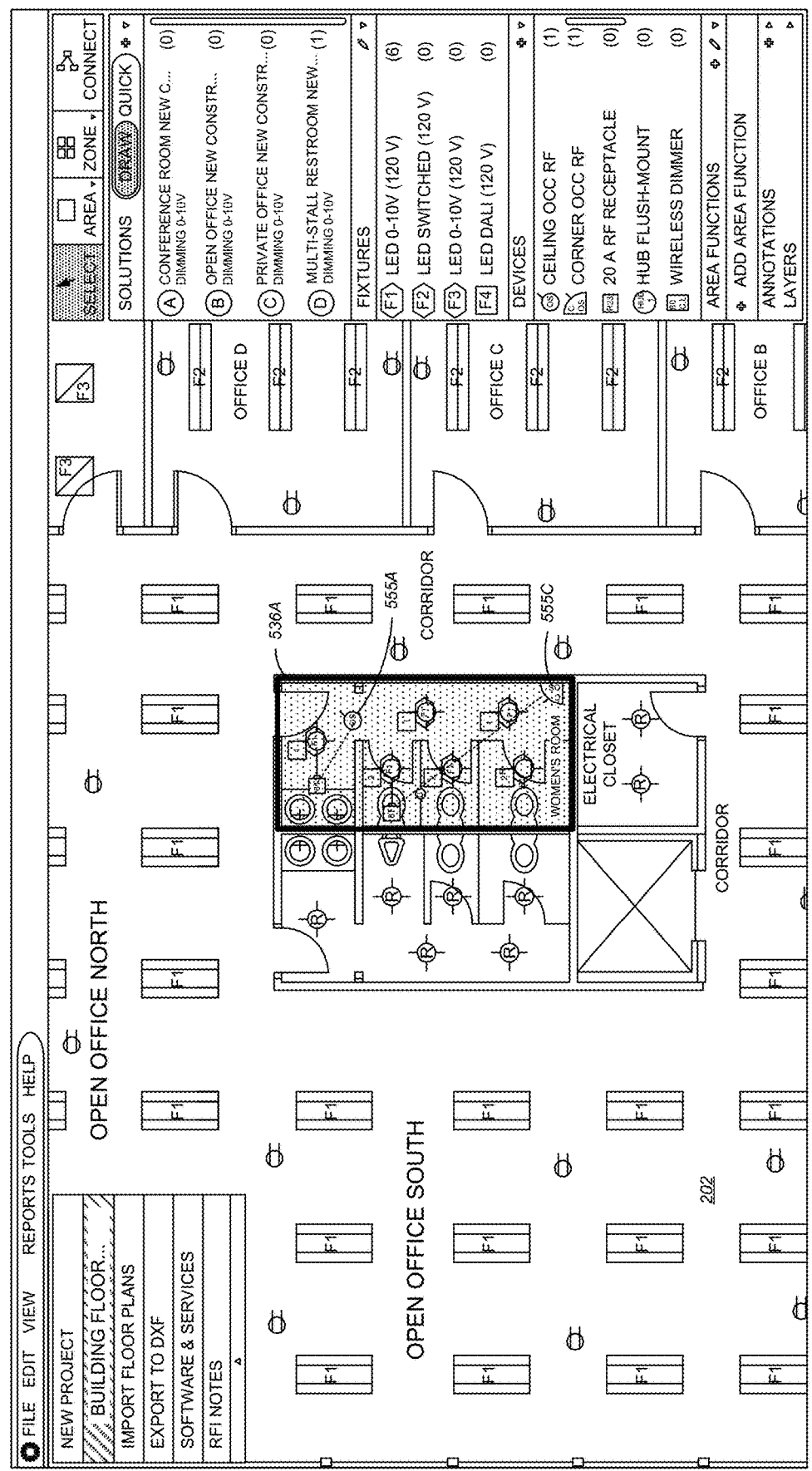

If the user adds the sensor device icons and/or adds an equivalent sensor device icon into the load control area 536a, the warning window 560 and/or the warning icon 562 may be removed as shown in FIG. 45. For example, the sensor device icon 555a (e.g., representing a ceiling-mounted occupancy sensor) may be added back to the load control area 536a) along with a new sensor device icon 555c (e.g., representing a different type of occupancy sensor, such as a corner wall-mounted occupancy sensor that may be an equivalent occupancy sensor for the selected energy code). Even though the ceiling-mounted occupancy sensor may be specified in the list of devices 527 on the solution description panel 524 of the solution selection window 510 for the selected solution, the user may select and associate other types of occupancy sensors (e.g., such as the corner wall-mounted occupancy sensor) with the load control system to satisfy the requirement for the device type of the selected solution. The design system may also present one or more recommended devices that may also meet standards (e.g., such as other devices that would satisfy energy usage requirements). The user may select one or more recommended devices and may associate with the load control system in the load control area 536a.

Figure 46:
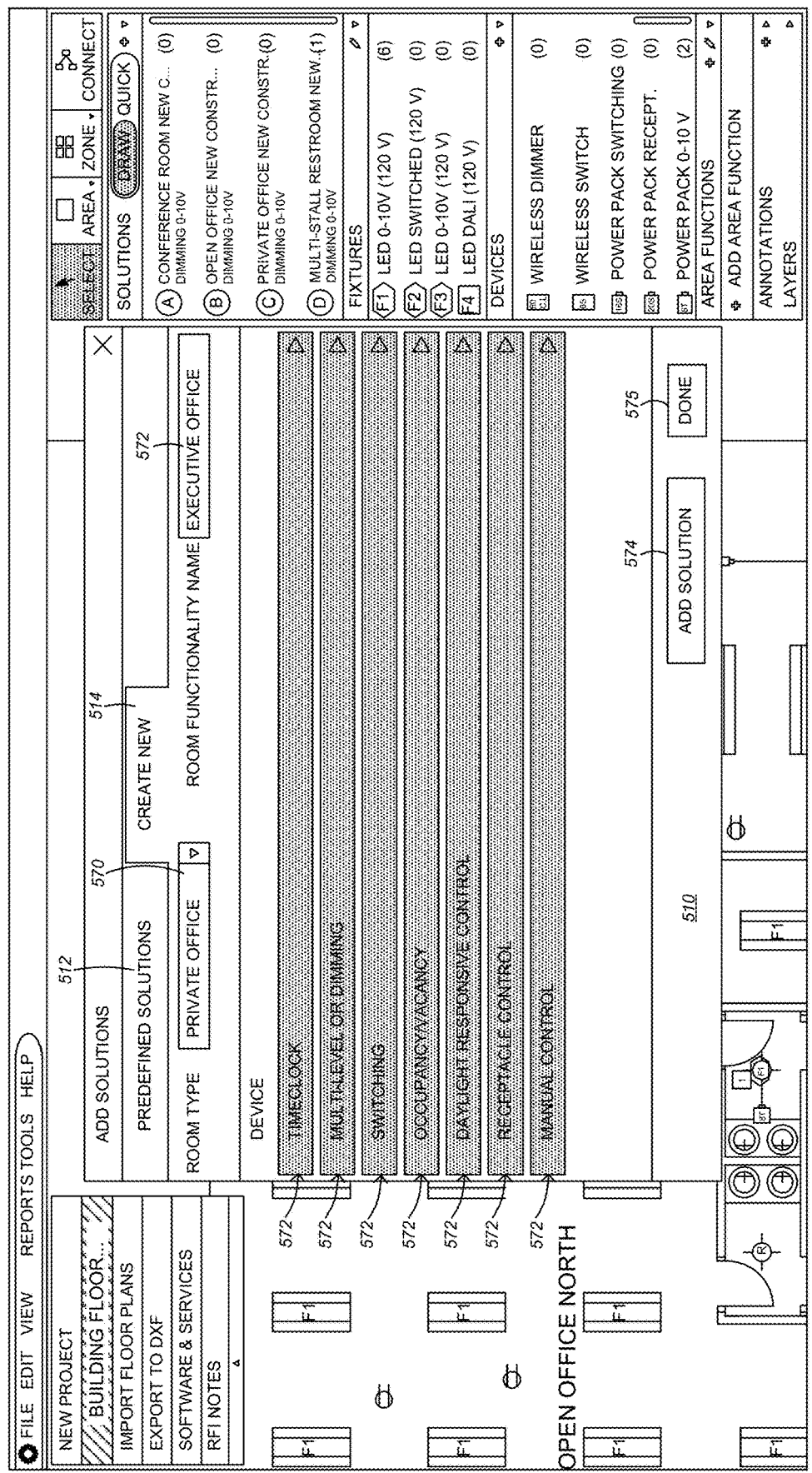
Figure 47:
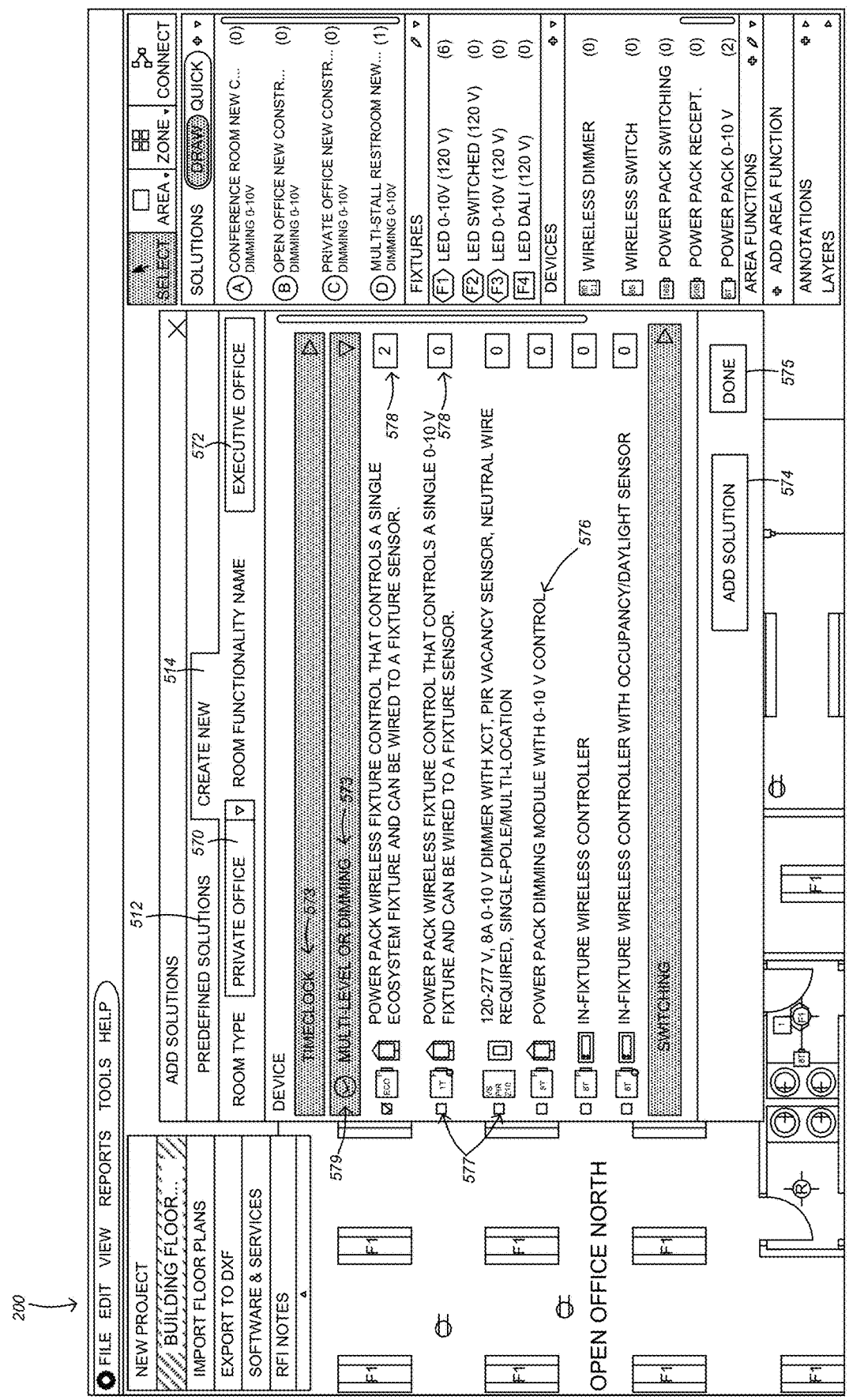
Figure 48:
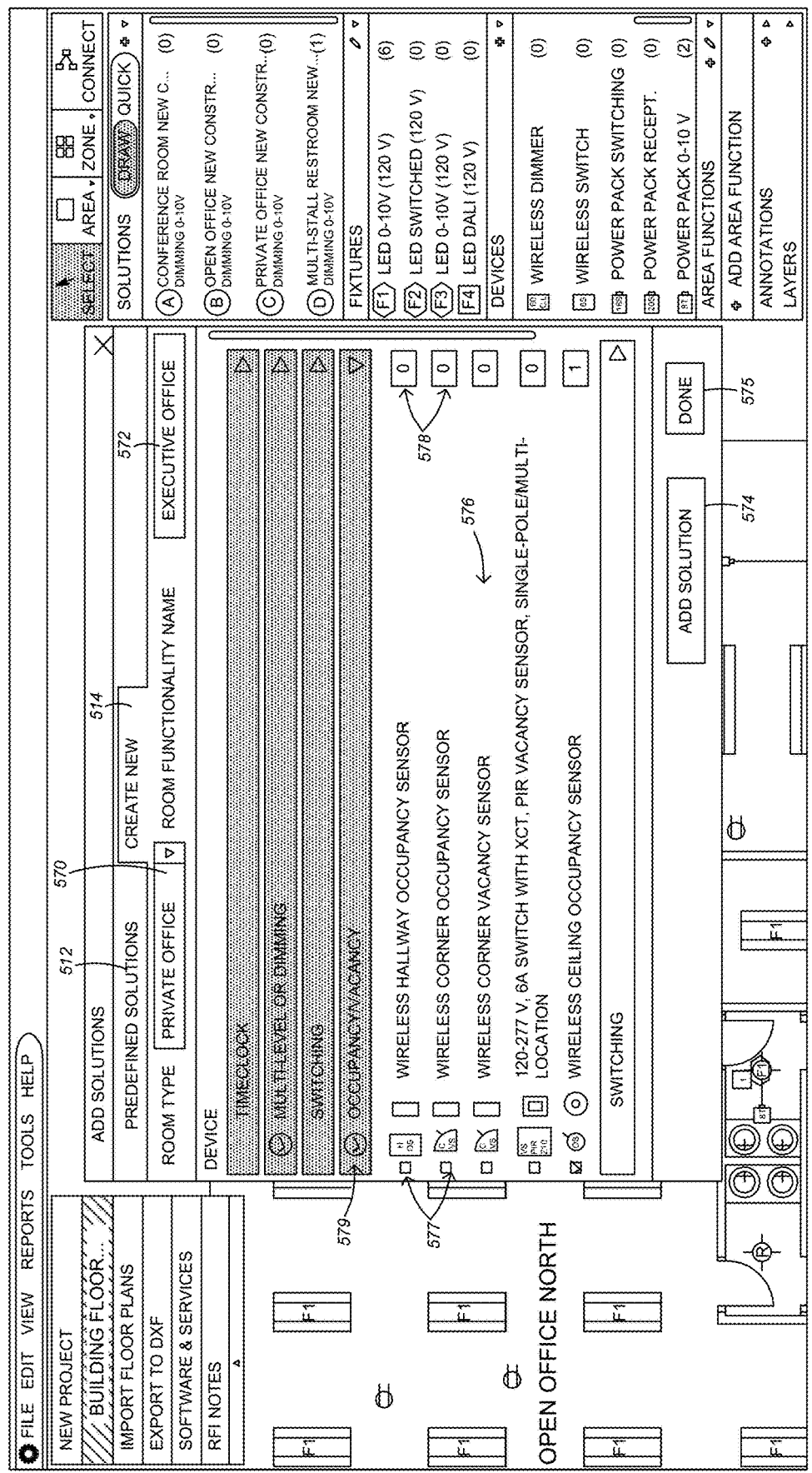
Figure 49:
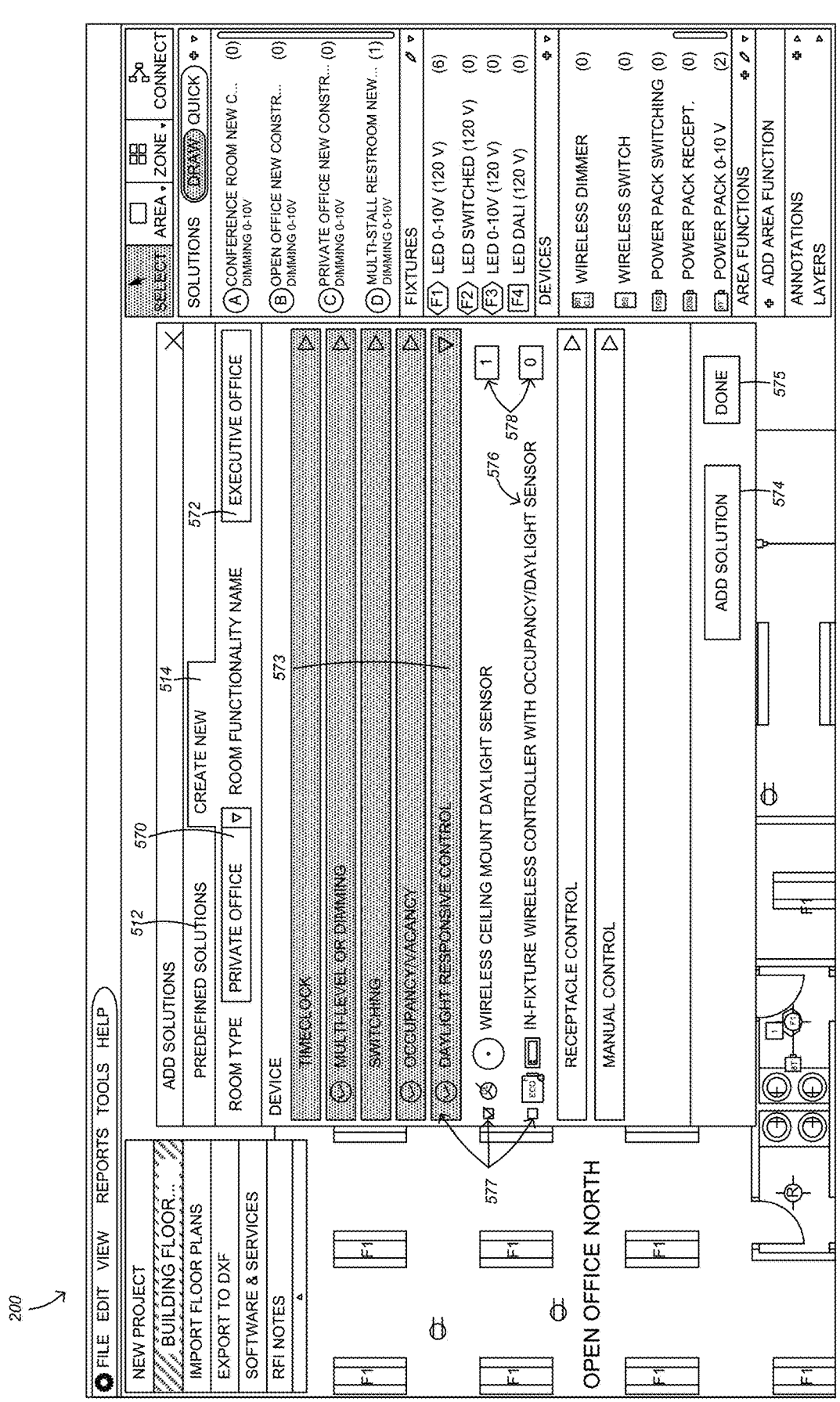

When the create new tab 514 of the solutions selection window 510 is selected, the solutions selection window 510 may display a room type selection tool 570, a room functionality name field 572, and one or more device types 573 (which may be collapsed) as shown in FIG. 46. For example, the room type selection tool 570 may allow for the selection of one of a plurality of room types for which to create a new load control template (e.g., a new solution). The room functionality name field 572 may allow the user to enter a unique name and/or function associated with the new load control template (e.g., new solution) that is being created. When one of the device types 573 is selected (e.g., multi-level or dimming device type) as shown in FIG. 47, the window may expand to display a list of devices 576 of the selected device type that may be added to the new load control template (e.g., new solution). For example, the list of devices 576 may show devices that may be associated with the load control system for the selected room type. As shown in FIG. 47, each device in the list of devices 576 may have a respective check box 577 and a respective quantity field 578. The user may select one of the devices of the list of devices 576 by checking the respective check box 577 and may adjust the recommended quantity for that device by entering a number in the respective quantity field 578. When at least one of the devices of the list of devices 576 of the selected device type 573 is checked, a check icon 579 may be displayed next to the name of the selected device type. The user may select another device type (e.g., occupancy/vacancy device type) to display the list of devices 576 for that device type as shown in FIG. 48. The user may select another device type (e.g., daylight responsive control device type) to display the list of devices 576 for that device type as shown in FIG. 49. When the user is done configuring the new load control template (e.g., new solution), the user may click on an add solution button 574 to add the new solution to the solutions pane 500 and create another new solution, or may click on a done button 575 to add the new solution to the solutions pane 500 and close the solutions selection window 510.

Figure 50:
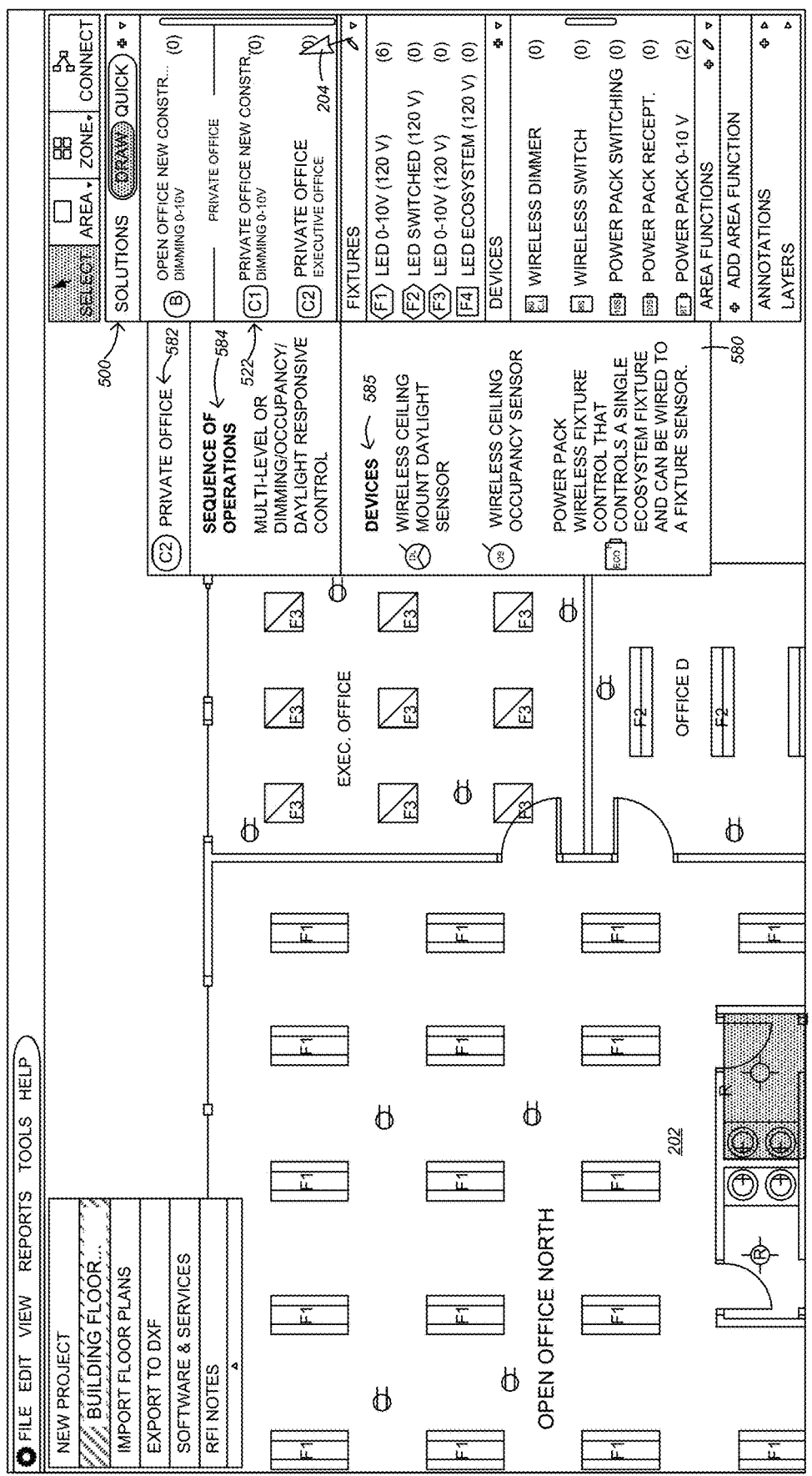

If the user hovers the cursor 204 over one of the solution icons 522 in the solutions pane 500 (e.g., the solution icon for the newly-created executive office solution), the design system may display a solution info window 580 as shown in FIG. 50. The solution info window 580 may display a room type section 582, a sequence of operations section 584, and a devices section 585 for the solution icon 522 over which the cursor is hovering. The solution info window 580 may provide a quick summary of the load control template associated with the particular solution when the user hovers the cursor 204 over the solution icon 522. The user may use this information before dragging and dropping a solution icon 522 into the canvas 202 and/or when a solutions icon 522 is located on the canvas 202 as described herein.

Figure 51:
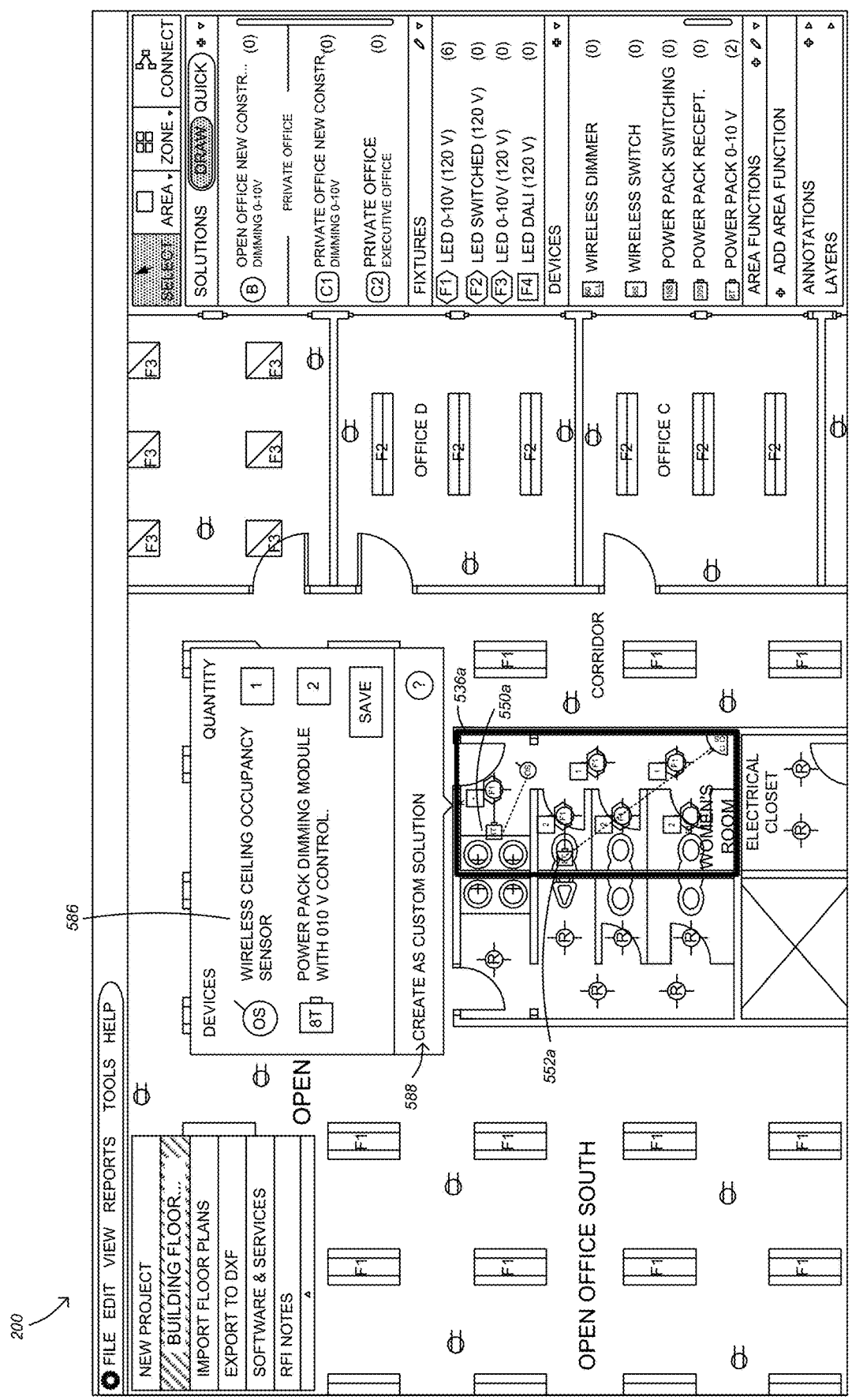
Figure 52:
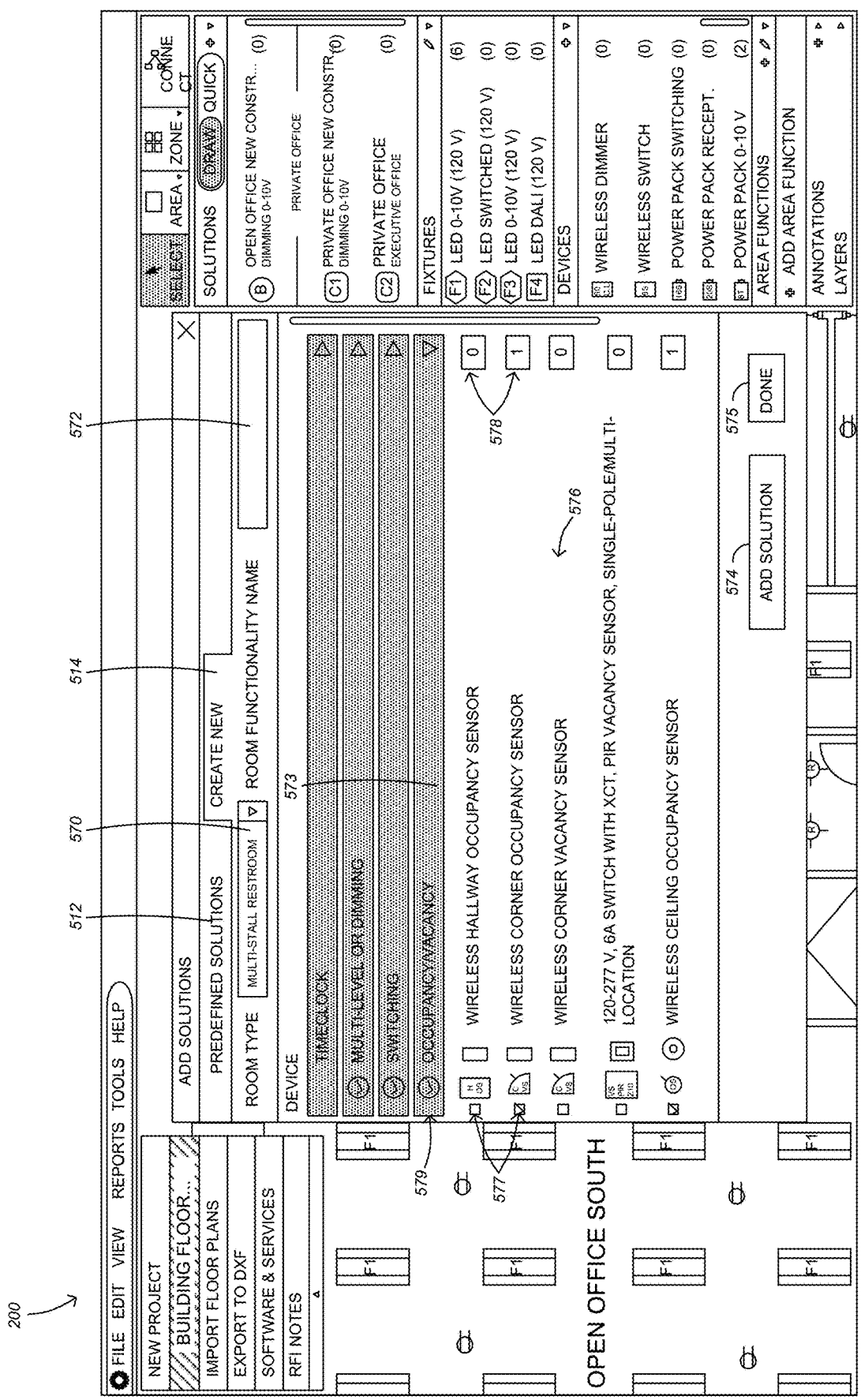

As previously described with reference to FIG. 45, the user may edit the type of devices in one of the solutions on the canvas 202, for example, by adding the sensor device icon 555c representing the corner wall-mounted occupancy sensor and creating relationships between the sensor device icon 555c and the load control device icons 550a, 552a. Referring to FIG. 51, the user may save an edited load control template (e.g., edited solution) as a new load control template (e.g., new solution) by right-clicking on the area, which may cause a solution edit window 586 to appear as shown in FIG. 51. The solution edit window 586 may display a "create as custom solution" option 588. In response to a selection of the "create as custom solution" option 588, the design system may display the create new tab 514 of the solutions selection window 510 with the devices of the edited solution selected as shown in FIG. 52.

Figure 53:
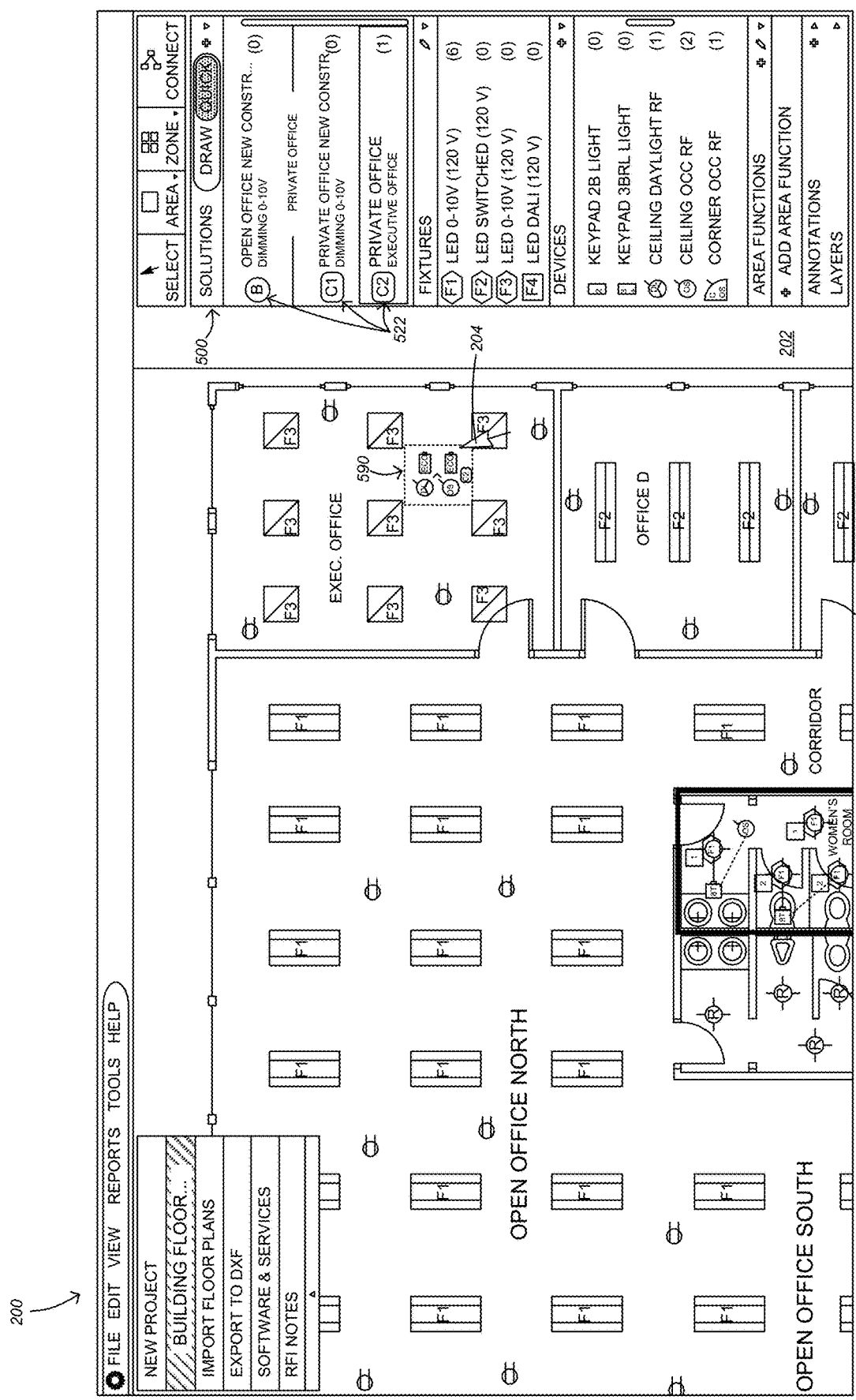
Figure 54:
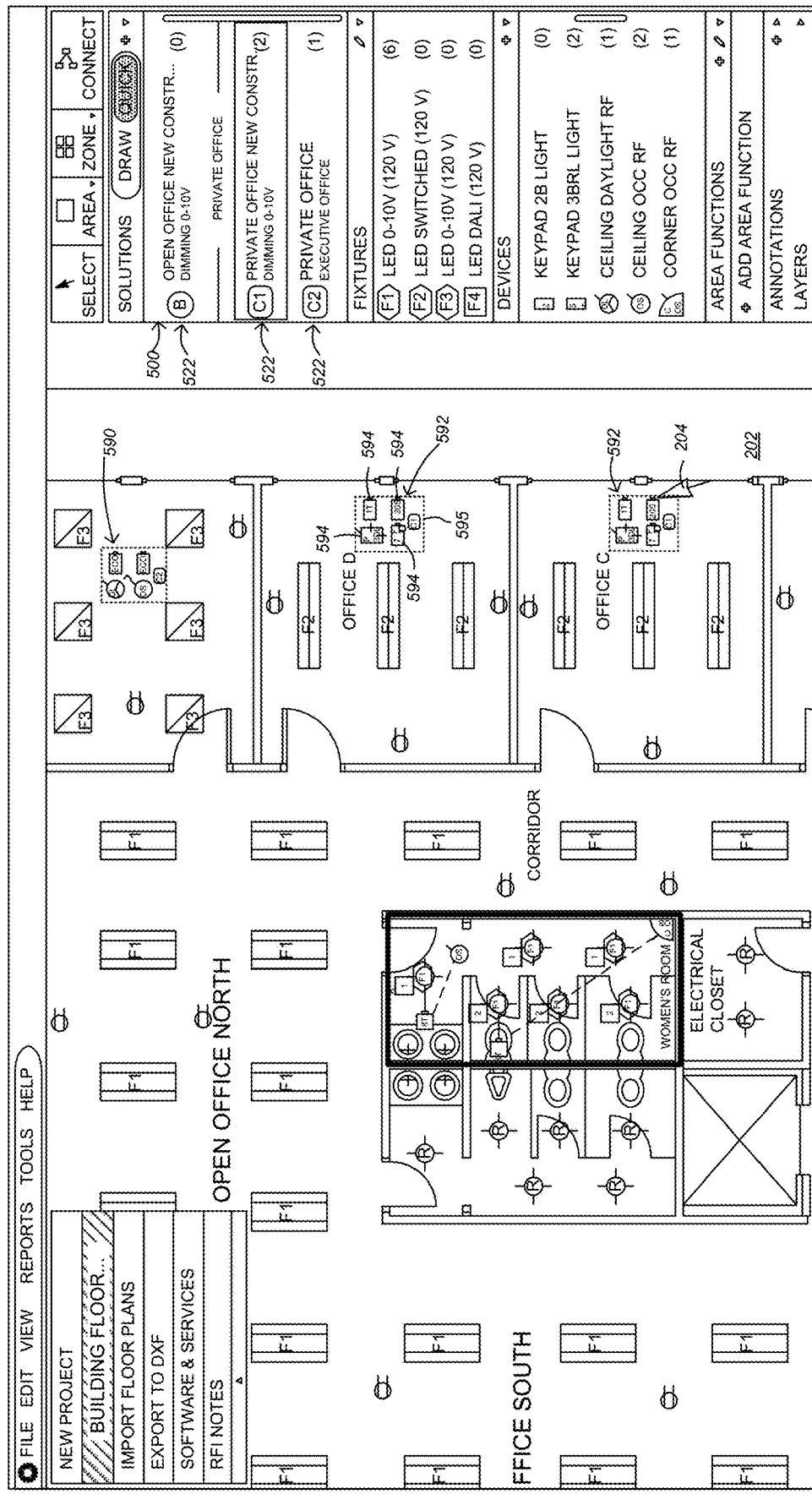
Figure 55:
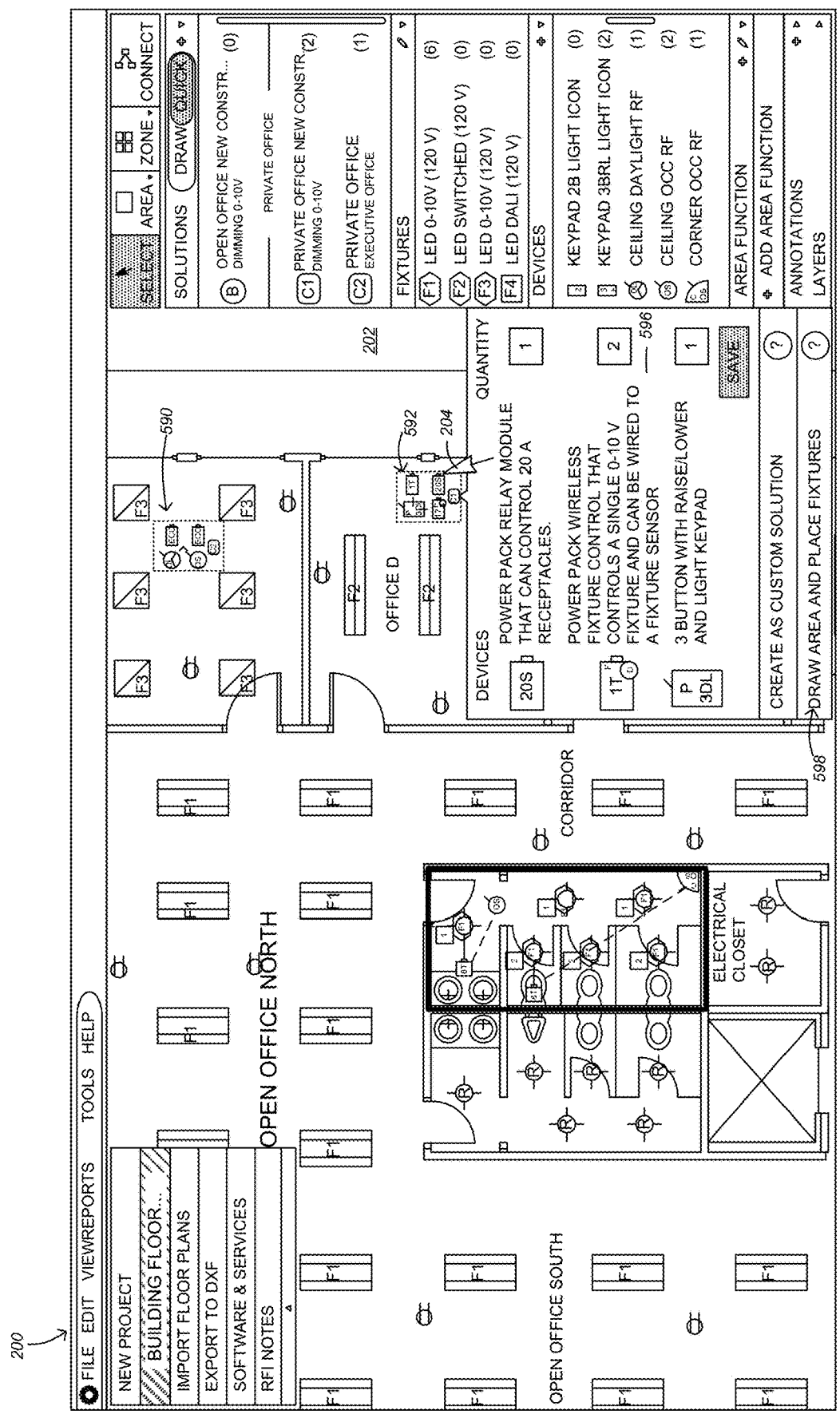

As shown in FIG. 53, the user may switch to the quick-add solution mode using the draw/quick selection tool 502 of the solutions pane 500. When one of the solution icons 522 is selected and when the design system is operating in the quick-add solution mode (e.g., the solution icon for the newly-created executive office solution), the user may be able to place one or more solution group icons 590 for the selected solution on the canvas 202 using the cursor 204 as shown in FIG. 53. The user may select another one of the solution icons 522 when the design system is operating in the quick-add solution mode (e.g., the solution icon for the private office new construction solution) and place one or more solution group icons 590, 592 for the selected solution on the canvas 202 as shown in FIG. 54. Each solution group icon 590, 592 may include device icons 594 (e.g., the load control device icons, the remote control device icons, and/or the sensor device icons) for the selected solution located inside of a respective load control frame 595. The devices in the load control frame 595 may associate with the load control system as described herein. The user may resize the load control frame 595 of each solution group icon 590, 592 to make the load control frame bigger or smaller. The user may move the device icons 594 around inside of each load control frame 595. The user may right-click on one of the solution group icons 592 to cause the design system to display a solution edit window 596 to appear as shown in FIG. 55. The solution edit window 596 may display a "draw area and place fixtures" option 598. In response to a selection of the "draw area and place fixtures" option 598, the design system may switch to the draw solution mode to allow the user to draw the area for the selected solution (e.g., as shown in FIG. 37) and place fixture icons for the area (e.g., as shown in FIG. 38).

Figure 56:
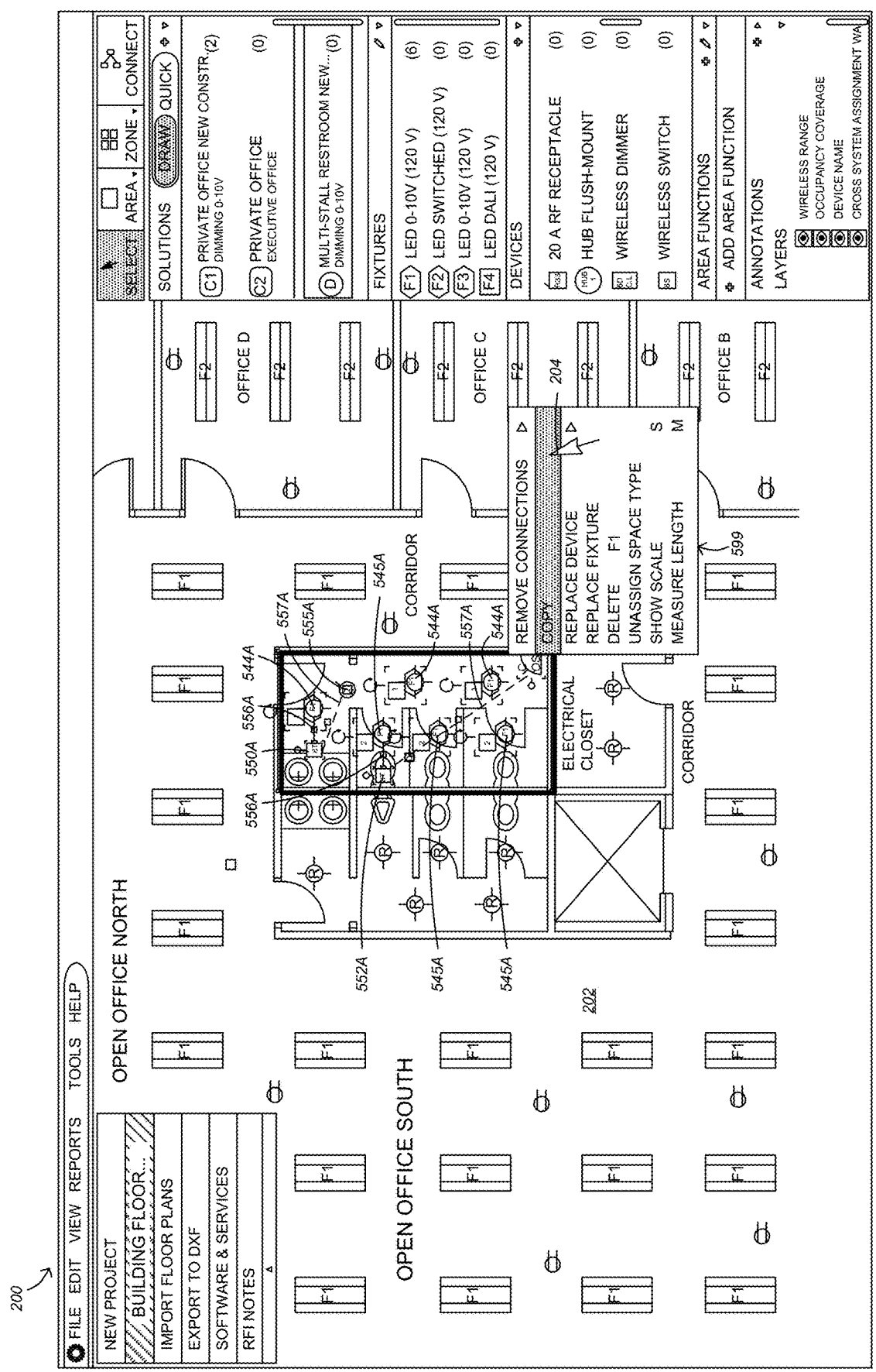
Figure 57:
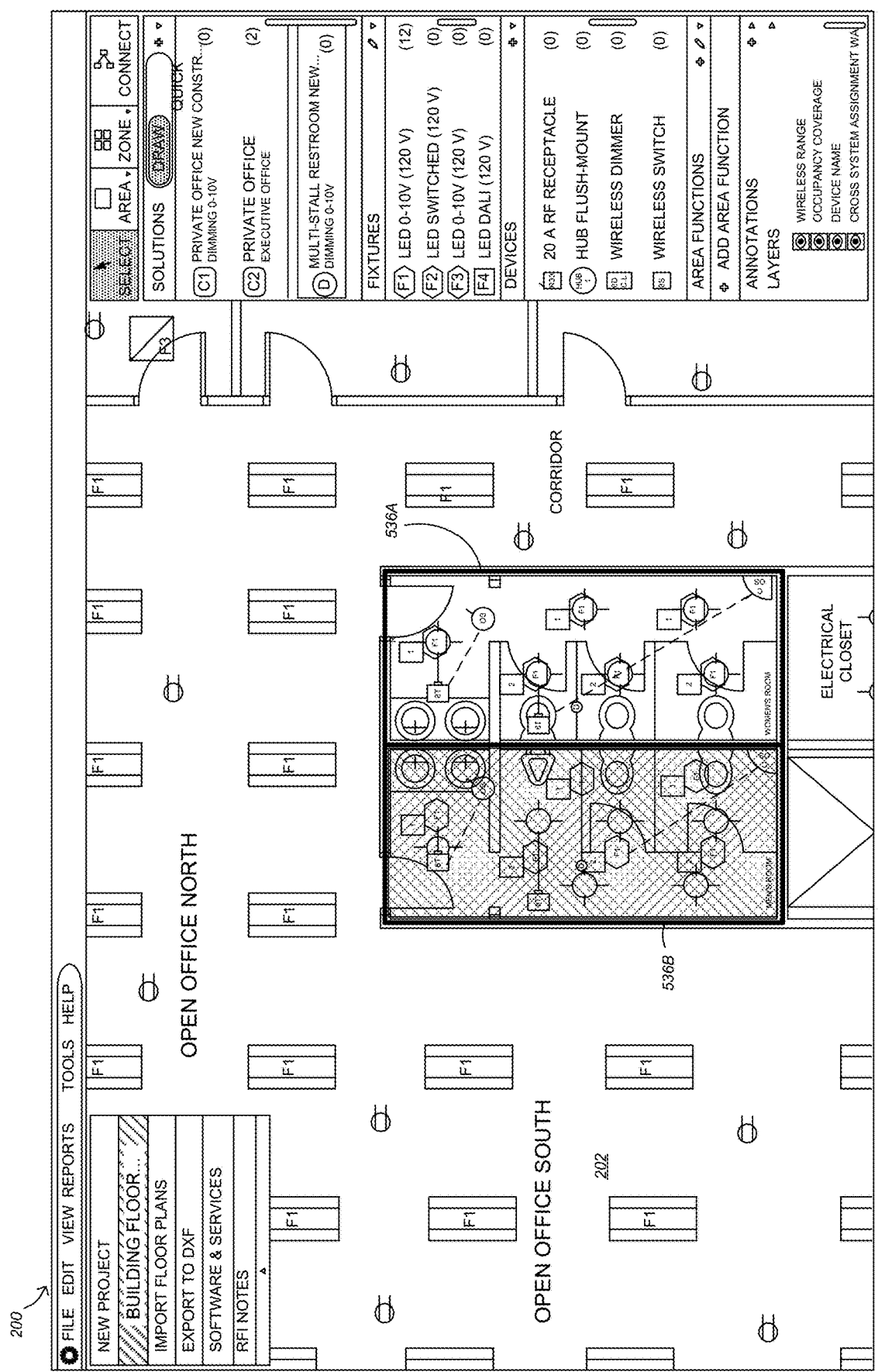
Figure 58A:
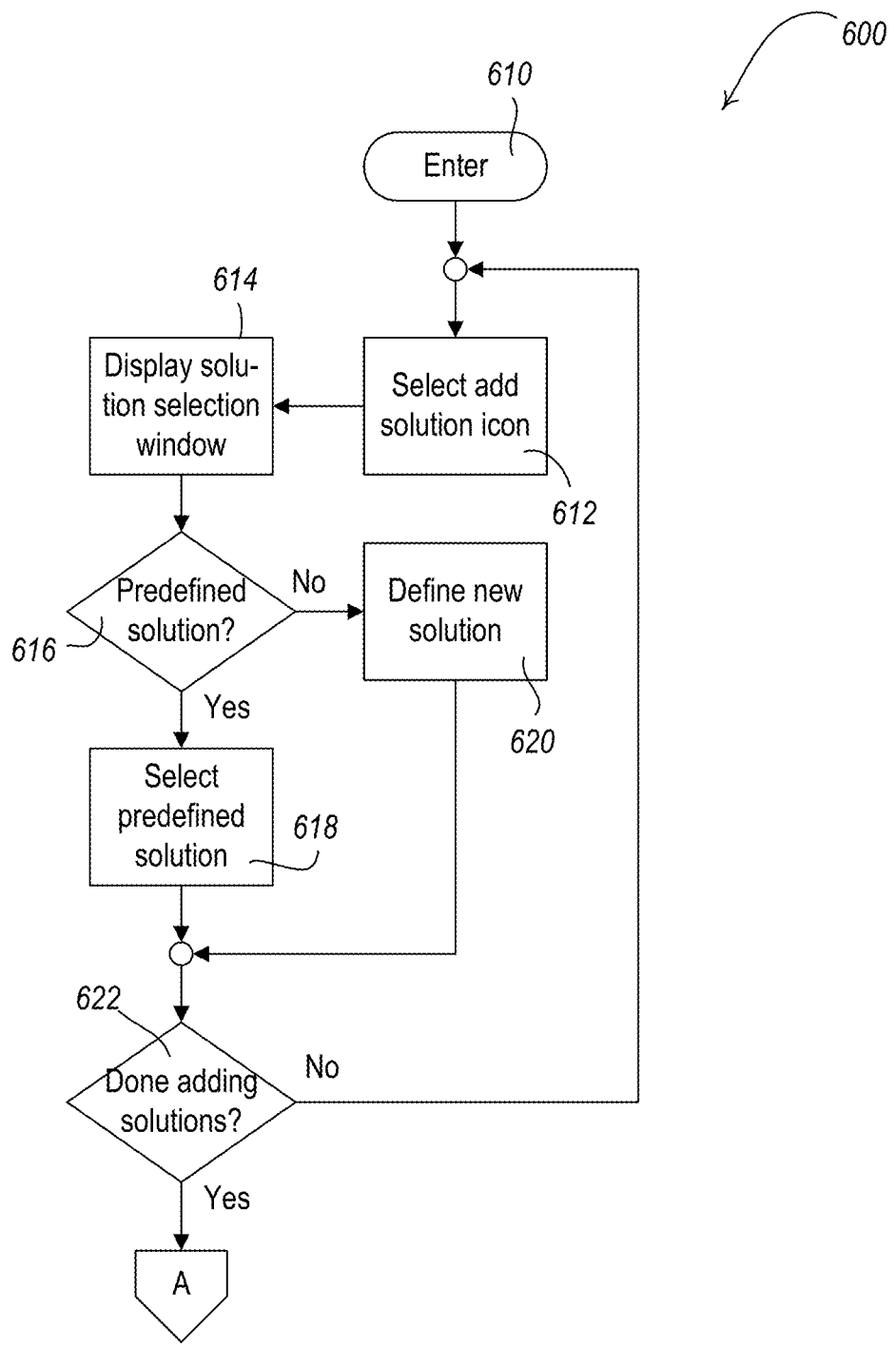
FIGS. 58A and 58B show flowcharts of an example configuration procedure of a load control system using templates (e.g., solutions) in a graphical user interface software.
Figure 58B:
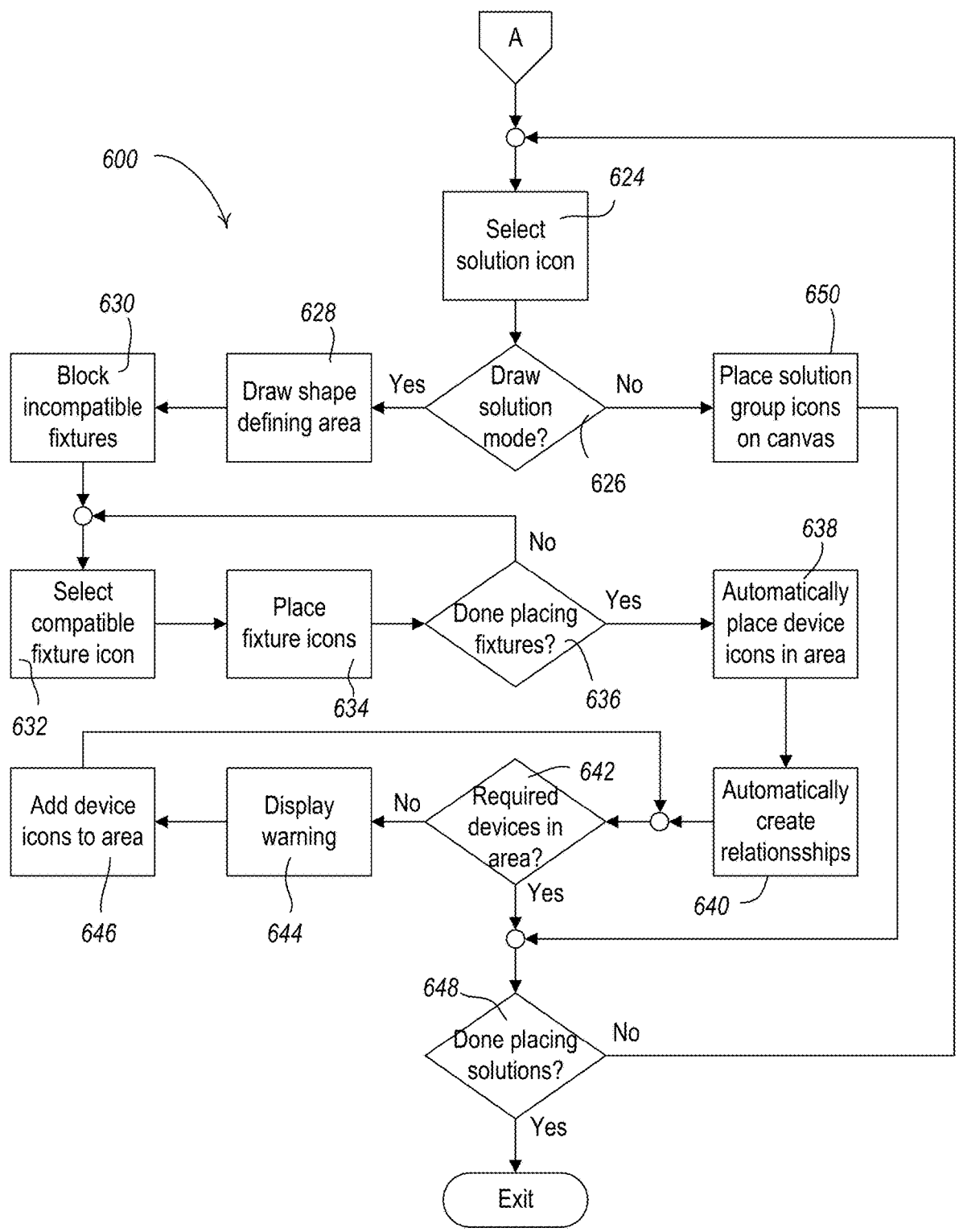

The user may also copy a solution (e.g., the areas, fixture icons, and device icons associated with the solution) on the canvas 202. As shown in FIG. 56, the user may select a solution (e.g., the entire load control area of a solution) on the canvas 202 using the cursor 204 and right-click on the selected solution to cause the design system to display an options menu 599. The user may select "copy" from the options menu 599 to cause a copy 536b of the load control area 536a to be displayed on the canvas 202 as shown in FIG. 57. The user may move the copy 536b of the load control area 536a to a desired location, for example, over another bathroom on the canvas 202 as shown in FIG. 57. As described herein, the user may copy one or more load control templates FIGS. 58A and 58B show a flowchart of an example method 600 for configuring a load control system using templates (e.g., solutions) in a graphical user interface software (e.g., the design software). The method 600 may be performed by one or more network devices in a load control system, such as the load control system 100 shown in FIG. 1. The method 600 may be performed on a single device, or may be distributed across multiple devices. For example, the method 600, or portions thereof, may be performed by one or more network devices, such as personal computers (PCs), laptops, tablets, smart phones, servers, or equivalent devices having access to a visual display. A portion of the method 600 may be performed by a user interacting with the design software executed by the network devices.

The method 600 may begin at 610. At 612, the user may select an add solution icon (e.g., the add solution icons 504, 508) from a solutions pane (e.g., the solutions pane 500 as shown in FIG. 34). At 614, the design software may display a solution selection window (e.g., the solution selection window 510 as shown in FIG. 35). If the user wants to select a predefined solution at 616 (e.g., by selecting the predefined solutions tab 512 of the solution selection window 510), the user may select a predefined solution at 618 (e.g., one of the solutions 520 as shown in FIG. 36). If the user does not want to select a predefined solution at 616 (e.g., by selecting the create new tab 514 of the solution selection window 510), the user may create a new solution at 620. If the user is not done adding solutions at 622, the user may select the add solution icon again at 612.

If the user is done adding solutions at 622, the user may select a solution icon (e.g., one of the solution icons 522) from the solutions pane at 624 (e.g., as shown in FIG. 37). If a draw solution mode is selected at 626 (e.g., using the draw/quick selection tool 502), the user may draw a shape on a canvas (e.g., the canvas 202) to define an area (e.g., such as the areas defined by load control areas 536, 536a) at 628. The design software may block the selection of fixture icons in a fixture pane (e.g., the fixture pane 292) that are incompatible with load control devices of the selected solution at 630. For example, the design software may gray-out incompatible fixture icons in the fixture pane to prevent those icons from being selected at 630 (e.g., as shown in FIG. 38). The user may select one of the fixture icons that are compatible with the load control devices of the selected solution at 632 and may place one or more of the selected fixture icons on the canvas in the area of the selected solution at 634 (e.g., as shown in FIG. 38). If the user is not done placing fixture icons at 636, the user may continue to select compatible fixture icons at 632 and place the selected fixture icons on the canvas at 634.

When the user is done placing fixture icons at 636, the design software may automatically place device icons (e.g., load control device icons, remote control device icons, and/or sensor device icons) for the devices of the selected solution in the area on the canvas at 638 (e.g., as shown in FIG. 39). For example, the design software may place multiple device icons (e.g., load control device icons) at 638 if the user has defined multiple electrical circuits in the area when placing fixture icons at 634. The design software may automatically create relationships between the device icons and/or the fixture icons in the area of the selected solution and may store information defining the relationships in memory at 640. For example, the design software may automatically draw lines between load control device icons and fixture icons on the canvas in the area of the selected solution at 640. In addition, the design software may also automatically draw lines between load control device icons and remote control device icons on the canvas in the area of the selected solution at 640.

If the area of the selected solution does not include all of the required device types at 642, the design software may display a warning at 644 (e.g., such as the warning window 560 as shown in FIG. 44). At 646, the user may add device icons of the missing device types to the area of the selected fixture and/or may create relationships between the newly-added device icons and other device icons and/or fixture icons in the area. If the area of the selected solution includes all of the required device types at 642, and the user is not done placing solutions at 648, the user may select another solution icon from the solutions pane at 624. If the draw solution mode is not selected at 626 (e.g., a quick add solution mode is selected), the user may place solution group icons (e.g., such as the solution group icons 590, 592 shown in FIG. 54) at 650. When the user is done placing solutions at 648, the method 600 may exit.

Figure 59:
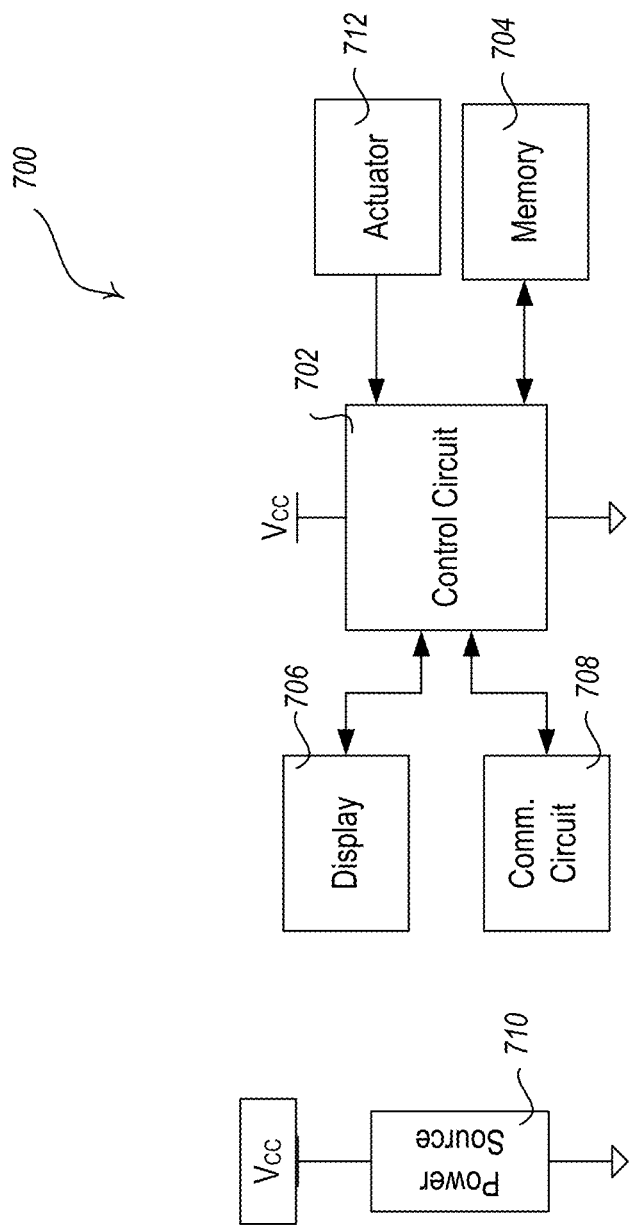
FIG. 59 is a block diagram of an example computing device.

FIG. 59 is a block diagram illustrating an example computing device 700 as described herein. For example, the computing device 700 may be a computer (e.g., the computer 144 shown in FIG. 1), a laptop, a smart phone, a network device, or other suitable processing device. The computing device 700 may include a control circuit 702 for controlling the functionality of the computing device 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, or any other functionality that enables the computing device 700 to perform as described herein. For example, the control circuit 702 may be configured to operate as the design system as described herein and may be configured to execute the design software.

The control circuit 702 may store information in and/or retrieve information from a memory 704. The memory 704 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may store the relationships between the fixtures and/or devices and other design data as defined by the design system and/or design software as described herein.

The computing device 700 may include a communications circuit 708 for transmitting and/or receiving information. The communications circuit 708 may perform wireless and/or wired communications. The communications circuit 708 may include an RF transceiver or other circuit capable of performing wireless communications via an antenna. Communications circuit 708 may be in communication with control circuit 702 for transmitting and/or receiving information.

The control circuit 702 may be in communication with a display 706 (e.g., a visual display) for providing information to a user. The processor 702 and/or the display 706 may generate GUIs for being displayed on the computing device 700. The display 706 and the control circuit 702 may be in two-way communication, as the display 706 may include a touch screen module capable of receiving information from a user and providing such information to the control circuit 702. The computing device 700 may include an actuator 712 (e.g., one or more buttons) that may be actuated by a user to communicate user selections to the control circuit 702. The display 706 may be configured to display the screens of the GUI-based design window 200 shown in FIGS. 2-57.

Each of the modules within the computing device 700 may be powered by a power source 710. The power source 710 may include an AC power supply or DC power supply, for example. The power source 710 may generate a supply voltage $V_{cc}$ for powering the modules within the computing device 700.

Figure 60:
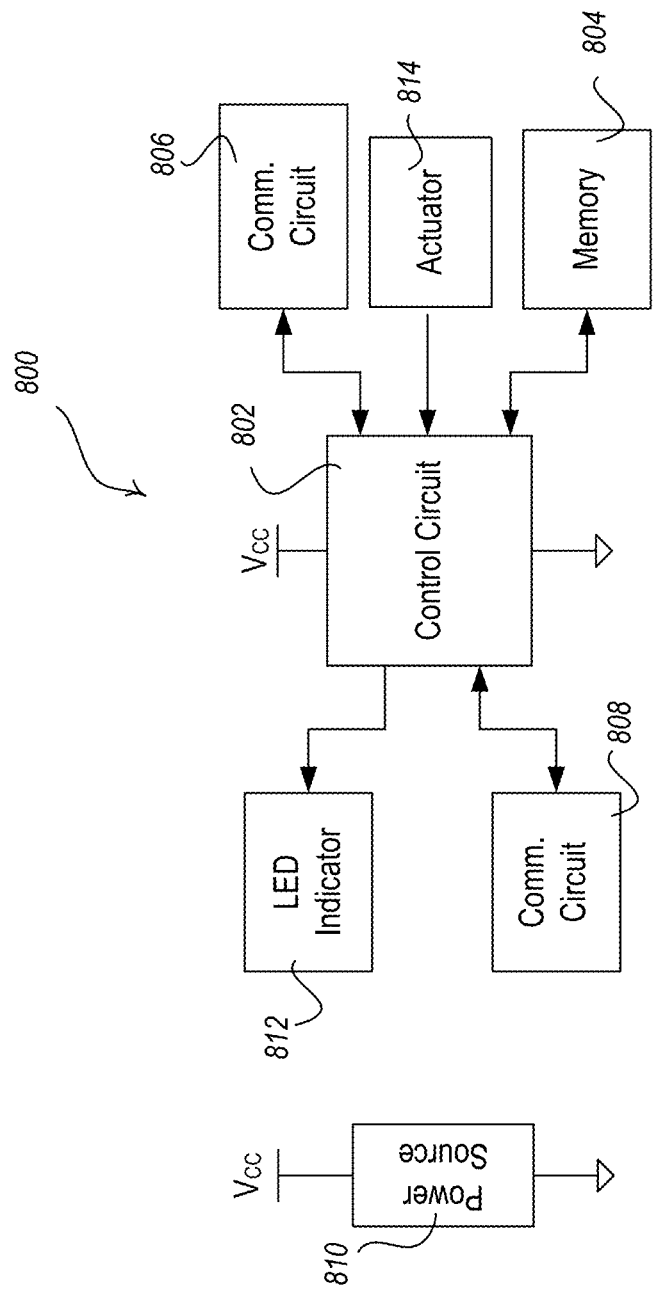
FIG. 60 is a block diagram of an example system controller.

FIG. 60 is a block diagram illustrating an example system controller 800 (such as system controller 150, described herein). The system controller 800 may include a control circuit 802 for controlling the functionality of the system controller 800. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the system controller 800 to perform as described herein. The control circuit 802 may store information in and/or retrieve information from the memory 804. The memory 804 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 800 may include a communications circuit 806 for transmitting and/or receiving information. The communications circuit 806 may perform wireless and/or wired communications. The system controller 800 may also, or alternatively, include a communications circuit 808 for transmitting and/or receiving information. The communications circuit 806 may perform wireless and/or wired communications. Communications circuits 806 and 808 may be in communication with control circuit 802. The communications circuits 806 and 808 may include RF transceivers or other communications modules capable of performing wireless communications via an antenna. The communications circuit 806 and communications circuit 808 may be capable of performing communications via the same communication channels or different communication channels. For example, the communications circuit 806 may be capable of communicating (e.g., with a programming device, over a network, etc.) via a wireless communication channel (e.g., BLUETOOTH®, near field communication (NFC), WIFI®, WI-MAX®, cellular, etc.) and the communications circuit 808 may be capable of communicating (e.g., with control devices and/or other devices in the load control system) via another wireless communication channel (e.g., WI-FI® or a proprietary communication channel, such as CLEAR CONNECT™).

The control circuit 802 may be in communication with an LED indicator 812 for providing indications to a user. The control circuit 802 may be in communication with an actuator 814 (e.g., one or more buttons) that may be actuated by a user to communicate user selections to the control circuit 802. For example, the actuator 814 may be actuated to put the control circuit 802 in an association mode and/or communicate association messages from the system controller 800.

Each of the modules within the system controller 800 may be powered by a power source 810. The power source 810 may include an AC power supply or DC power supply, for example. The power source 810 may generate a supply voltage $V_{CC}$ for powering the modules within the system controller 800.

Figure 61:
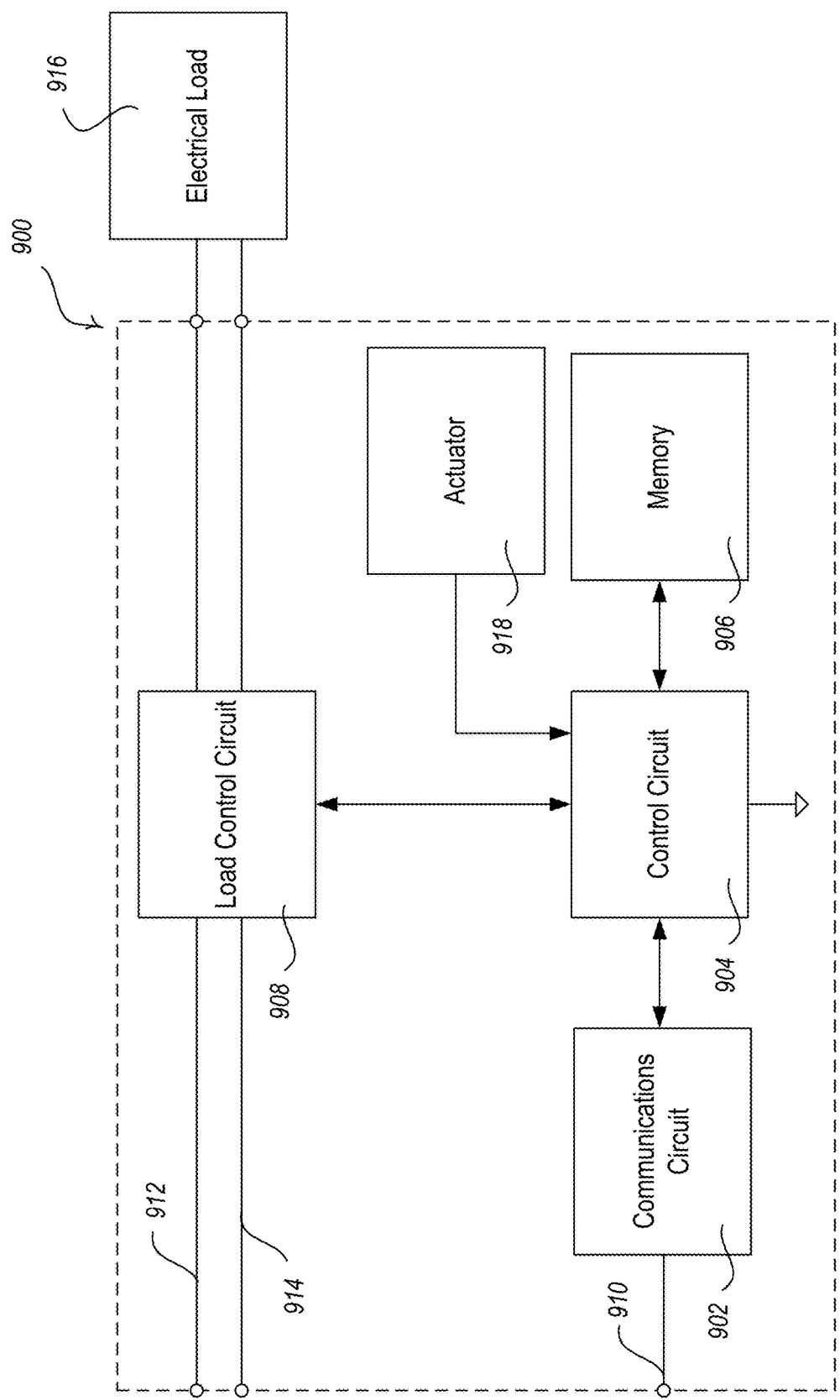
FIG. 61 is a block diagram of an example control-target device.

FIG. 61 is a block diagram illustrating an example control-target device, e.g., a load control device 900, as described herein. The load control device 900 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 900 may include a communications circuit 902. The communications circuit 902 may include a receiver, an RF transceiver, or other communications module capable of performing wired and/or wireless communications via communications link 910. The communications circuit 902 may be in communication with control circuit 904. The control circuit 904 may include one or more general purpose processors, special purpose processors, conventional processors, digital signal processors (DSPs), microprocessors, integrated circuits, a programmable logic device (PLD), application specific integrated circuits (ASICs), or the like. The control circuit 904 may perform signal coding, data processing, power control, input/output processing, or any other functionality that enables the load control device 900 to perform as described herein.

The control circuit 904 may store information in and/or retrieve information from the memory 906. For example, the memory 906 may maintain a registry of associated control devices and/or control configuration instructions. The memory 906 may include a non-removable memory and/or a removable memory. The load control circuit 908 may receive instructions from the control circuit 904 and may control the electrical load 916 based on the received instructions. The load control circuit 908 may send status feedback to the control circuit 904 regarding the status of the electrical load 916. The load control circuit 908 may receive power via the hot connection 912 and the neutral connection 914 and may provide an amount of power to the electrical load 916. The electrical load 916 may include any type of electrical load.

The control circuit 904 may be in communication with an actuator 918 (e.g., one or more buttons) that may be actuated by a user to communicate user selections to the control circuit 904. For example, the actuator 918 may be actuated to put the control circuit 904 in an association mode and/or communicate association messages from the load control device 900.

Figure 62:
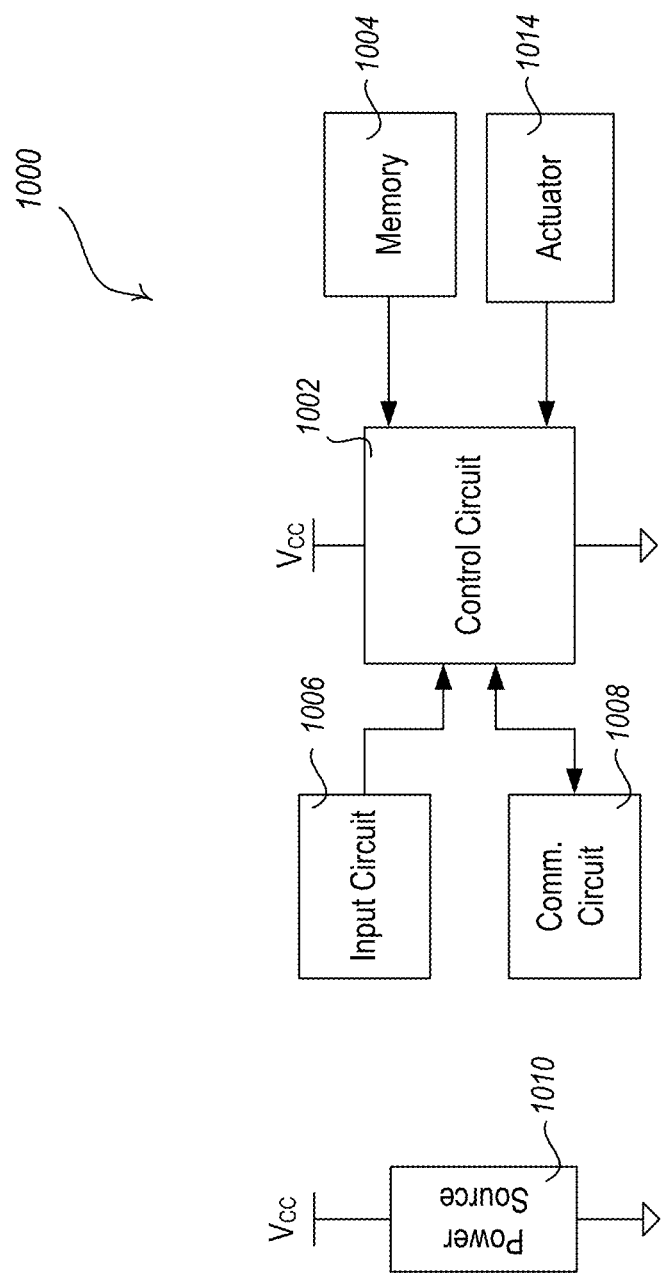
FIG. 62 is a block diagram of an example control-source device.

FIG. 62 is a block diagram illustrating an example control-source device 1000 as described herein. The control-source device 1000 may be a remote control device, an occupancy sensor, a daylight sensor, a window sensor, a temperature sensor, and/or the like. The control-source device 1000 may include a control circuit 1002 for controlling the functionality of the control-source device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, power control, input/output processing, or any other functionality that enables the control-source device 1000 to perform as described herein.

The control circuit 1002 may be in communication with an actuator 1014 (e.g., one or more buttons) that may be actuated by a user to communicate user selections to the control circuit 1002. For example, the actuator 1014 may be actuated to put the control circuit 1002 in an association mode and/or communicate association messages from the control-source device 1000. The control circuit 1002 may store information in and/or retrieve information from the memory 1004. The memory 1004 may include a non-removable memory and/or a removable memory, as described herein.

The control-source device 1000 may include a communications circuit 1008 for transmitting and/or receiving information. The communications circuit 1008 may transmit and/or receive information via wired and/or wireless communications. The communications circuit 1008 may include a transmitter, an RF transceiver, or other circuit capable of performing wired and/or wireless communications. The communications circuit 1008 may be in communication with control circuit 1002 for transmitting and/or receiving information.

The control circuit 1002 may also be in communication with an input circuit 1006. The input circuit 1006 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1006 to put the control circuit 1002 in an association mode and/or communicate association messages from the control-source device. The control circuit 1002 may receive information from the input circuit 1006 (e.g., an indication that a button has been actuated or sensed information). Each of the modules within the control-source device 1000 may be powered by a power source 1010.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed:

1. An electrical load control system configuration method, comprising
   causing, by an electrical load control system control circuit, user interface circuitry to display a graphical user interface that includes a canvas portion and a palette portion that includes a SOLUTIONS PANE that includes an ADD SOLUTION ICON;
   causing, by the electrical load control system control circuitry, the user interface circuitry to display a SOLUTIONS SELECTION WINDOW responsive to a user selection of the ADD SOLUTION ICON, the SOLUTIONS SELECTION WINDOW including an ENERGY CODE SELECTION TOOL and a SOLUTION TYPE SELECTION TOOL;
   receiving, by the electrical load control system control circuitry, a user input indicative of an energy code using the ENERGY CODE SELECTION TOOL;
   receiving, by the electrical load control system control circuitry, a user input indicative of a solution type using the SOLUTION TYPE SELECTION TOOL;
   causing, by the electrical load control system control circuitry, the user interface circuitry to display in the SOLUTIONS SELECTION WINDOW a solutions list that includes preconfigured solutions meeting the selected energy code and the selected solution type;
   causing, by the electrical load control system control circuitry, the user interface circuitry to display an icon representative of each respective one of the one or more selected solutions in the SOLUTIONS PANE included in the palette portion of the GUI and displaying a DONE button the SOLUTIONS SELECTION WINDOW Responsive to a selection of one or more solutions included on the solutions list; and
   saving, by the electrical load control system control circuitry in communicatively coupled memory circuitry, a TEMPLATE that includes the one of the one or more selected solutions responsive to selection of the DONE button included in the SOLUTIONS SELECTION WINDOW.

2. The electrical load control system configuration method of claim 1, further comprising:
   causing, by the electrical load control system control circuitry, the user interface circuitry to display a floorplan on the canvas portion of the GUI;
   receiving, by the electrical load control system control circuitry, a selection of an icon representative of a solution included in the one or more solutions displayed on the solutions list;
   prompting, by the electrical load control system control circuitry, the user for an input indicative of an area on the floorplan with which to associate the selected solution;
   receiving, by the electrical load control system control circuitry, a user input designating the area on the floorplan displayed on the canvas portion of the GUI; and
   causing, by the electrical load control system control circuitry, the user interface circuitry to display a list of electrical fixtures compatible with the selected solution in a FIXTURES PANE included in the palette portion of the GUI.

3. The electrical load control system configuration method of claim 2, further comprising:
   receiving, by the electrical load control system control circuitry, a user input indicative of one of the electrical fixtures included in the list of electrical fixtures;
   receiving, by the electrical load control system control circuitry, a user input indicative of a first location in the designated area on the floorplan;
   causing, by the electrical load control system control circuitry, the user interface circuitry to display a first icon representative of the selected electrical fixture at the first location within the designated area responsive to receipt of the user input indicative of one of the electrical fixtures included in the list of electrical fixtures and the usre input indicative of a first location in the designated area on the floorplan; and
   autonomously associating, by the electrical load control system control circuitry, between the selected electrical fixture and one or more control devices included in the selected solution.

4. The electrical load control system configuration method of claim 3, further comprising:
   receiving, by the electrical load control system control circuitry, a user input indicative of a second location in the designated area on the floorplan;
   causing, by the electrical load control system control circuitry, the user interface circuitry to display a second icon representative of the selected electrical fixture at the second location within the designated area responsive to receipt of the user input indicative of a second location in the designated area on the floorplan; and
   causing, by the electrical load control system control circuitry, the user interface circuitry to display an icon on the floorplan indicative of an operable coupling between the first icon representative of the selected electrical fixture and the second icon representative of the selected electrical fixture.

5. The electrical load control system configuration method of claim 4 wherein causing the user interface circuitry to display the icon indicative of the operable coupling between the first icon representative of the selected electrical fixture and the second icon representative of the selected electrical fixture further comprises:
   causing, by the electrical load control system control circuitry, the user interface circuitry to display an icon indicative of an electrical power coupling between the first icon representative of the selected electrical fixture and the second icon representative of the selected electrical fixture.

6. The electrical load control system configuration method of claim 4 wherein causing the user interface circuitry to display the icon indicative of the operable coupling between the first icon representative of the selected electrical fixture and the second icon representative of the selected electrical fixture further comprises:
   causing, by the electrical load control system control circuitry, the user interface circuitry to display an icon indicative of a communicative coupling between the first icon representative of the selected electrical fixture and the second icon representative of the selected electrical fixture.

7. A non-transitory, machine-readable, storage device that includes instructions that, when executed by electrical load control system configuration control circuitry, causes the control circuitry to:
   cause user interface circuitry to display a graphical user interface that includes a canvas portion and a palette portion that includes a SOLUTIONS PANE that includes an ADD SOLUTION ICON;

cause the user interface circuitry to display a SOLUTIONS SELECTION WINDOW responsive to a user selection of the ADD SOLUTION ICON, the SOLUTIONS SELECTION WINDOW including an ENERGY CODE SELECTION TOOL and a SOLUTION TYPE SELECTION TOOL;

receive a user input indicative of an energy code using the ENERGY CODE SELECTION TOOL;

receive a user input indicative of a solution type using the SOLUTION TYPE SELECTION TOOL;

cause the user interface circuitry to display in the SOLUTIONS SELECTION WINDOW a solutions list that includes preconfigured solutions meeting the selected energy code and the selected solution type;

cause the user interface circuitry to display an icon representative of each respective one of the one or more selected solutions in the SOLUTIONS PANE included in the palette portion of the GUI and displaying a DONE button the SOLUTIONS SELECTION WINDOW Responsive to a selection of one or more solutions included on the solutions list; and save, in communicatively coupled memory circuitry, a TEMPLATE that includes the one of the one or more selected solutions responsive to selection of the DONE button included in the SOLUTIONS SELECTION WINDOW.

8. The non-transitory, machine-readable, storage device of claim 7 wherein the instructions, when executed by electrical load control system configuration control circuitry, causes the control circuitry to:

cause the user interface circuitry to display a floorplan on the canvas portion of the GUI;

receive a selection of an icon representative of a solution included in the one or more solutions displayed on the solutions list;

prompt the user for an input indicative of an area on the floorplan with which to associate the selected solution;

receive a user input designating the area on the floorplan displayed on the canvas portion of the GUI; and cause the user interface circuitry to display a list of electrical fixtures compatible with the selected solution in a FIXTURES PANE included in the palette portion of the GUI.

9. The non-transitory, machine-readable, storage device of claim 8 wherein the instructions, when executed by electrical load control system configuration control circuitry, causes the control circuitry to:

receive a user input indicative of one of the electrical fixtures included in the list of electrical fixtures;

receive a user input indicative of a first location in the designated area on the floorplan;

cause the user interface circuitry to display a first icon representative of the selected electrical fixture at the first location within the designated area responsive to receipt of the user input indicative of one of the electrical fixtures included in the list of electrical fixtures and the user input indicative of a first location in the designated area on the floorplan; and autonomously associate the selected electrical fixture and one or more control devices included in the selected solution.

10. The non-transitory, machine-readable, storage device of claim 9 wherein the instructions, when executed by electrical load control system configuration control circuitry, causes the control circuitry to:

receiving, by the electrical load control system control circuitry, a user input indicative of a second location in the designated area on the floorplan;

causing, by the electrical load control system control circuitry, the user interface circuitry to display a second icon representative of the selected electrical fixture at the second location within the designated area responsive to receipt of the user input indicative of a second location in the designated area on the floorplan; and causing, by the electrical load control system control circuitry, the user interface circuitry to display an icon on the floorplan indicative of an operable coupling between the first icon representative of the selected electrical fixture and the second icon representative of the selected electrical fixture.

11. The non-transitory, machine-readable, storage device of claim 9 wherein the instructions that cause the electrical load control system configuration control circuitry to cause the user interface circuitry to display the icon indicative of the operable coupling between the first icon representative of the selected electrical fixture and the second icon representative of the selected electrical fixture further cause the control circuitry to:

cause the user interface circuitry to display an icon indicative of an electrical power coupling between the first icon representative of the selected electrical fixture and the second icon representative of the selected electrical fixture.

12. The non-transitory, machine-readable, storage device of claim 9 wherein the instructions that cause the electrical load control system configuration control circuitry to cause the user interface circuitry to display the icon indicative of the operable coupling between the first icon representative of the selected electrical fixture and the second icon representative of the selected electrical fixture further cause the control circuitry to:

cause the user interface circuitry to display an icon indicative of a communicative coupling between the first icon representative of the selected electrical fixture and the second icon representative of the selected electrical fixture.

13. An electrical load control system configuration controller, comprising:

user interface circuitry;

memory circuitry;

control circuitry communicatively coupled to the memory circuitry and to the user interface circuitry, the control circuitry to:

cause the user interface circuitry to display a graphical user interface that includes a canvas portion and a palette portion that includes a SOLUTIONS PANE that includes an ADD SOLUTION ICON;

cause the user interface circuitry to display a SOLUTIONS SELECTION WINDOW responsive to a user selection of the ADD SOLUTION ICON, the SOLUTIONS SELECTION WINDOW including an ENERGY CODE SELECTION TOOL and a SOLUTION TYPE SELECTION TOOL;

receive a user input indicative of an energy code using the ENERGY CODE SELECTION TOOL;

receive a user input indicative of a solution type using the SOLUTION TYPE SELECTION TOOL;

cause the user interface circuitry to display in the SOLUTIONS SELECTION WINDOW a solutions list that includes preconfigured solutions meeting the selected energy code and the selected solution type;

cause the user interface circuitry to display an icon representative of each respective one of the one or more selected solutions in the SOLUTIONS PANE included in the palette portion of the GUI and displaying a DONE button the SOLUTIONS SELECTION WINDOW Responsive to a selection of one or more solutions included on the solutions list; and save, in the memory circuitry, a TEMPLATE that includes the one of the one or more selected solutions responsive to selection of the DONE button included in the SOLUTIONS SELECTION WINDOW.

14. The electrical load control system configuration controller of claim 13, the control circuitry to further:

cause the user interface circuitry to display a floorplan on the canvas portion of the GUI;

receive a selection of an icon representative of a solution included in the one or more solutions displayed on the solutions list;

prompt the user for an input indicative of an area on the floorplan with which to associate the selected solution;

receive a user input designating the area on the floorplan displayed on the canvas portion of the GUI; and cause the user interface circuitry to display a list of electrical fixtures compatible with the selected solution in a FIXTURES PANE included in the palette portion of the GUI.

15. The electrical load control system configuration controller of claim 14, the control circuitry to further:

receive a user input indicative of one of the electrical fixtures included in the list of electrical fixtures;

receive a user input indicative of a first location in the designated area on the floorplan;

cause the user interface circuitry to display a first icon representative of the selected electrical fixture at the first location within the designated area responsive to receipt of the user input indicative of one of the electrical fixtures included in the list of electrical fixtures and the user input indicative of a first location in the designated area on the floorplan; and autonomously associate the selected electrical fixture and one or more control devices included in the selected solution.

16. The electrical load control system configuration controller of claim 15, the control circuitry to further:

receiving, by the electrical load control system control circuitry, a user input indicative of a second location in the designated area on the floorplan;

causing, by the electrical load control system control circuitry, the user interface circuitry to display a second icon representative of the selected electrical fixture at the second location within the designated area responsive to receipt of the user input indicative of a second location in the designated area on the floorplan; and causing, by the electrical load control system control circuitry, the user interface circuitry to display an icon on the floorplan indicative of an operable coupling between the first icon representative of the selected electrical fixture and the second icon representative of the selected electrical fixture.

17. The electrical load control system configuration controller of claim 13 wherein to cause the user interface circuitry to display the icon indicative of the operable coupling between the first icon representative of the selected electrical fixture and the second icon representative of the selected electrical fixture, the control circuitry to further:

cause the user interface circuitry to display an icon indicative of an electrical power coupling between the first icon representative of the selected electrical fixture and the second icon representative of the selected electrical fixture.

18. The electrical load control system configuration controller of claim 13 wherein to cause the user interface circuitry to display the icon indicative of the operable coupling between the first icon representative of the selected electrical fixture and the second icon representative of the selected electrical fixture, the control circuitry to further:

cause the user interface circuitry to display an icon indicative of a communicative coupling between the first icon representative of the selected electrical fixture and the second icon representative of the selected electrical fixture.

* * * * *